(12) United States Patent
Bhattad et al.

(10) Patent No.: US 12,232,186 B2
(45) Date of Patent: Feb. 18, 2025

(54) UPLINK CHANNEL TIMELINE ISSUES WITH EXTENDED CYCLIC PREFIX

(71) Applicant: Qualcomm Incorporated, San Diego, CA (US)

(72) Inventors: Kapil Bhattad, Bangalore (IN); Xiaoxia Zhang, San Diego, CA (US); Jing Sun, San Diego, CA (US); Ananta Narayanan Thyagarajan, Bangalore (IN); Tanumay Datta, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 246 days.

(21) Appl. No.: 17/774,831

(22) PCT Filed: Oct. 27, 2020

(86) PCT No.: PCT/US2020/057473
§ 371 (c)(1),
(2) Date: May 5, 2022

(87) PCT Pub. No.: WO2021/086824
PCT Pub. Date: May 6, 2021

(65) Prior Publication Data
US 2022/0408494 A1    Dec. 22, 2022

(30) Foreign Application Priority Data
Oct. 30, 2019  (IN) .............................. 201941044022

(51) Int. Cl.
*H04W 74/0833*  (2024.01)
*H04L 27/26*    (2006.01)
(Continued)

(52) U.S. Cl.
CPC ... *H04W 74/0841* (2013.01); *H04L 27/26025* (2021.01); *H04L 27/2605* (2013.01); *H04W 72/1268* (2013.01); *H04W 72/23* (2023.01)

(58) Field of Classification Search
CPC ............. H04W 74/0841; H04W 72/23; H04W 72/1268; H04L 27/26025; H04L 27/2605
See application file for complete search history.

(56) References Cited

U.S. PATENT DOCUMENTS 10,411,928 B2   9/2019  Yoo et al.
10,461,976 B2  10/2019  Chen et al.
(Continued)

FOREIGN PATENT DOCUMENTS

CN       109792608 A    5/2019
WO    WO-2017147021    8/2017
(Continued)

OTHER PUBLICATIONS

3GPP TR 38.912: "3rd Generation Partnership Project; Technical Specification Group Radio Access Network; Study on New Radio (NR) Access Technology (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. TSG RAN, No. V15.0.0 (Jun. 2018), Jul. 19, 2018 (Jul. 19, 2018), pp. 1-74, XP051475046, [retrieved on Jul. 19, 2018] Sections 8.1 and 8.3.1.2.2, p. 18, line 19-p. 30, line 40; p. 36, line 35-p. 38, line 12.
(Continued)

*Primary Examiner* — Samina F Choudhry
(74) *Attorney, Agent, or Firm* — Holland & Hart LLP/Qualcomm

(57) ABSTRACT

Methods, systems, and devices for wireless communications are described. A user equipment (UE) may indicate support of an extended cyclic prefix (ECP), where a duration of the
(Continued)

ECP or transmitting the ECP is based on the indication. In some cases, the UE may receive an uplink grant to transmit an uplink message with an indication of the ECP, and the UE may transmit the ECP and uplink message according to a timeline based in part on the ECP. Additionally or alternatively, an uplink channel allocation indicated in the uplink grant may include a starting point for the ECP, where the UE transmits the ECP at the starting point. In some cases, the UE may multiplex uplink control information (UCI) in the uplink channel based on a timeline that is based in part on the ECP.

30 Claims, 24 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 10,595,332 | B2 | 3/2020 | Jiang et al. |
| 2017/0013582 | A1* | 1/2017 | Takekawa ......... H04W 56/0045 |
| 2020/0322925 | A1* | 10/2020 | Takeda ................. H04W 72/04 |
| 2022/0078841 | A1* | 3/2022 | Tiirola ................. H04W 72/02 |

FOREIGN PATENT DOCUMENTS

| | | |
|---|---|---|
| WO | WO-2017164222 A1 | 9/2017 |
| WO | 2018063868 | 4/2018 |
| WO | WO-2018089726 | 5/2018 |
| WO | WO-2019036621 A1 | 2/2019 |

OTHER PUBLICATIONS

International Search Report and Written Opinion—PCT/US2020/057473—ISA/EPO—Feb. 1, 2021.

Qualcomm Incorporated: "Summary of NR-U Agreements till RAN1 #98", 3GPP TSG RAN WG1 Meeting #99, 3GPP Draft; R1-1911721, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Oct. 29, 2019 (Oct. 29, 2019), 26 Pages, XP051814819, Retrieved from the Internet: URL: https://ftp.3gpp.org/tsg_ran/WG1_RL1/TSGR1_98b/Docs/R1-1911721.zip R1-1911721 7.2.2 Summary of NR-U Agreements till RAN1 98bis.docx [retrieved on Oct. 29, 2019] p. 12-p. 15, Section 7.2.2.2.3.

VIVO: "Feature Lead Summary on Configured Grant Enhancement", 3GPP TSG RAN WG1#98bis, 3GPP Draft; R1-1910559 FL Summary on NRU-CG, 3rd Generation Partnership Project (3GPP), Mobile Competence Centre; 650, Route Des Lucioles; F-06921 Sophia- Antipolis Cedex; France, vol. RAN WG1, No. Chongqing, China; Oct. 14, 2019-Oct. 20, 2019, Oct. 22, 2019 (Oct. 22, 2019), 20 Pages, XP051798593, Retrieved from the Internet: URL: https://ftp.3gpp.org/tsg_ran/WG1_RL1/TSGR1_98b/Docs/R1-1910559.zip R1-1910559 FL Summary on NRU-CG.docx [retrieved on Oct. 22, 2019] Section 5.3, Section 4.2.

* cited by examiner

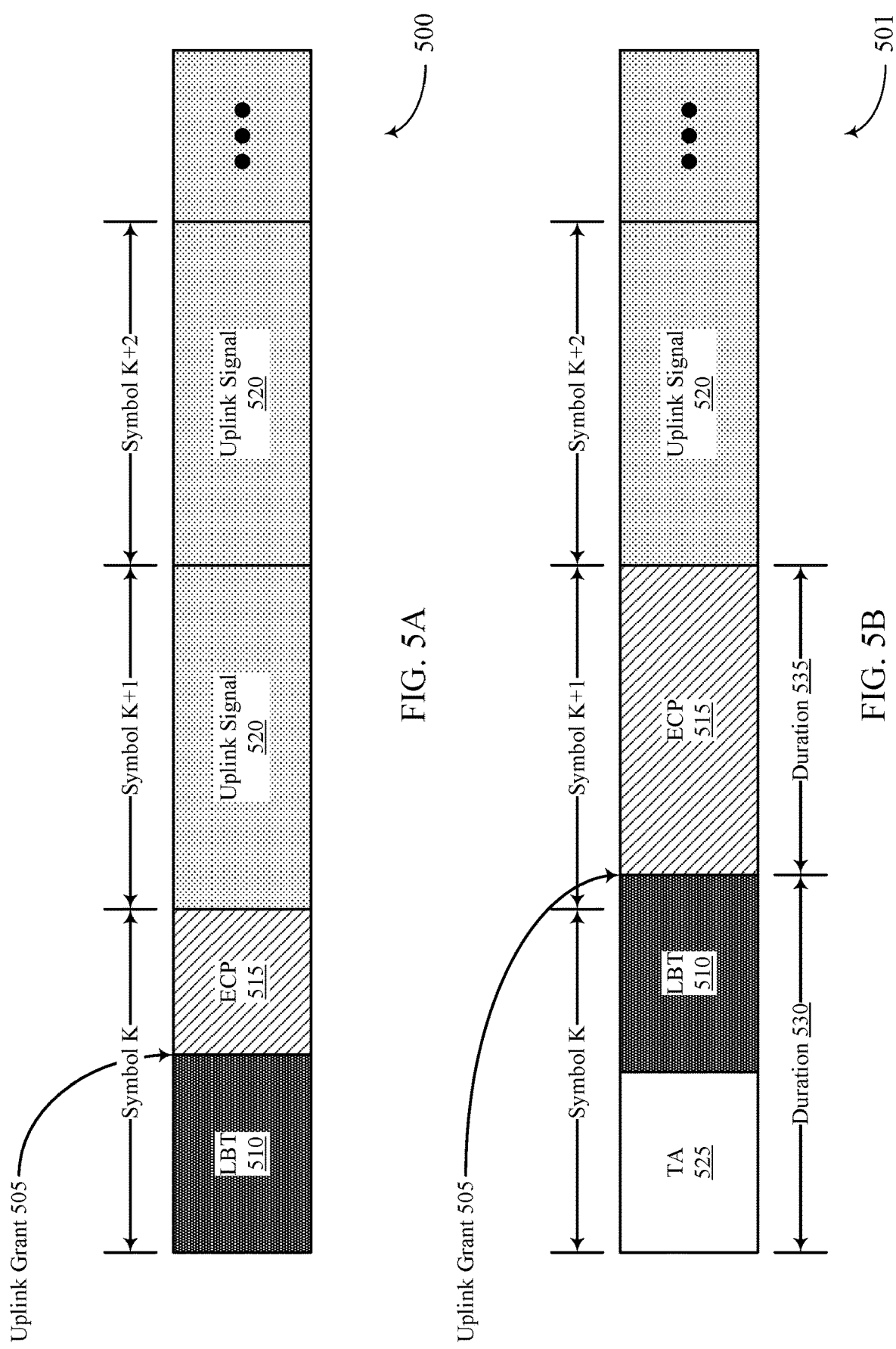

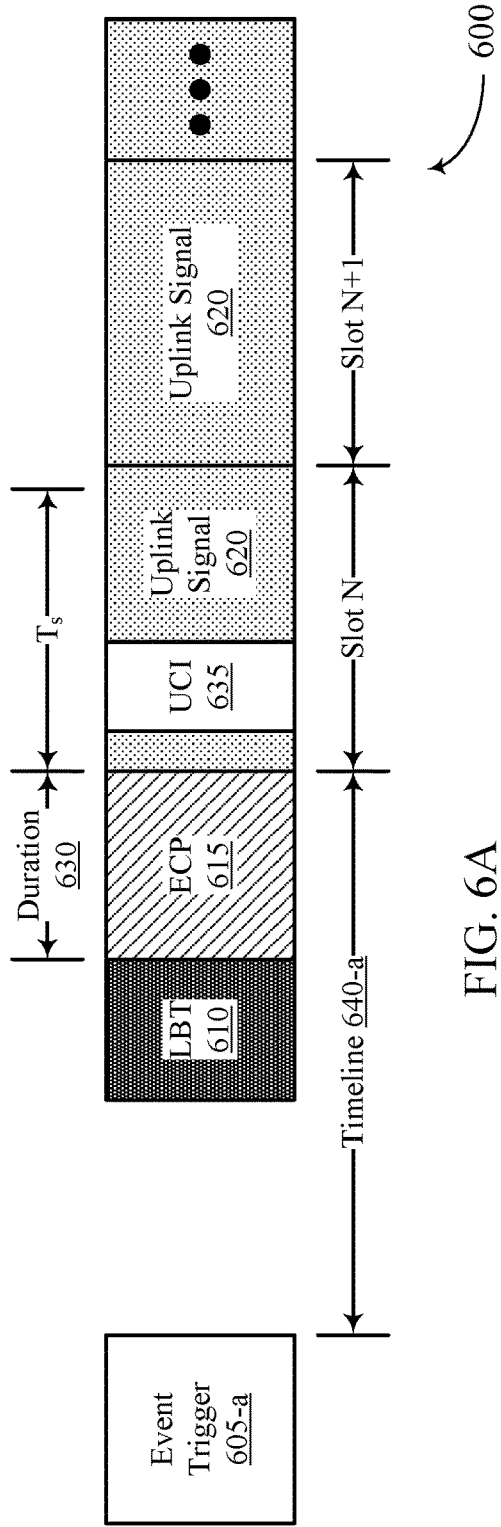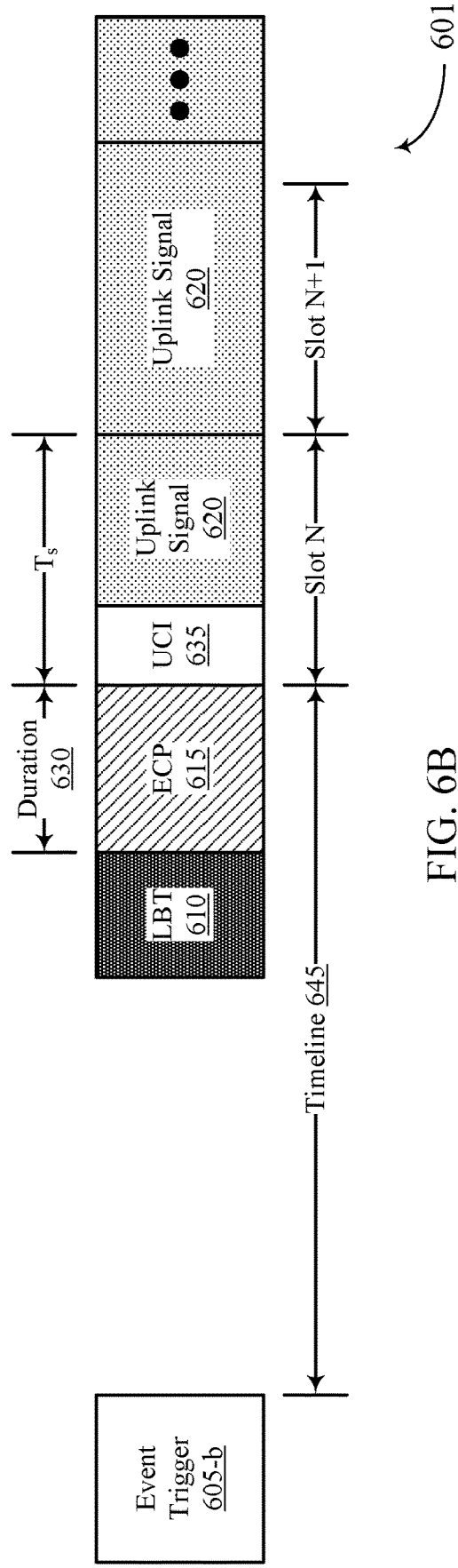
FIG. 6A
FIG. 6B

UPLINK CHANNEL TIMELINE ISSUES WITH EXTENDED CYCLIC PREFIX

CROSS REFERENCE TO RELATED APPLICATIONS

The present application is a 371 national stage filing of International PCT Application No. PCT/US2020/057473 by Bhattad et al., entitled "UPLINK CHANNEL TIMELINE ISSUES WITH EXTENDED CYCLIC PREFIX," filed Oct. 27, 2020; and claims priority to Indian Application No. 201941044022 by Bhattad et al., entitled "PUSCH TIMELINE ISSUES WITH EXTENDED CP," filed Oct. 30, 2019, each of which is assigned to the assignee hereof, and each of which is expressly incorporated by reference in its entirety herein.

BACKGROUND

The following relates generally to wireless communications, and more specifically to uplink channel timelines with extended cyclic prefixes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Transmissions in wireless communications systems such as LTE and NR systems may use a cyclic prefix (CP) to provide a guard period at the start of a symbol (e.g., OFDMA symbol) which provides protection against multipath delay spread. The CP may be generated by copying the end of the main body of the symbol to a beginning of the symbol, such that a frequency domain representation of each delay spread component within a fast Fourier transform (FFT) processing window is the same. Both a normal CP (NCP) and an extended CP (ECP) length may be specified in systems, with the NCP intended to be sufficient for the majority of scenarios and the ECP intended for scenarios with relatively high delay spread. Efficient techniques for using ECPs may be desirable to help enhance system efficiency.

SUMMARY

The described techniques relate to improved methods, systems, devices, and apparatuses that support uplink channel timelines with extended cyclic prefixes. Generally, the described techniques provide for a user equipment (UE) that supports an extended cyclic prefix (ECP) to identify or determine a duration for the ECP and to transmit the ECP followed by an uplink message (e.g., on a first symbol of one or more symbols of the uplink message), where the ECP is based on when the uplink message is transmitted. For example, the UE may transmit an indication of a UE capability to support the ECP, where the ECP is transmitted based on this UE capability. Additionally, the UE may identify or determine the duration of the ECP based on an uplink grant received from a base station that schedules the uplink message and/or the ECP. In some cases, the uplink grant may include an explicit indication of the ECP duration, an implicit indication of the ECP duration (e.g., via multiple transmission parameters that the UE uses to derive the ECP duration), a starting symbol for transmitting the uplink message that the UE uses to start transmission of the ECP followed by the uplink message, or a combination thereof. Additionally or alternatively, the UE may determine an ECP duration based on a set of offsets and the UE capability, where the set of offsets is configured in part by the base station.

In some cases, the UE may also identify that uplink control information (UCI) is to be transmitted that at least partially overlaps the uplink message and may determine how to multiplex the UCI with the uplink message based on the ECP. For example, the UE may determine a symbol of the uplink message to multiplex with the UCI or whether to multiplex the UCI based on a timeline capability of the UE between identifying a trigger for transmitting the UCI and transmitting the UCI, where the timeline capability is based on a minimum number of symbols required by the UE between the event trigger and a start of an uplink channel for transmitting the UCI, the ECP, a timing advance (TA), or a combination thereof. Additionally or alternatively, when receiving an indication of the ECP in an uplink grant, the UE may determine whether to transmit the uplink message indicated by the uplink grant based on a similar timeline capability of the UE. For example, the timeline capability may be based on a minimum number of symbols required by the UE between the uplink grant and a start of an uplink channel for transmitting the uplink message, the ECP, a TA, or a combination thereof. Additionally, when transmitting the ECP and the uplink message, both the ECP and the uplink message may be transmitted in a same slot (e.g., neither the ECP nor an uplink channel carrying the uplink message may cross a slot boundary based on a buffer restriction/capability of the UE).

A method of wireless communications at a UE is described. The method may include transmitting an indication of a UE capability to support an ECP, determining to transmit an uplink message on resources of an uplink channel, performing a listen-before-talk (LBT) procedure based on the determining to transmit the uplink message, determining a duration of the ECP associated with the resources of the uplink channel, and transmitting, on the resources of the uplink channel, the ECP according to the determined duration followed by a first symbol of one or more symbols of the uplink message, the ECP based on the first symbol.

An apparatus for wireless communications at a UE is described. The apparatus may include a processor, memory coupled with the processor, and instructions stored in the memory. The instructions may be executable by the processor to cause the apparatus to transmit an indication of a UE capability to support an ECP, determine to transmit an uplink message on resources of an uplink channel, perform an LBT procedure based on the determining to transmit the uplink message, determine a duration of the ECP associated with the resources of the uplink channel, and transmit, on the resources of the uplink channel, the ECP according to the determined duration followed by a first symbol of one or more symbols of the uplink message, the ECP based on the first symbol.

Another apparatus for wireless communications at a UE is described. The apparatus may include means for transmitting an indication of a UE capability to support an ECP, determining to transmit an uplink message on resources of an uplink channel, performing an LBT procedure based on the determining to transmit the uplink message, determining a duration of the ECP associated with the resources of the uplink channel, and transmitting, on the resources of the uplink channel, the ECP according to the determined duration followed by a first symbol of one or more symbols of the uplink message, the ECP based on the first symbol.

A non-transitory computer-readable medium storing code for wireless communications at a UE is described. The code may include instructions executable by a processor to transmit an indication of a UE capability to support an ECP, determine to transmit an uplink message on resources of an uplink channel, perform an LBT procedure based on the determining to transmit the uplink message, determine a duration of the ECP associated with the resources of the uplink channel, and transmit, on the resources of the uplink channel, the ECP according to the determined duration followed by a first symbol of one or more symbols of the uplink message, the ECP based on the first symbol.

In some examples of the method, apparatuses, and non-transitory computer-readable medium described herein, transmitting the indication of the UE capability may include operations, features, means, or instructions for transmitting an indication of an amount of ECP that may be supported by the UE.

In some examples of the method, apparatuses, and non-transitory computer-readable medium described herein, the amount of supported ECP includes a number of absolute time units, a number of symbols, or a combination thereof.

In some examples of the method, apparatuses, and non-transitory computer-readable medium described herein, the amount of supported ECP may be based on a subcarrier spacing (SCS) of the uplink channel or may be the same for any SCS of the uplink channel.

Some examples of the method, apparatuses, and non-transitory computer-readable medium described herein may further include operations, features, means, or instructions for receiving, from a base station, a configuration of a set of offsets for transmitting the ECP, the set of offsets based on the indication of the UE capability.

Some examples of the method, apparatuses, and non-transitory computer-readable medium described herein may further include operations, features, means, or instructions for receiving, from a base station, a configuration of a set of offsets for transmitting the ECP, and selecting an offset from a subset of the set of offsets for transmitting the ECP, the subset of the set of offsets based on the UE capability.

Some examples of the method, apparatuses, and non-transitory computer-readable medium described herein may further include operations, features, means, or instructions for identifying UCI to transmit on the uplink channel based on an event trigger, and multiplexing the UCI and at least one symbol of the uplink message on the uplink channel based on a timeline that includes a minimum number of symbols required by the UE between when the event trigger occurs and a start of the uplink channel, the ECP, a TA, or a combination thereof.

Some examples of the method, apparatuses, and non-transitory computer-readable medium described herein may further include operations, features, means, or instructions for determining a symbol for multiplexing the UCI and the uplink message on the uplink channel based on the timeline.

Some examples of the method, apparatuses, and non-transitory computer-readable medium described herein may further include operations, features, means, or instructions for determining to multiplex the UCI and the uplink message based on the event trigger occurring a number of symbols before the start of the uplink channel, the number of symbols based on the timeline.

In some examples of the method, apparatuses, and non-transitory computer-readable medium described herein, the timeline may depend on the duration of the ECP; a sum of a duration of the ECP and the TA; a smallest integer number of symbols whose duration may be greater than or equal to the duration of the ECP; or a smallest integer number of symbols whose duration may be greater than or equal to a sum of durations of the ECP and the TA.

Some examples of the method, apparatuses, and non-transitory computer-readable medium described herein may further include operations, features, means, or instructions for receiving an indication of an increase to the timeline caused by the ECP and the TA via radio resource control (RRC) signaling.

In some examples of the method, apparatuses, and non-transitory computer-readable medium described herein, the minimum number of symbols required by the UE between when the event trigger occurs and when a start of the uplink channel includes a UE UCI capability.

In some examples of the method, apparatuses, and non-transitory computer-readable medium described herein, the UCI includes a feedback message, channel state information, or a combination thereof.

Some examples of the method, apparatuses, and non-transitory computer-readable medium described herein may further include operations, features, means, or instructions for identifying UCI to transmit on the uplink channel based on an event trigger, and dropping the uplink message or the UCI based on a priority of the uplink message, the UCI, data to be transmitted in the UCI, or a combination thereof, where the event trigger occurs within a duration before a start of the uplink channel.

In some examples of the method, apparatuses, and non-transitory computer-readable medium described herein, the duration may be based on a supported number of symbols between the event trigger and transmitting the UCI, the ECP, and a TA.

In some examples of the method, apparatuses, and non-transitory computer-readable medium described herein, the ECP and the uplink message may be in a same slot.

In some examples of the method, apparatuses, and non-transitory computer-readable medium described herein, determining to transmit the uplink message further may include operations, features, means, or instructions for receiving an uplink grant scheduling the uplink message on the resources of the uplink channel.

In some examples of the method, apparatuses, and non-transitory computer-readable medium described herein, determining to transmit the uplink message further may include operations, features, means, or instructions for receiving a configured grant scheduling one or more uplink messages on the resources of the uplink channel.

A method of wireless communications at a UE is described. The method may include receiving an uplink grant indicating resources of an uplink channel and an indication of an ECP for the uplink channel, performing an LBT procedure based on receiving the uplink grant, determining a duration for the ECP from the received uplink grant, and transmitting, on the resources of the uplink channel, the ECP according to the determined duration followed by a first symbol of one or more symbols of the uplink message, the ECP based on the first symbol.

An apparatus for wireless communications at a UE is described. The apparatus may include a processor, memory coupled with the processor, and instructions stored in the memory. The instructions may be executable by the processor to cause the apparatus to receive an uplink grant indicating resources of an uplink channel and an indication of an ECP for the uplink channel, perform an LBT procedure based on receiving the uplink grant, determine a duration for the ECP from the received uplink grant, and transmit, on the resources of the uplink channel, the ECP according to the determined duration followed by a first symbol of one or more symbols of the uplink message, the ECP based on the first symbol.

Another apparatus for wireless communications at a UE is described. The apparatus may include means for receiving an uplink grant indicating resources of an uplink channel and an indication of an ECP for the uplink channel, performing an LBT procedure based on receiving the uplink grant, determining a duration for the ECP from the received uplink grant, and transmitting, on the resources of the uplink channel, the ECP according to the determined duration followed by a first symbol of one or more symbols of the uplink message, the ECP based on the first symbol.

A non-transitory computer-readable medium storing code for wireless communications at a UE is described. The code may include instructions executable by a processor to receive an uplink grant indicating resources of an uplink channel and an indication of an ECP for the uplink channel, perform an LBT procedure based on receiving the uplink grant, determine a duration for the ECP from the received uplink grant, and transmit, on the resources of the uplink channel, the ECP according to the determined duration followed by a first symbol of one or more symbols of the uplink message, the ECP based on the first symbol.

Some examples of the method, apparatuses, and non-transitory computer-readable medium described herein may further include operations, features, means, or instructions for determining to transmit on the resources of the uplink channel based on a timeline that includes a minimum number of symbols required by the UE between the received uplink grant and a start of the uplink channel, the ECP, a TA, or a combination thereof.

Some examples of the method, apparatuses, and non-transitory computer-readable medium described herein may further include operations, features, means, or instructions for determining to transmit on the resources of the uplink channel based on the uplink grant occurring a number of symbols before the start of the uplink channel, the number of symbols based on the timeline.

In some examples of the method, apparatuses, and non-transitory computer-readable medium described herein, the timeline may be based on a duration of the ECP, or a sum of a duration of the ECP and the TA, or a smallest integer number of symbols whose duration may be greater than or equal to the duration of the ECP, or and a smallest integer number of symbols whose duration may be greater than or equal to a sum of durations of the ECP and the TA.

Some examples of the method, apparatuses, and non-transitory computer-readable medium described herein may further include operations, features, means, or instructions for receiving an indication of an increase to the timeline caused by the ECP and the TA via RRC signaling.

In some examples of the method, apparatuses, and non-transitory computer-readable medium described herein, the minimum number of symbols required by the UE between the received uplink grant and a start of the uplink channel includes a UE UCI capability.

Some examples of the method, apparatuses, and non-transitory computer-readable medium described herein may further include operations, features, means, or instructions for reducing the determined duration for the ECP based on when the uplink grant may be received.

In some examples of the method, apparatuses, and non-transitory computer-readable medium described herein, the ECP includes a fractional number of symbols, a full number of symbols, or a combination thereof.

In some examples of the method, apparatuses, and non-transitory computer-readable medium described herein, the ECP and the uplink channel may be in a same slot.

A method of wireless communications at a UE is described. The method may include receiving an uplink grant of resources of an uplink channel for an uplink message by the UE, the uplink grant indicating to transmit an ECP at a start of the resources of the uplink grant, performing an LBT procedure based on the receiving the uplink grant, and transmitting, on the resources of the uplink channel, the ECP according to the start of the resources of the uplink grant followed by a first symbol of one or more symbols of the uplink message, the ECP based on the first symbol.

An apparatus for wireless communications at a UE is described. The apparatus may include a processor, memory coupled with the processor, and instructions stored in the memory. The instructions may be executable by the processor to cause the apparatus to receive an uplink grant of resources of an uplink channel for an uplink message by the UE, the uplink grant indicating to transmit an ECP at a start of the resources of the uplink grant, perform an LBT procedure based on the receiving the uplink grant, and transmit, on the resources of the uplink channel, the ECP according to the start of the resources of the uplink grant followed by a first symbol of one or more symbols of the uplink message, the ECP based on the first symbol.

Another apparatus for wireless communications at a UE is described. The apparatus may include means for receiving an uplink grant of resources of an uplink channel for an uplink message by the UE, the uplink grant indicating to transmit an ECP at a start of the resources of the uplink grant, performing an LBT procedure based on the receiving the uplink grant, and transmitting, on the resources of the uplink channel, the ECP according to the start of the resources of the uplink grant followed by a first symbol of one or more symbols of the uplink message, the ECP based on the first symbol.

A non-transitory computer-readable medium storing code for wireless communications at a UE is described. The code may include instructions executable by a processor to receive an uplink grant of resources of an uplink channel for an uplink message by the UE, the uplink grant indicating to transmit an ECP at a start of the resources of the uplink grant, perform an LBT procedure based on the receiving the uplink grant, and transmit, on the resources of the uplink channel, the ECP according to the start of the resources of the uplink grant followed by a first symbol of one or more symbols of the uplink message, the ECP based on the first symbol.

Some examples of the method, apparatuses, and non-transitory computer-readable medium described herein may further include operations, features, means, or instructions for performing the LBT procedure in a window before transmitting the ECP.

Some examples of the method, apparatuses, and non-transitory computer-readable medium described herein may further include operations, features, means, or instructions for transmitting the ECP followed by the first symbol of the one or more symbols the uplink message based on a duration between when the uplink grant may be received and the start of the resources of the uplink grant.

Some examples of the method, apparatuses, and non-transitory computer-readable medium described herein may further include operations, features, means, or instructions for rating matching a transport block based on the one or more symbols of the uplink message.

In some examples of the method, apparatuses, and non-transitory computer-readable medium described herein, the ECP ends at a symbol boundary of the uplink channel.

In some examples of the method, apparatuses, and non-transitory computer-readable medium described herein, the ECP and the uplink channel may be in a same slot.

A method of wireless communications at a base station is described. The method may include receiving, from a UE, an indication of a UE capability to support an ECP, transmitting, to the UE, an indication for the UE to transmit an uplink message on resources of an uplink channel, determining a duration of the ECP associated with the resources of the uplink channel, and receiving, on the resources of the uplink channel, the ECP according to the determined duration followed by a first symbol of one or more symbols of the uplink message, the ECP based on the first symbol.

An apparatus for wireless communications at a base station is described. The apparatus may include a processor, memory coupled with the processor, and instructions stored in the memory. The instructions may be executable by the processor to cause the apparatus to receive, from a UE, an indication of a UE capability to support an ECP, transmit, to the UE, an indication for the UE to transmit an uplink message on resources of an uplink channel, determine a duration of the ECP associated with the resources of the uplink channel, and receive, on the resources of the uplink channel, the ECP according to the determined duration followed by a first symbol of one or more symbols of the uplink message, the ECP based on the first symbol.

Another apparatus for wireless communications at a base station is described. The apparatus may include means for receiving, from a UE, an indication of a UE capability to support an ECP, transmitting, to the UE, an indication for the UE to transmit an uplink message on resources of an uplink channel, determining a duration of the ECP associated with the resources of the uplink channel, and receiving, on the resources of the uplink channel, the ECP according to the determined duration followed by a first symbol of one or more symbols of the uplink message, the ECP based on the first symbol.

A non-transitory computer-readable medium storing code for wireless communications at a base station is described. The code may include instructions executable by a processor to receive, from a UE, an indication of a UE capability to support an ECP, transmit, to the UE, an indication for the UE to transmit an uplink message on resources of an uplink channel, determine a duration of the ECP associated with the resources of the uplink channel, and receive, on the resources of the uplink channel, the ECP according to the determined duration followed by a first symbol of one or more symbols of the uplink message, the ECP based on the first symbol.

Some examples of the method, apparatuses, and non-transitory computer-readable medium described herein may further include operations, features, means, or instructions for receiving an indication of an amount of ECP that is supported by the UE.

In some examples of the method, apparatuses, and non-transitory computer-readable medium described herein, the amount of supported ECP includes a number of absolute time units, a number of symbols, or a combination thereof.

In some examples of the method, apparatuses, and non-transitory computer-readable medium described herein, the amount of supported ECP is based on a subcarrier spacing of the uplink channel or is the same for any subcarrier spacing of the uplink channel.

Some examples of the method, apparatuses, and non-transitory computer-readable medium described herein may further include operations, features, means, or instructions for transmitting, to the UE, a configuration of a plurality of offsets for transmitting the ECP, the plurality of offsets based on the indication of the UE capability.

A method of wireless communications at a base station is described. The method may include determining a duration for an ECP based on a symbol duration, a duration for an LBT procedure, and a gap between downlink and uplink slots, transmitting, to a UE, an uplink grant indicating resources of an uplink channel and an indication of the ECP for the uplink channel, the indication of the ECP including the determined duration, and receiving, on the resources of the uplink channel, the ECP according to the determined duration followed by a first symbol of one or more symbols the uplink channel, the ECP based on the first symbol.

An apparatus for wireless communications at a base station is described. The apparatus may include a processor, memory coupled with the processor, and instructions stored in the memory. The instructions may be executable by the processor to cause the apparatus to determine a duration for an ECP based on a symbol duration, a duration for an LBT procedure, and a gap between downlink and uplink slots, transmit, to a UE, an uplink grant indicating resources of an uplink channel and an indication of the ECP for the uplink channel, the indication of the ECP including the determined duration, and receive, on the resources of the uplink channel, the ECP according to the determined duration followed by a first symbol of one or more symbols the uplink channel, the ECP based on the first symbol.

Another apparatus for wireless communications at a base station is described. The apparatus may include means for determining a duration for an ECP based on a symbol duration, a duration for an LBT procedure, and a gap between downlink and uplink slots, transmitting, to a UE, an uplink grant indicating resources of an uplink channel and an indication of the ECP for the uplink channel, the indication of the ECP including the determined duration, and receiving, on the resources of the uplink channel, the ECP according to the determined duration followed by a first symbol of one or more symbols the uplink channel, the ECP based on the first symbol.

A non-transitory computer-readable medium storing code for wireless communications at a base station is described. The code may include instructions executable by a processor to determine a duration for an ECP based on a symbol duration, a duration for an LBT procedure, and a gap between downlink and uplink slots, transmit, to a UE, an uplink grant indicating resources of an uplink channel and an indication of the ECP for the uplink channel, the indication of the ECP including the determined duration, and receive, on the resources of the uplink channel, the ECP according to the determined duration followed by a first symbol of one or more symbols the uplink channel, the ECP based on the first symbol.

A method of wireless communications at a base station is described. The method may include transmitting, to a UE, an uplink grant of resources of an uplink channel for an uplink message by the UE, the uplink grant indicating to transmit an ECP at a start of the resources of the uplink grant and receiving, on the resources of the uplink channel, the ECP according to the start of the resources of the uplink grant followed by a first symbol of one or more symbols the uplink channel, the ECP based on the first symbol.

An apparatus for wireless communications at a base station is described. The apparatus may include a processor, memory coupled with the processor, and instructions stored in the memory. The instructions may be executable by the processor to cause the apparatus to transmit, to a UE, an uplink grant of resources of an uplink channel for an uplink message by the UE, the uplink grant indicating to transmit an ECP at a start of the resources of the uplink grant and receive, on the resources of the uplink channel, the ECP according to the start of the resources of the uplink grant followed by a first symbol of one or more symbols the uplink channel, the ECP based on the first symbol.

Another apparatus for wireless communications at a base station is described. The apparatus may include means for transmitting, to a UE, an uplink grant of resources of an uplink channel for an uplink message by the UE, the uplink grant indicating to transmit an ECP at a start of the resources of the uplink grant and receiving, on the resources of the uplink channel, the ECP according to the start of the resources of the uplink grant followed by a first symbol of one or more symbols the uplink channel, the ECP based on the first symbol.

A non-transitory computer-readable medium storing code for wireless communications at a base station is described. The code may include instructions executable by a processor to transmit, to a UE, an uplink grant of resources of an uplink channel for an uplink message by the UE, the uplink grant indicating to transmit an ECP at a start of the resources of the uplink grant and receive, on the resources of the uplink channel, the ECP according to the start of the resources of the uplink grant followed by a first symbol of one or more symbols the uplink channel, the ECP based on the first symbol.

BRIEF DESCRIPTION OF THE DRAWINGS

FIGS. 5A and 5B illustrate examples of uplink channel allocations that support ECPs in accordance with aspects of the present disclosure.

FIGS. 6A and 6B illustrate examples of uplink control information (UCI) multiplexing timelines that support ECPs in accordance with aspects of the present disclosure.

DETAILED DESCRIPTION

Figure 1:
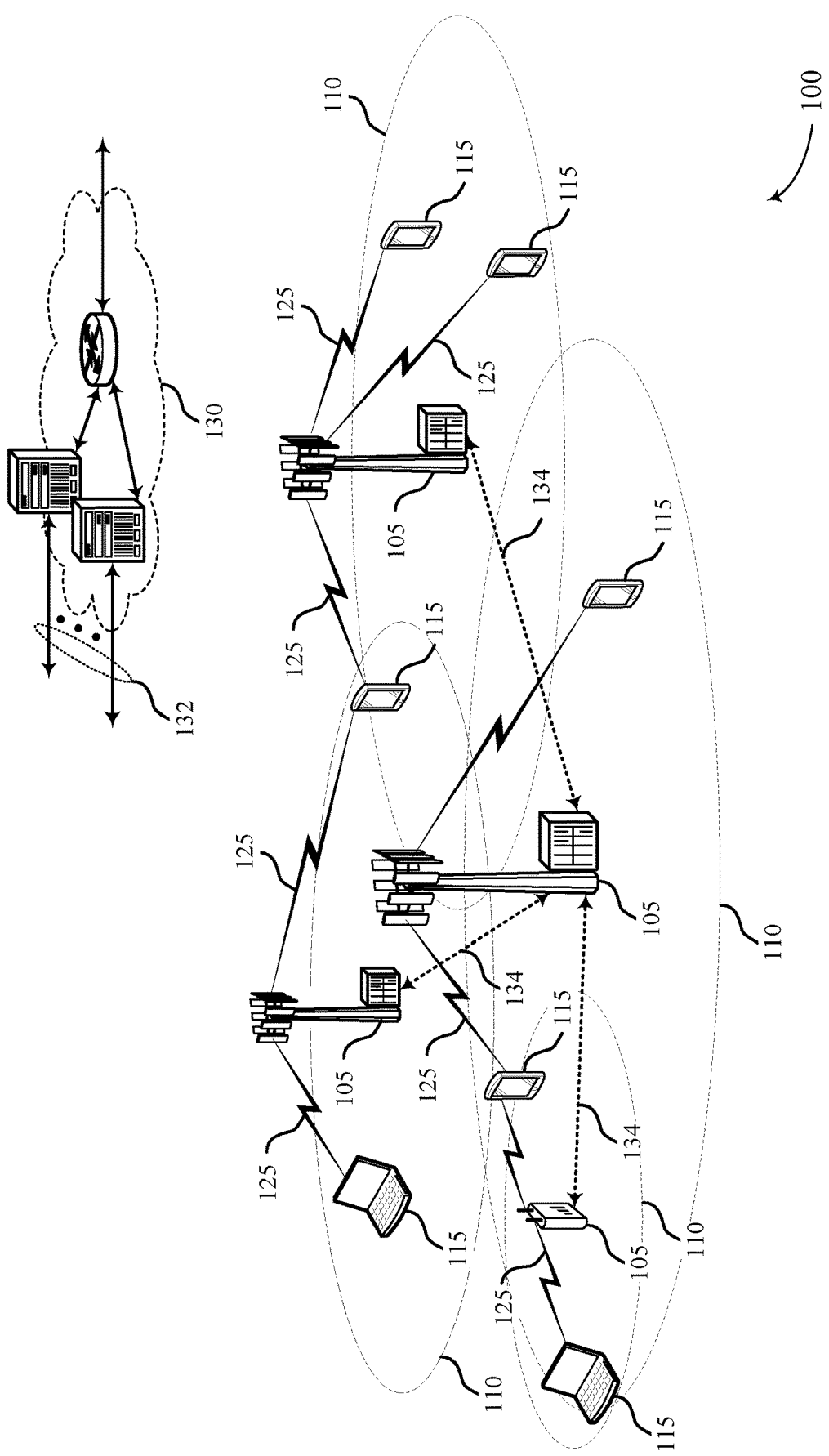
FIG. 1 illustrates an example of a system for wireless communications that supports uplink channel timelines with extended cyclic prefixes (ECPs) in accordance with aspects of the present disclosure.

In some wireless communications systems, a user equipment (UE) may use a cyclic prefix (CP) to provide a guard period at the start of a symbol (e.g., orthogonal frequency division multiplexing (OFDM) symbol) which provides protection against multi-path delay spread. For example, the CP may be generated by copying the end of the main body of the symbol to a beginning of the symbol, such that a frequency domain representation of each delay spread component within a fast Fourier transform (FFT) processing window is the same.

As described herein, in some cases, a UE may use an extended CP (ECP) length for different scenarios (e.g., high delay spread scenarios). For example, the ECP may be used to create a gap of a specific duration (e.g., 16 microseconds (μs), 25 μs, etc.) to satisfy regulatory or specification requirements on gaps between base station and UE transmissions and/or to create listen-before-talk (LBT) gaps for the UE prior to its transmissions. However, based on using the ECP, different issues may arise, such as UEs may have a limit for an ECP duration support not known by the network, UEs may be expected to transmit an uplink channel at a certain time that is unattainable with the ECP, or the UE may be expected to transmit and/or multiplex uplink control information (UCI) in an uplink channel where timelines become tighter with the ECP.

As described herein, a new UE capability may be introduced for the UE to indicate support of the ECP and/or an amount of ECP (e.g., ECP duration) supported. In some cases, a base station may configure offsets based on these capabilities, or the UE may select an offset from an available set of offsets based on these capabilities. Additionally or alternatively, the UE may receive an uplink grant to transmit an uplink message at a symbol N with an indication of the ECP, and the UE may determine whether to honor the uplink grant based on a timeline of symbols before symbol N, where the timeline is based on a minimum number of symbols (e.g., N2 symbols) required by the UE between reception of the uplink grant and symbol N, the ECP, and a timing advance (TA). In some cases, the UE may shorten the indicated ECP based on the timeline in order to transmit both the ECP and the uplink message. Additionally or alternatively, an uplink channel allocation indicated in the uplink grant may include a starting point in the allocation that includes the ECP, such that the UE transmits the ECP starting at the indicated start of the allocation. In some cases, the ECP and the uplink channel may be within one slot.

Additionally, the UE may be expected to multiplex uplink control information (UCI) in the uplink channel based on a UE capability of a minimum number of symbols (e.g., Z symbols) required between an event that triggers the UCI (e.g., triggering event) and when the uplink channel begins. In some cases, the UE may determine which symbol in the uplink channel to multiplex with the UCI based on a timeline (e.g., Z') that is further based on the minimum number of symbols (Z), the ECP, and a TA. Additionally or alternatively, the UE may determine to multiplex the UCI if the triggering event is identified a number of symbols prior to the start of the uplink channel based on the timeline (Z'). In some cases, the UE may drop one of the uplink channel carrying the uplink message or an uplink channel carrying the UCI based on priority rules or may not expect to receive the uplink grant or the triggering event such that processing both at the same time would affect the ability of the UE to multiplex the uplink message and the UCI.

Aspects of the disclosure are initially described in the context of a wireless communications system. Additionally, aspects of the disclosure are illustrated through an additional wireless communications system, an ECP duration, an uplink channel scheduling timeline, uplink channel allocations, UCI multiplexing timelines, and process flows. Aspects of the disclosure are further illustrated by and described with reference to apparatus diagrams, system diagrams, and flowcharts that relate to uplink channel timelines with extended cyclic prefixes.

FIG. 1 illustrates an example of a wireless communications system 100 that supports uplink channel timelines with extended cyclic prefixes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Additionally, as described herein, wireless communications system 100 may use a CP to provide a guard period at the start of each OFDMA symbol which provides protection against multi-path delay spread. The CP may be generated by copying the end of the main body of the OFDMA symbol to a beginning of the OFDMA symbol, such that a frequency domain representation of each delay spread component within an FFT processing window is the same. Both a normal CP (NCP) and an ECP length may be specified in systems. In some cases, the NCP may be intended to be sufficient for a majority of scenarios, and the ECP may be intended for scenarios with relatively high delay spread.

In some wireless communications systems (e.g., NR unlicensed (NR-U) communications), the ECP may be used to create a gap of a specific duration (e.g., 16 μs, 25 μs, etc.) to satisfy regulatory or specification requirements on gaps between a base station 105 and a UE 115 transmissions and/or to create listen-before-talk (LBT) gaps for the UE 115 prior to its transmissions. For example, a UE 115 may transmit an ECP of a first allocated physical uplink shared channel (PUSCH) symbol (e.g., uplink channel symbol, a first symbol of one or more symbols of an uplink channel, an OFDMA symbol, etc.). For a scheduled PUSCH (e.g., a scheduled uplink (SUL)), an amount of the ECP (e.g., ECP duration) may be indicated in an uplink grant for the scheduled PUSCH. In some cases, the amount of the ECP may also depend on a TA at the UE 115 (e.g., that a base station 105 may not be aware of).

Additionally or alternatively, for a configured grant PUSCH (CG-PUSCH) (e.g., for resource overloading), the UE 115 may be provided with a specific starting offset or a set of starting offsets (e.g., from which the UE 115 picks a starting offset to use randomly) that provides a starting point before the normal PUSCH data/a pilot starting symbol. In some cases, the ECP of a first symbol may be used to transmit between the starting point offset to the first symbol of the PUSCH. As such, multiple UEs 115 that transmit occasionally (e.g., based on respective configured grants) may be assigned a same resource. For example, a collision when two UEs 115 attempt a transmission on same resource may be avoided by the two UEs 115 having different starting offsets (e.g., in combination with an LBT procedure). In some cases, a UE 115 with an earlier starting point that starts transmitting may cause an LBT of a UE 115 with a later starting point to fail, and, hence, collisions may be reduced.

In some cases, for an ECP prior to at least a dynamically scheduled PUSCH transmission, the ECP may be located in one or more symbols immediately preceding the PUSCH allocation (e.g., indicated by a start and length indicator value (SLIV)). The supported durations for an ECP at a UE 115 may be zero (0) (e.g., no extension to a CP is supported), $C1*$symbol length–25 μs; $C2*$symbol length–16 μs–TA, or $C3*$symbol length–25 μs–TA. Accordingly, C1 may equal one (1) for a 15 kHz subcarrier spacing (SCS) and for a 30 kHz SCS or may equal two (2) for a 60 kHz SCS. Additionally, C2 and/or C3 may be fixed constants or may be implicitly derived based on a TA for each SCS. In some cases, a timeline that indicates a minimum number of symbols between an uplink grant to an indicated PUSCH (e.g., N2 timeline, N2 symbols, an uplink grant to physical uplink control channel (PUCCH) delay, etc.) may be relaxed to take the ECP into account. In some cases, a limit bounding a resulting ECP may be less than or equal to one (1) symbol for a given SCS or may be relaxed (e.g., greater than one (1) symbol). Additionally, the ECP may be used for other uplink transmissions. In some cases, the number of durations for an ECP that the UE 115 can use may be signaled dynamically or may be configured.

However, based on using the ECP, different issues may arise, such as UEs 115 may have a limit for an ECP duration support not known by the network (e.g., a base station 105), UEs 115 may be expected to transmit an uplink channel at a certain time that is unattainable with the ECP, and/or a UE 115 may be expected to transmit and/or multiplex UCI in an uplink channel where timelines become tighter with the ECP.

Wireless communications system 100 may support efficient techniques for use of an ECP. For example, a new UE capability may be introduced for a UE 115 to indicate support of the ECP, where a duration of the ECP or a determination to transmit the ECP is based on the UE capability. Additionally or alternatively, the UE 115 may receive an uplink grant to transmit an uplink message at a symbol N with an indication of the ECP, and the UE 115 may determine whether to honor the uplink grant based on a timeline of symbols before symbol N, where the timeline is based on a minimum number of symbols (e.g., N2 symbols) required by the UE 115 between reception of the uplink grant and symbol N, the ECP, and a TA. Additionally or alternatively, an uplink channel allocation indicated in the uplink grant may include a starting point in the allocation that includes the ECP, such that the UE 115 transmits the ECP starting at the indicated start of the allocation. In some cases, the UE 115 may multiplex UCI in the uplink channel based on a timeline (e.g., Z') that is further based on the minimum number of symbols (Z) required between receiving a triggering event for the UCI and a start of an uplink channel for transmitting the UCI, the ECP, and a TA.

Figure 2:
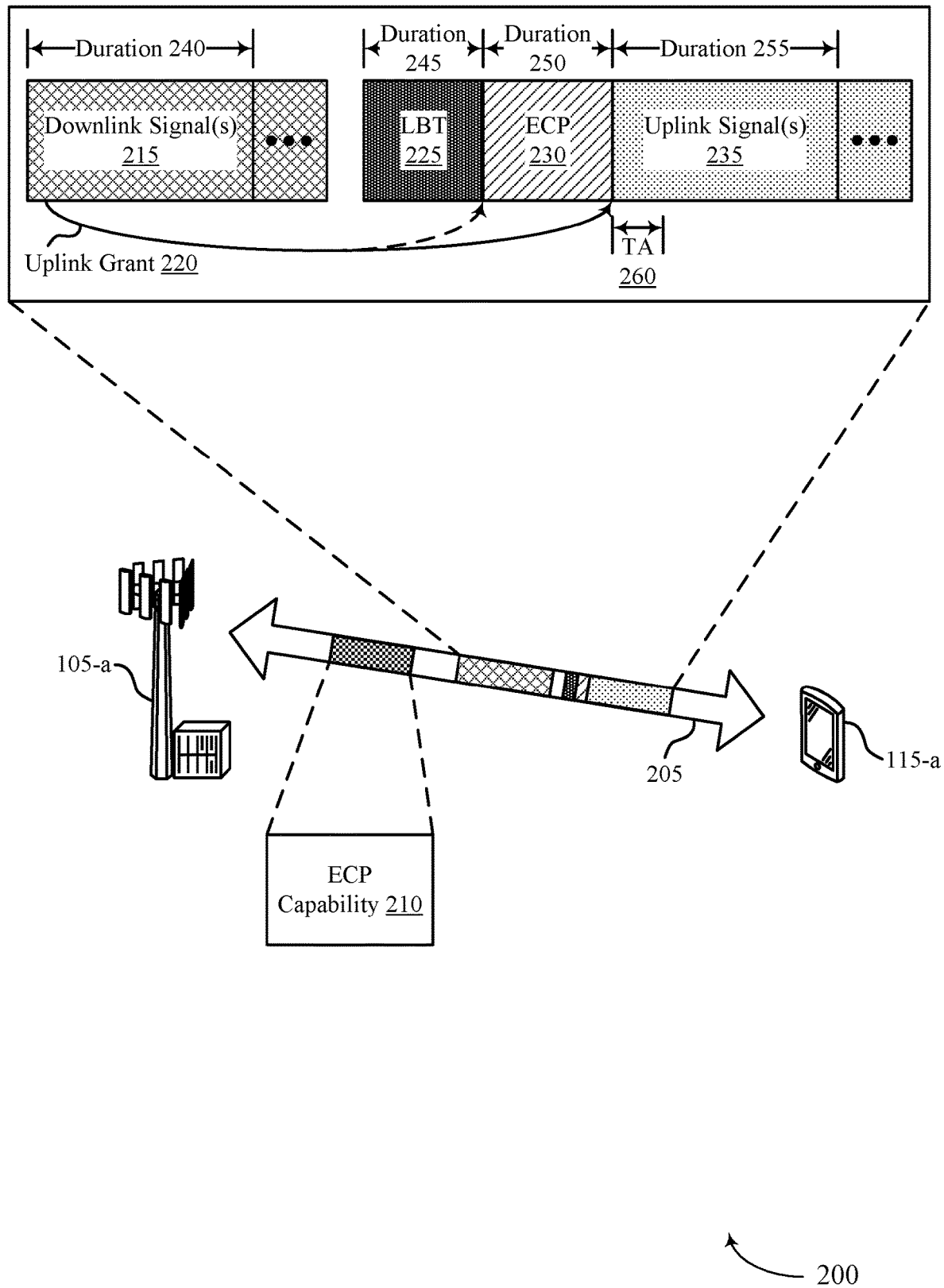
FIG. 2 illustrates an example of a wireless communications system that supports uplink channel timelines with ECPs in accordance with aspects of the present disclosure.

FIG. 2 illustrates an example of a wireless communications system 200 that supports uplink channel timelines with extended cyclic prefixes in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. In some cases, base station 105-*a* and UE 115-*a* may communicate on resources of a carrier 205. Additionally, carrier 205 may include resources in an unlicensed band (e.g., NR-U communications).

As described herein, UE 115-*a* may transmit an indication of an ECP capability 210 (e.g., a UE capability to support an ECP) to base station 105-*a*. For example, UE 115-*a* may have a limit on how much ECP that UE 115-*a* can support and may indicate this limit in the ECP capability 210. Accordingly, ECP capability 210 may include a UE capability of an amount of ECP supported (e.g., an ECP duration). For example, the amount of ECP supported may be in absolute time units (e.g., seconds), a number of symbols (e.g., one (1) symbol, two (2) symbols, etc.), or a combination thereof. Additionally, the capability of the amount of ECP supported may be different for different SCSs (e.g., a same duration in time but a different number of OFDM symbols for different SCSs) or may be the same for all SCSs. For example, the amount of ECP supported may be one (1) symbol for any SCS, or may be one (1) symbol for a 15 kHz SCS, two (2) symbols for a 30 kHz SCS, etc.

Additionally or alternatively, base station 105-*a* may configure (e.g., via RRC signaling) a set of offsets that are within a limit indicated by ECP capability 210. For example, base station 105-*a* may configure a set of offsets that are below an ECP duration limit indicated by the ECP capability 210 (e.g., UE capability), and UE 115-*a* may use one of the offsets or an indicated offset when transmitting an ECP followed by an uplink signal. In some cases, a set of offsets may be configured (e.g., via RRC signaling from base station 105-*a*) or available to UE 115-*a* without taking ECP capability 210 into account, and UE 115-*a* may select an ECP duration from a subset of the set of offsets, where the subset are also within ECP capability 210. For example, the complete set of available offsets may be 0, 9, 18, . . . 72 μs (e.g., in increments of 9 μs up to 72 μs), but UE 115-*a* may pick randomly from 0 to 36 μs based on ECP capability 210 including a limit for an ECP duration of 36 μs.

As shown in FIG. 2, after ECP capability is transmitted to base station 105-*a*, base station 105-*a* and UE 115-*a* may subsequently communicate on resources of carrier 205 based on included an ECP 230 when UE 115-*a* transmits to base station 105-*a*. For example, base station 105-*a* may transmit one or more downlink signals 215 to UE 115-*a*. In some cases, the downlink signals 215 may include an uplink grant 220 that indicates for UE 115-*a* to transmit at least one uplink signal 235. However, prior to transmitting the one or more uplink signals 235, UE 115-*a* may perform an LBT 225 (e.g., an LBT procedure, a clear channel assessment (CCA), etc.) based on communicating with base station 105-*a* in an unlicensed band (e.g., unlicensed frequency band, NR-U, etc.). For example, LBT 225 may include UE 115-*a* listening to uplink resources indicated by uplink grant 220 for transmitting the one or more uplink signals 235 to determine whether the channel is clear before attempting to transmit on the uplink resources. Accordingly, if UE 115-*a* detects a signal (e.g., above a threshold power value, for example) on the uplink resources during LBT 225, UE 115-*a* may refrain from transmitting the uplink signals 235. Alternatively, if UE 115-*a* does not detect a signal, UE 115-*a* may proceed with transmitting the uplink signals 235.

However, prior to transmitting the uplink signals 235 after determining LBT 225 is successful (e.g., the resources are available/clear), UE 115-*a* may first transmit an ECP 230 based on transmitting ECP capability 210 previously. Subsequently, after transmitting ECP 230, UE 115-*a* may then transmit the uplink signal(s) 235 indicated by uplink grant 220.

Each of the downlink signal(s) 215, LBT 225, ECP 230, and the uplink signal(s) 235 may have a corresponding duration. For example, the downlink signal(s) 215 and the uplink signal(s) 235 may have a duration 240 and a duration 255, respectively, that are divided into slots that include multiple symbols, where the length of the symbols depend on the SCS, type of slot (e.g., mini-slot, conventional slot, etc.), etc. In some cases, the length of the symbol in a slot may be defined as $T_s$. Based on transmitting ECP 230, the number of symbols in a slot for duration 240 or duration 255 may be 12 symbols. Additionally, LBT 225 may have a duration 245 that is based on the type of LBT performed (e.g., 16 μs, 25 μs, etc.). Subsequently, a duration 250 for ECP 230 may be defined as a length of a symbol in a slot minus the duration 245 (e.g., the length of LBT 225). For example, for an LBT duration of 25 μs, duration 250 may equal Ts−25 μs.

In some cases, UE 115-*a* may use a timing advance, TA 260, when transmitting uplink signal(s) 235. For example, UE 115-*a* and base station 105-*a* may experience propagation delays for communications between them (e.g., uplink and downlink transmissions). Accordingly, uplink grant 220 may be transmitted by base station 105-*a* that grants UE 115-*a* access to resources for uplink signal(s) 235. Subsequently, UE 115-*a* may utilize the granted resources but may apply a time advance so that the uplink signal(s) arrive at base station 105-*a* at an expected time. The time advance (e.g., TA 260) may be indicated in a TA command sent to UE 115-*a* by base station 105-*a*. Accordingly, TA 260 may indicate a time advance (or negative delay) for uplink signal(s) 235 with respect to a received downlink timing (e.g., uplink grant 220 in downlink signal(s) 215) in order to ensure a same uplink receive timing at base station 105-*a* (e.g., to align the times of arrival for multiple uplink transmissions to different base stations 105, for example). As such, when transmitting TA 260, duration 250 for ECP 230 may be affected. For example, duration 250 may equal Ts−25 μs−TA.

Additionally, in some cases, UE 115-*a* may have buffer restrictions that affect transmitting ECP 230 and uplink signal(s) 235. For example, UE 115-*a* may have buffer restrictions on data length for a transmission for a given grant. As an example, if UE 115-*a* is limited to holding one (1) slot of data for uplink signal(s) 235 and uplink grant 220 indicates an allocation of one (1) slot, when UE 115-*a* transmits ECP 230, the length of the uplink signal(s) 235 plus ECP 230 may exceed the one (1) slot limit.

Accordingly, the length of uplink signal(s) 235 indicated by uplink grant 220 (e.g., duration 255) including ECP 230

(e.g., duration 250) may be restricted to a maximum of one (1) slot or two (2) slots or may be a configured UE capability. That is, duration 250 plus duration 255 may not exceed one (1) slot or two (2) slots. For example, when ECP 230 is enabled to be transmitted, the length of a PUSCH indicated in uplink grant 220 may be appropriately reduced based on a UE capability (e.g., limit for holding data) such that a total duration for uplink signal(s) 235 and ECP 230 does not exceed the UE capability. Additionally or alternatively, a beginning of the combined ECP 230 and uplink signal(s) 235 (e.g., ECP+PUSCH) may not cross a slot boundary. Additionally, an end of uplink signal(s) 235 (e.g., PUSCH) may not cross a slot boundary and/or the combination of ECP 230 and uplink signal(s) 235 (e.g., ECP+PUSCH) may be within a slot.

In some cases, UE 115-a may determine whether to transmit ECP 230 and uplink signal(s) 235 based on information included in uplink grant 220. For example, uplink grant 220 may include an indication of ECP 230 (e.g., duration 250 of ECP 230, an indication to transmit ECP 230, etc.). Accordingly, UE 115-a may determine whether to transmit uplink signal(s) 235 (and ECP 230) based on when uplink grant 220 is received prior to an indicated start of uplink signal(s) 235, transmitting ECP 230, performing LBT 225, etc. In some cases, uplink grant 220 may include an indication of an allocation of uplink resources for UE 115-a to transmit both ECP 230 and uplink signal(s) 235. For example, UE 115-a may transmit ECP 230 starting at the indication of the allocation of uplink resources followed by the uplink signal(s) 235.

Figure 3:
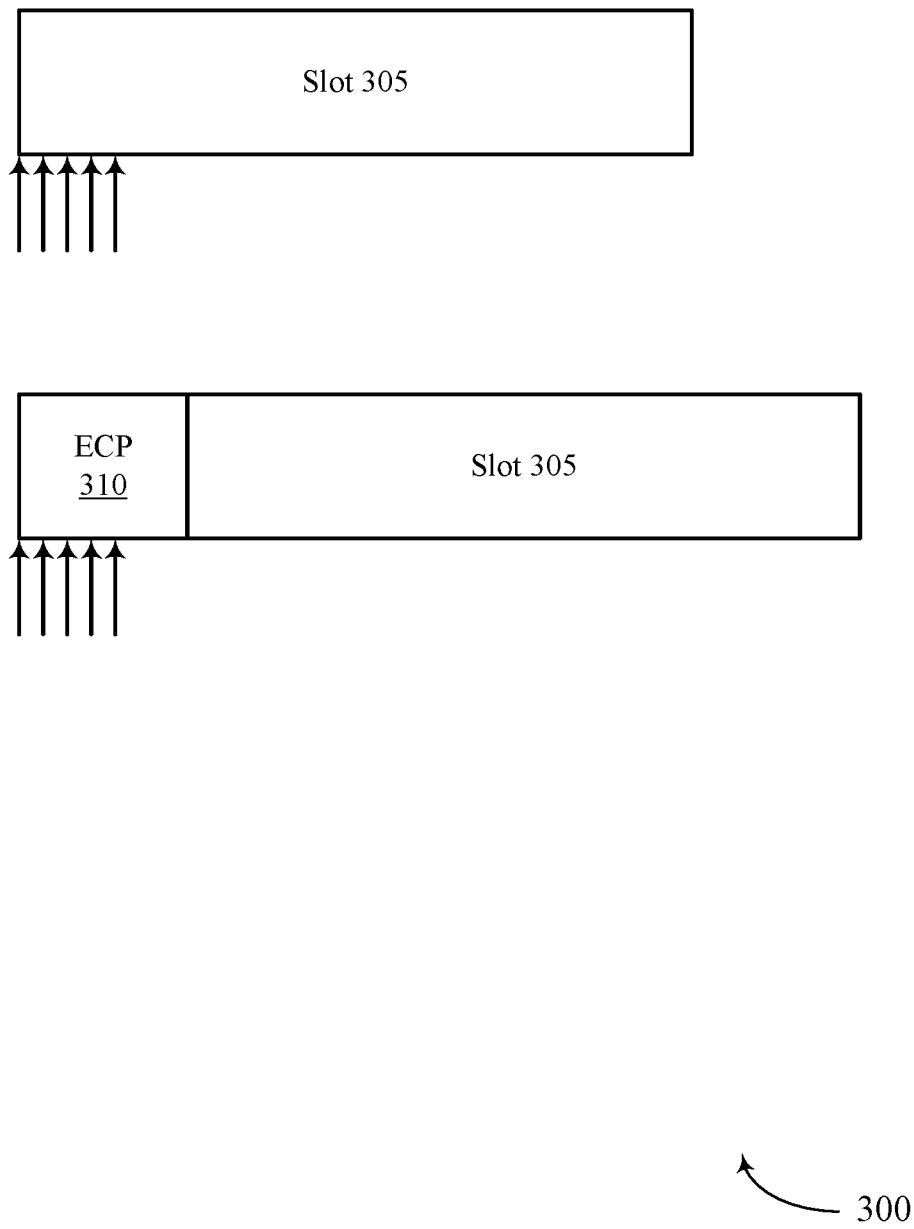
FIG. 3 illustrates an example of an ECP duration that supports uplink channel timelines in accordance with aspects of the present disclosure.

FIG. 3 illustrates an example of an ECP duration 300 that supports uplink channel timelines with extended cyclic prefixes in accordance with aspects of the present disclosure. In some examples, ECP duration 300 may implement aspects of wireless communications systems 100 and/or 200. A UE 115 may use ECP duration 300 when transmitting an ECP 310 before transmitting an uplink signal in a slot 305 to a base station 105.

Conventionally, a starting time offset may be applied by the UE 115 at the beginning of a transmitted burst with a configured grant (CG) resource at the start of the transmission burst. For example, as shown, ECP 310 may be added before slot 305 configured to carry uplink signal from the UE 115 to the base station 105. In some cases, this starting time offset may be RRC configured and defined as a length of ECP 310 of the first symbol that is located before the configured resource (e.g., slot 305). Regardless of an SCS, a duration of ECP 310 may be up to 72 µs with a granularity of nine (9) µs.

In some cases, multiple UEs 115 may be granted to transmit on the same slot 305, and each UE 115 may choose a different starting offset in ECP 310. Since the UEs 115 may need to perform an LBT before transmission, the UE 115 that started earlier will block the later one. Accordingly, the CG-PUSCH resources may be overbooked (e.g., not all UEs 115 will want to use the resource at a given time). Since ECP 310 is transmitted before the configured resource (e.g., slot 305), issues may arise for the CG-PUSCH. For example, timelines for multiplexing UCI with the CG-PUSCH may be impacted by the ECP 310 and/or a UE capability for a length of the ECP 310 that can be supported may need to be indicated. As such, the techniques as described herein may mitigate these issues.

Figure 4:
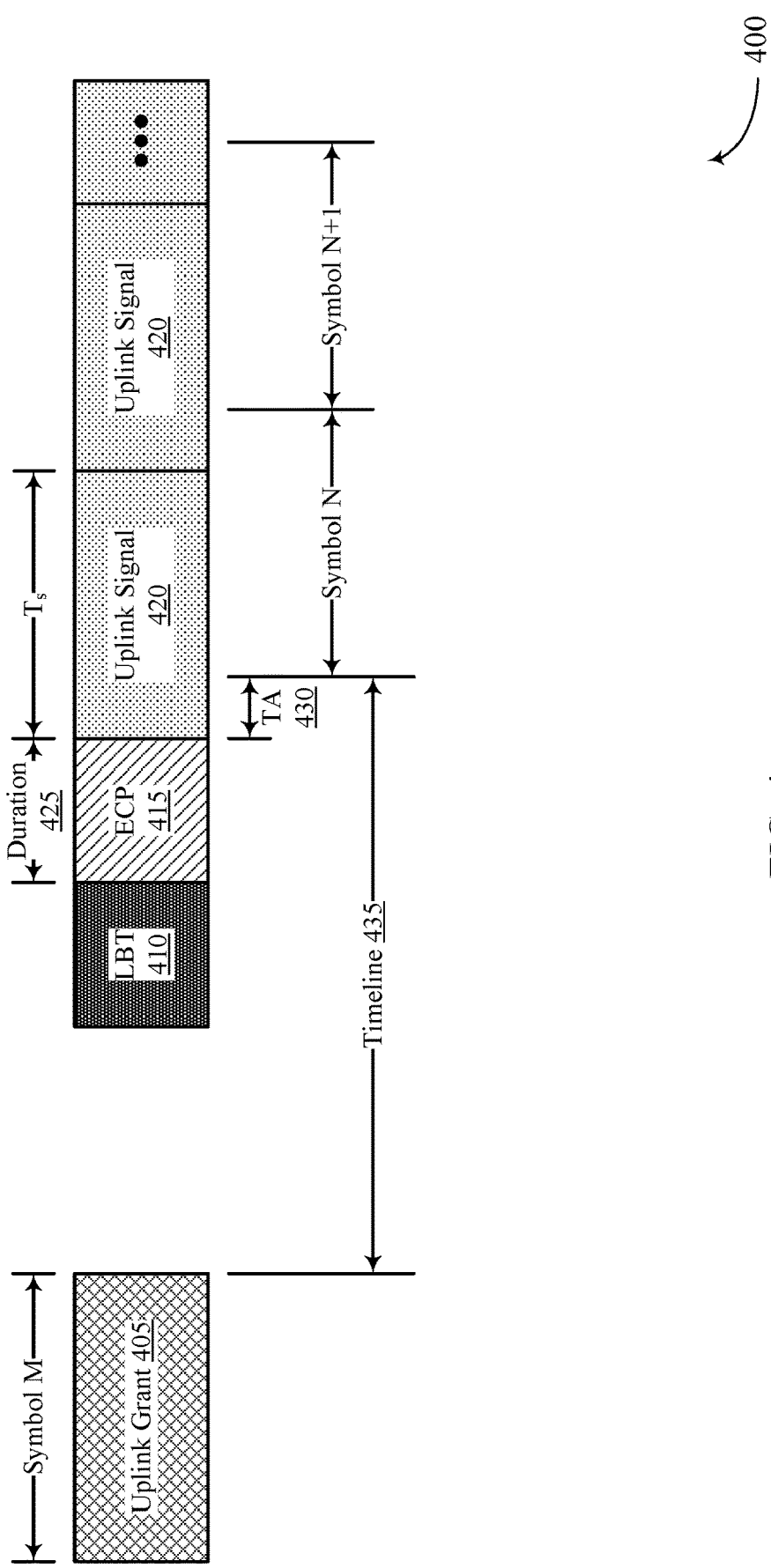
FIG. 4 illustrates an example of an uplink channel scheduling timeline that supports ECPs in accordance with aspects of the present disclosure.

FIG. 4 illustrates an example of an uplink channel scheduling timeline 400 that supports uplink channel timelines with extended cyclic prefixes in accordance with aspects of the present disclosure. In some examples, uplink channel scheduling timeline 400 may implement aspects of wireless communications systems 100 and/or 200. As described herein, a UE 115 may use uplink channel scheduling timeline 400 when transmitting an uplink signal with an ECP 415 to a base station 105. In some cases, the UE 115 may use uplink channel scheduling timeline 400 for SUL transmissions.

Conventionally, for a PUSCH scheduling timeline, with no ECP 415, the UE 115 may be expected to transmit a PUSCH at a symbol N if an uplink grant is received (e.g., given) at least N2 symbols earlier, where N2 is dependent on UE capability. However, the UE 115 may not be able to meet the same timeline of N2 symbols if the UE 115 transmits the ECP 415. Additionally, the N2 capability may not consider a TA 430.

Accordingly, to mitigate this issue, the UE 115 may receive an uplink grant 405 (e.g., with a duration of a symbol M) that includes an indication of an ECP 415, where uplink grant 405 indicates for the UE 115 to transmit an uplink signal 420 starting at a symbol N (e.g., a starting point without considering ECP 415). For example, the indication of ECP 415 may include an indication of a duration 425 for ECP 415 (e.g., duration 425 of ECP 415 may equal 0.5 symbols, one (1) symbol–25 µs, two (2) symbols–TA–25 µs, . . . , etc. Additionally, duration 425 for ECP 415 may be a fractional number of symbols. In some cases, the UE 115 may also perform an LBT 410 prior to transmitting ECP 415 and uplink signal 420. Additionally, in some cases, the UE 115 may use a TA 430 when transmitting the uplink signal 420. Uplink signal 420 may include a duration $T_s$ (e.g., the length of a symbol in a slot).

Subsequently, the UE 115 may determine to honor uplink grant 405 (e.g., transmit uplink signal 420 and ECP 415 as indicated in uplink grant 405) if uplink grant 405 is received at least a number of symbols before symbol N. In some cases, this number of symbols may be a timeline 435 capability of the UE 115 given by f(N2, ECP, T A). For example, f(N2, ECP, TA)=N2+ECP or f(N2, ECP, TA)=N2+ceil(ECP) or f(N2, ECP, TA)=N2+ECP+TA or f(N2, ECP, TA)=N2+ceil(ECP+TA) or f(N2, ECP, TA)=N2+ceil(max (ECP+TA)) or f(N2, ECP, TA)=N2+ceil(ECP). The maximum may be over all possible values of ECP and/or TA (e.g., multiple ECPs or CG-PUSCH starting offsets may be pre-configured for the UE to choose and maximum may be over all these ECPs). In some cases, the different ceil(x) parameters may represent a ceiling function that takes a real number input calculated by x (e.g., a decimal number in some cases) and outputs an integer greater than or equal to the real number input (e.g., the ceiling function rounds the real number up to the highest whole number of the real number input, such as 2.4 becomes 3 or 2.8 also becomes 3). In some cases, f(N2, ECP, TA) may be RRC pre-configured (e.g., semi-statically configured). For example, the RRC pre-configuration may indicate that f(N2, ECP, TA)=N2+2, where two (2) (e.g., from N2+2) is a maximum possible TA+ECP, and may independent of uplink grant 405/ECP 415/TA 430.

Additionally or alternatively, the UE 115 may determine to honor uplink grant 405 even if uplink grant 405 is received between N2 to N2+f (N2, ECP, TA) earlier but may transmit ECP 415 for a reduced duration (e.g., in relation to the indicated duration 425 in uplink grant 405) depending on when uplink grant 405 is received. For example, if uplink grant 405 is received N2+TA+ECP/2 earlier than symbol N, the UE 115 may transmit ECP 415 with a duration of ECP/2 (e.g., half the duration 425 that was indicated in uplink grant 405). When reducing the duration of ECP 415 to fit the timeline 435, if an additional gap is created before ECP 415, then the UE 115 may change an LBT type of LBT 410 to satisfy the regulation for channel access. For example, when the UE 115 is configured for a no-LBT (e.g., not perform LBT 410) or for a 16 μs gap for LBT 410 and the additional gap is created with the reduced ECP 415, the UE 115 may determine to perform a 25 μs LBT (e.g., cat2 LBT) before transmitting ECP 415 and uplink signal 420.

FIGS. 5A and 5B illustrate examples of uplink channel allocations 500 and 501 that supports uplink channel timelines with extended cyclic prefixes in accordance with aspects of the present disclosure. In some examples, uplink channel allocations 500 and 501 may implement aspects of wireless communications systems 100 and/or 200. As described herein, a UE 115 may use uplink channel allocations 500 and 501 when transmitting an uplink signal with an ECP 515 to a base station 105. Additionally, uplink channel allocations 500 and 501 may be used to mitigate the issues for PUSCH scheduling timelines as described above with reference to FIG. 4. For example, uplink channel allocations 500 and 501 may represent PUSCH allocations/starting points in the allocations that include an ECP 515.

As shown, the base station 105 may transmit an uplink grant 505 that includes a PUSCH allocation that consists of a full UE transmit including a duration for ECP 515. That is, the UE 115 may transmit ECP 515 (e.g., for the next symbol of an uplink signal 520) starting at the indicated start of the allocation. Additionally, the UE 115 may transmit ECP 515 after performing an LBT 510 or applying a TA 525. In some cases, LBT 510 (e.g., an LBT measurement) may be performed in a window T_lbt before the start of transmitting ECP 515 and uplink signal 520 (e.g., T_lbt=16 μs, 25 μs, a cat4-duration, etc., as applicable). For example, as shown in uplink channel allocation 500, the PUSCH allocation may indicate a start of the PUSCH allocation as symbol K+25 μs, where the 25 μs is a duration of the LBT 510. Accordingly, the UE 115 may transmit ECP 515 for an uplink signal 520 of a symbol K+1 in the first partial symbol K (e.g., from symbol K+25 μs being less than a length of symbol K ($T_s$)).

Additionally or alternatively, as shown in uplink channel allocation 501, the PUSCH allocation may indicate a start of the allocation as symbol K+25 μs+TA. As such, if a total duration 530 of LBT 510 and TA 525 is greater than a length of symbol K (e.g., 25 μs+TA>$T_s$, where $T_s$ represents one (1) symbol duration), then the UE 115 may transmit ECP 515 for an uplink signal 520 of a symbol K+2 (e.g., a duration 535 for ECP 515 equals $2T_s$−TA−25 μs). That is, ECP 515 may fill a gap between the end of LBT 510 and TA 525 (e.g., if TA 525 is used) and a next occurring symbol boundary for transmission of the uplink signal 520, where ECP 515 ends at the symbol boundary before uplink signal 520.

Additionally or alternatively, the PUSCH allocation may indicates an LBT type for LBT 510, a start of the allocation (e.g., symbol K), and a TA delay enable/disable. Subsequently, the UE 115 may determine the start of the transmission of ECP 515 followed by uplink signal 520 from the above information. For example, the transmission may start at T_lbt or T_lbt+TA after a start of the symbol K, where T_lbt is be 0p, 16 μs, 25 μs, etc., depending on the indicated LBT type. The UE 115 may then transmit ECP 515 until the next symbol boundary. Accordingly, the UE 115 may determine the duration of ECP 515 (e.g., automatically) from T_lbt, TA, and $T_s$. For example, if T_lbt+TA<$T_s$, a duration 535 of ECP 515 may equal $T_s$−T_lbt−TA; else if $T_s$<T_lbt+TA<$2T_s$, a duration 535 of ECP 515 may be $2T_s$−T_lbt+TA; etc. As such, a full symbol for transmitting uplink signal 520 may starts at a next symbol boundary after symbol K+T_lbt+ [TA], where [TA] represents an addition of TA 525 is optional. The actual start of the full symbol for uplink signal 520 may thus be symbol K, symbol K+1, symbol K+2, . . . , symbol K+N depending on whether to delay uplink signal 520 by ECP 515 and/or TA 525 after symbol K.

In some cases, a transport block (TB) may be rate matched to a number of full symbols in the allocation transmitted for the uplink signal(s) 520 after ECP 515. Additionally, a PUSCH scheduling timeline UE capability as described above with reference to FIG. 4 may be the same for the UE 115 in uplink channel allocations 500 and 501. That is, the UE 115 may honor uplink grant 505 for transmitting at symbol N if uplink grant 505 is received at least N2 or N2+TA symbols before symbol N, where N2 depends on UE capability.

FIGS. 6A and 6B illustrate examples of UCI multiplexing timelines 600 and 601 that supports uplink channel timelines with extended cyclic prefixes in accordance with aspects of the present disclosure. In some examples, UCI multiplexing timelines 600 and 601 may implement aspects of wireless communications systems 100 and/or 200. As described herein, a UE 115 may use UCI multiplexing timelines 600 and 601 when transmitting an uplink signal with an ECP 615 to a base station 105 and when UCI is needed to be multiplexed with at least a portion of the uplink signal. In some cases, the UE 115 may use UCI multiplexing timelines 600 and 601 for both SUL and CG uplink (CG-UL) scenarios. Additionally, the UE 115 may perform an LBT 610 prior to transmitting the ECP 615, the uplink signal 620, and multiplexed UCI 635 based on communicating in an unlicensed band as described herein.

Conventionally, the UE 115 may be expected to multiplex a UCI 635 in a PUSCH (e.g., an uplink signal 620 with a duration $T_s$) based on a UE capability of Z symbols with a timeline 640, where an event trigger 605/required for the UCI 635 occurred at least Z symbols earlier before the PUSCH occurs (e.g., slot N). If the UCI 635 includes acknowledgment (ACK)/negative ACK (NACK) feedback for a downlink shared channel (e.g., a physical downlink shared channel (PDSCH)) transmission, Z may be a time from an end of the downlink shared channel to a PUSCH (e.g., the PUSCH where the UCI 635 is multiplexed). Additionally or alternatively, if the UCI 635 includes channel state information (CSI) to be multiplexed in a PUSCH, Z may be a time from a downlink control channel (e.g., physical downlink control channel (PDCCH) trigger for a CSI measurement to a start of the PUSCH, or Z may be a time from a downlink CSI reference signal (CSI-RS) transmission to a start of the PUSCH. In some cases, the UE capability for Z may be different for different UCI types and/or triggering events. However, with an ECP 615 and a corresponding duration 630, UE timelines may become tighter, impacting how the UE 115 determines to multiplex the UCI 635.

As described herein, the UE 115 may determine which symbol of an uplink signal 620 (e.g., PUSCH symbol) to multiplex with an UCI 635 based on a Z', where Z'=f (Z, ECP, TA). For example, if the UE 115 is unable to multiplex the UCI 635 in a first symbol of the uplink signal 620 (e.g., of slot N) since the first symbol occurs earlier than Z', the UE 115 may multiplex the UCI 635 in a next symbol of the uplink signal 620 (e.g., a next PUSCH symbol). As shown in UCI multiplexing timeline 600, timeline 640 between receiving event trigger 605-a and the start of uplink signal 620 may be less than Z', such that the UE 115 is unable to multiplex the UCI 635 in the first symbol of slot N for uplink signal 620. In some cases, f(Z, ECP, TA)=Z+ECP or f(Z, ECP, TA)=Z+ECP+TA or f(Z, ECP, TA)=Z+ceil(ECP+TA) (e.g., ceil(x) may represent a ceiling function as described above) or f(Z, ECP, TA)=Z+max(ECP+TA) or f(Z, ECP, TA)=Z+ceil(max(ECP)) or f(Z, ECP, TA)=Z+ceil(max (ECP+TA)). The maximum may be over all possible values of ECP and/or TA (e.g., multiple ECPs or CG-PUSCH starting offsets may be pre-configured for the UE to choose, and the max(ECP) is the maximum over all pre-configured ECP values). Additionally, f(Z, ECP, TA) may be semi-statically signaled to the UE 115 (e.g., RRC configured) as a constant value based on a max(ECP+TA) or a max(ECP). For example, f(Z, ECP, TA)=Z+2 symbols, where the additional 2 symbols are configured by RRC. The maximum value may be over all possible values of ECP 615 (e.g., different ECPs may be configured for CG-PUSCH starting offsets for the UE 115 to choose from).

Additionally or alternatively, the UE 115 may determine to multiplex the UCI 635 if the event trigger 605 is Z' symbols prior to a starting symbol of uplink signal 620 (e.g., PUSCH symbol). The values of Z'=f(Z, ECP, TA) may be the same as described above. For example, as shown in UCI multiplexing timeline 601, an event trigger 605-*b* may be received based on a timeline 645 of symbols prior to the start of uplink signal 620, where timeline 645 is equal to the duration Z plus the duration 630 of ECP 615 (e.g., Z'=Z+ ECP). Accordingly, the UE 115 may determine to multiplex the UCI 635 with uplink signal 620 and may multiplex the UCI 635 in a first symbol of slot N for uplink signal 620 based on the determination.

In some cases, the UE 115 may determine to multiplex the UCI 635 with the uplink signal 620 and may multiplex the UCI 635 in a later symbol of slot N (e.g., a third symbol or fourth symbol) because the Z' timeline is too tight (e.g., the time between the UCI triggering event and the start of slot N is greater than Z but less than Z') to multiplex the UCI 635 in the first symbol of slot N for uplink signal 620.

In some cases, the timeline for the uplink signal 620 (e.g., PUSCH) transmission may be due by any one of the following: UCI Z timeline when the UCI 635 is multiplexed with the uplink signal 620 (e.g., PUSCH), which may apply to SUL and CG-UL. For example, the Z timeline may be determined from ACK/NACK UCI for a PDSCH or a UCI for CSI transmission. Additionally or alternatively, the UE 115 may use an N2 timeline (e.g., as described above with reference to FIG. 4) for a grant based PUSCH (e.g., applicable to SUL).

In some cases, if event trigger 605 that causes UCI 635 occurs between Z and Z+ECP+TA before start of the regular symbols for uplink signal 620 (e.g., for CG-UL or SUL), the UE 115 may not know how to process and prepare both UCI 635 and uplink signal 620 at the same time. Additionally or alternatively, if an uplink grant for the uplink signal 620 (e.g., applicable to SUL) occurs less than N2+ECP symbols before the uplink signal 620, the UE 115 may not be able to multiplex UCI 635 and uplink signal 620. Accordingly, in some cases, the UE 115 may use priority rules and may drop one of a PUSCH (e.g., carrying uplink signal 620) or a PUCCH (e.g., carrying UCI 635) based on the priority rules. For example, the priority may include PUCCH ACK/NACK, PUCCH CSI, PUSCH, where the UE 115 is expected to drop the PUSCH and transmit PUCCH (e.g., PUCCH has a higher priority) and/or the UE 115 transmits PUSCH and drops PUCCH.

The decision whether to drop PUSCH or PUCCH may depend on the type of PUCCH. For example, the UE 115 may drop the PUSCH if the PUCCH contains ACK/NACK feedback (e.g., prioritizing and transmitting the PUCCH and ACK/NACK feedback), whereas the UE 115 may drop the PUCCH if the PUCCH contains CSI feedback alone (e.g., prioritizing and transmitting the PUSCH). Additionally or alternatively, the UE 115 may not expect to receive an uplink grant (e.g., a PUSCH grant) and UCI triggers (e.g., event trigger 605) that lead to such situations where UCI 635 occurs between Z and Z+ECP+TA (e.g., the base station 105 may ensure this situation does not arise by scheduling the event triggers 605 earlier or perform a similar mitigation when the base station 105 identifies that the UE 115 may have to transmit with ECP 615). Additionally or alternatively, the UE 115 may not drop a PUSCH and/or PUCCH even if the triggering event occurs less than Z' symbols earlier. For example, the UE 115 may not drop either message and transmit both if the UE 115 is able to process and prepare the uplink signal 620, the UCI 635, and/or both at the same time.

In some cases, a type of LBT 610 may depend on whether the uplink signal 620 occurs inside or outside a base station 105 acquired channel occupancy time (COT). Inside a base station acquired COT, the UE 115 may use a category 2 (cat2) LBT, whereas outside of a base station acquired COT, the UE 115 may be required to use a category 4 (cat4) LBT before transmitting. The UE 115 may determine whether the uplink signal is inside or outside the base station acquired COT by decoding a PDCCH containing a slot format indicator (SFI) or COT structure indicator (COT-SI). The PDCCH containing SFI or COT-SI may be a trigger event that enables the use of cat2 LBT by the UE 115. The UE 115 may use a cat2 LBT if the trigger event occurs at least Z' symbols before the start of uplink signal 620, otherwise the UE 115 may use a cat4 LBT. The values of Z'=f(Z, ECP, TA) may be the same as described above (e.g., f(Z, ECP, TA)=Z+ ceil(max(ECP+TA)), etc.).

Figure 7:
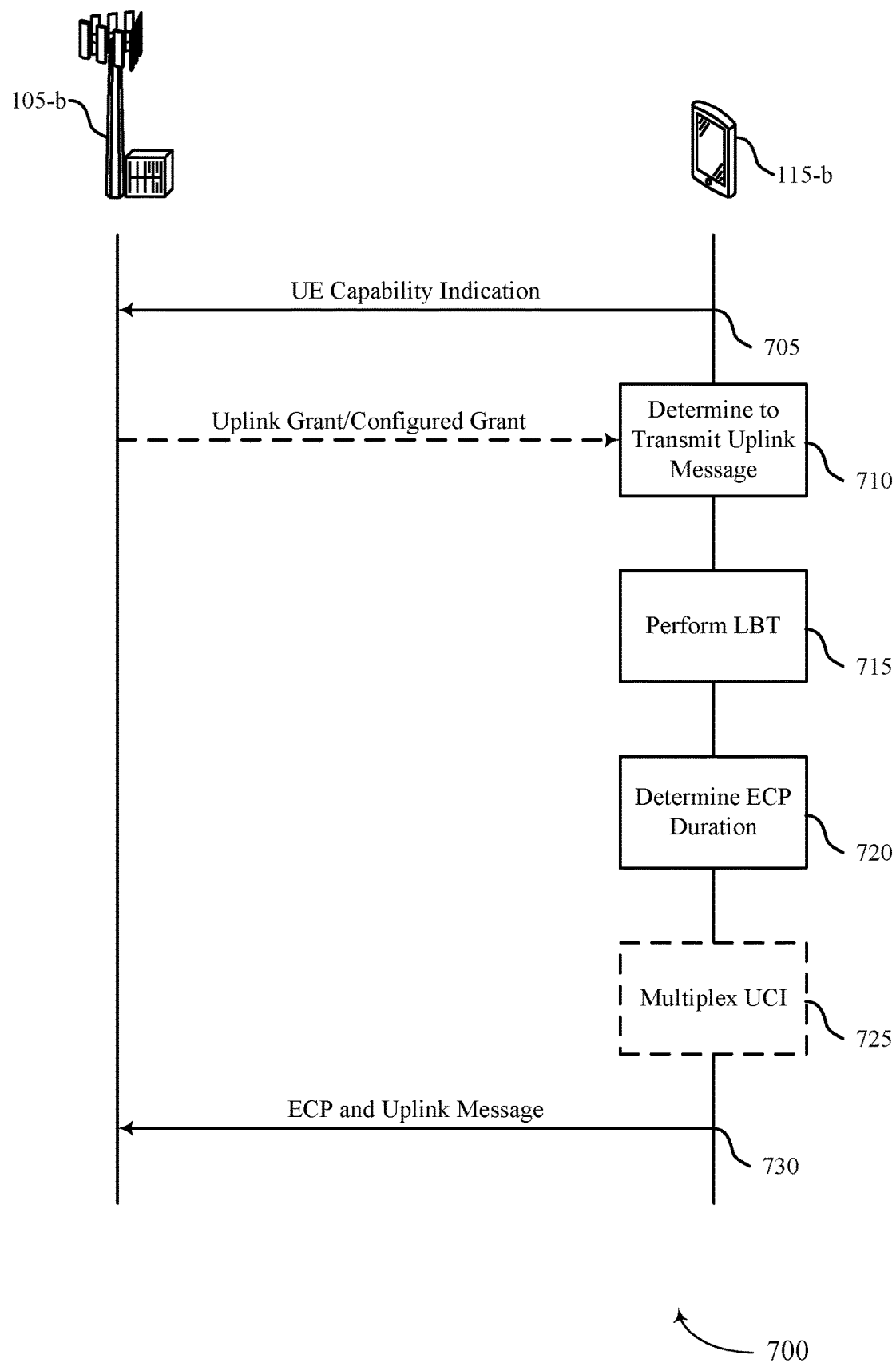
FIGS. 7, 8, and 9 illustrate examples of process flows that support uplink channel timelines with ECPs in accordance with aspects of the present disclosure.

FIG. 7 illustrates an example of a process flow 700 that supports uplink channel timelines with extended cyclic prefixes in accordance with aspects of the present disclosure. In some examples, process flow 700 may implement aspects of wireless communications systems 100 and/or 200. Process flow 700 may include a base station 105-*b* and a UE 115-*b*, which may be examples of corresponding base stations 105 and UEs 115, respectively, as described above with reference to FIGS. 1-6.

In the following description of the process flow 700, the operations between UE 115-*b* and base station 105-*b* may be performed in different orders or at different times. Certain operations may also be left out of the process flow 700, or other operations may be added to the process flow 700. It is to be understood that while UE 115-*b* and base station 105-*b* are shown performing a number of the operations of process flow 700, any wireless device may perform the operations shown.

At 705, UE 115-*b* may transmit an indication of a UE capability to support an ECP. In some cases, UE 115-*b* may transmit an indication of an amount of ECP that is supported by UE 115-*b*. For example, the amount of supported ECP may include a number of absolute time units, a number of symbols, or a combination thereof. Additionally or alternatively, the amount of supported extended cyclic prefix may be based on an SCS of the uplink channel or may be the same for any SCS of the uplink channel.

At 710, UE 115-*b* may determine to transmit an uplink message on resources of an uplink channel. In some cases, UE 115-*b* may receive an uplink grant scheduling the uplink message on the resources of the uplink channel. Additionally or alternatively, UE 115-*b* may receive a configured grant scheduling one or more uplink messages on the resources of the uplink channel.

At 715, UE 115-*b* may perform an LBT procedure based on the determining to transmit the uplink message.

At 720, UE 115-*b* may determine a duration of the extended cyclic prefix associated with the resources of the uplink channel. In some cases, UE 115-*b* may receive, from a base station, a configuration of a set of offsets for transmitting the extended cyclic prefix, the set of offsets based on the indication of the UE capability. Additionally or alternatively, UE 115-*b* may receive, from base station 105-*b*, a configuration of a set of offsets for transmitting the extended cyclic prefix and may select an offset from a subset of the set of offsets for transmitting the extended cyclic prefix, the subset of the set of offsets based on the UE capability.

At 725, UE 115-*b* may identify uplink control information to transmit on the uplink channel based on an event trigger and may multiplex the uplink control information and at least one symbol of the uplink message on the uplink channel on a timeline that includes a minimum number of symbols required by the UE between when the event trigger occurs and a start of the uplink channel, the extended cyclic prefix, a timing advance, or a combination thereof. In some cases, UE 115-*b* may determine a symbol for multiplexing the uplink control information and the uplink message on the uplink channel based on the timeline.

Additionally or alternatively, UE 115-*b* may determine to multiplex the uplink control information and the uplink message based on the event trigger occurring a number of symbols before the start of the uplink channel, the number of symbols based on the timeline. In some cases, the timeline may be based on the duration of the extended cyclic prefix, a sum of a duration of the extended cyclic prefix and the timing advance, a smallest integer number of symbols whose duration is greater than or equal to the duration of the extended cyclic prefix, a smallest integer number of symbols whose duration is greater than or equal to a sum of durations of the extended cyclic prefix and the timing advance, or a combination thereof.

In some cases, UE 115-*b* may receive an indication of an increase to the timeline caused by the extended cyclic prefix and the timing advance via RRC signaling. Additionally, the minimum number of symbols required by the UE between when the event trigger occurs and when a start of the uplink channel may be a UE uplink control information capability. In some cases, the uplink control information may include a feedback message, channel state information, or a combination thereof.

Additionally or alternatively, UE 115-*b* may identify UCI to transmit on the uplink channel based on an event trigger and may drop the uplink message or the uplink control information based on a priority of the uplink message, the uplink control information, data to be transmitted in the uplink control information, or a combination thereof. In some cases, the event trigger may occur within a duration before a start of the uplink channel. Additionally, the duration may be based on a supported number of symbols between the event trigger and transmitting the uplink control information, the extended cyclic prefix, and a timing advance.

At 730, UE 115-*b* may transmit, on the resources of the uplink channel, the extended cyclic prefix according to the determined duration followed by a first symbol of one or more symbols of the uplink message, the extended cyclic prefix based on the first symbol. In some cases, the extended cyclic prefix and the uplink message may be in a same slot.

Figure 8:
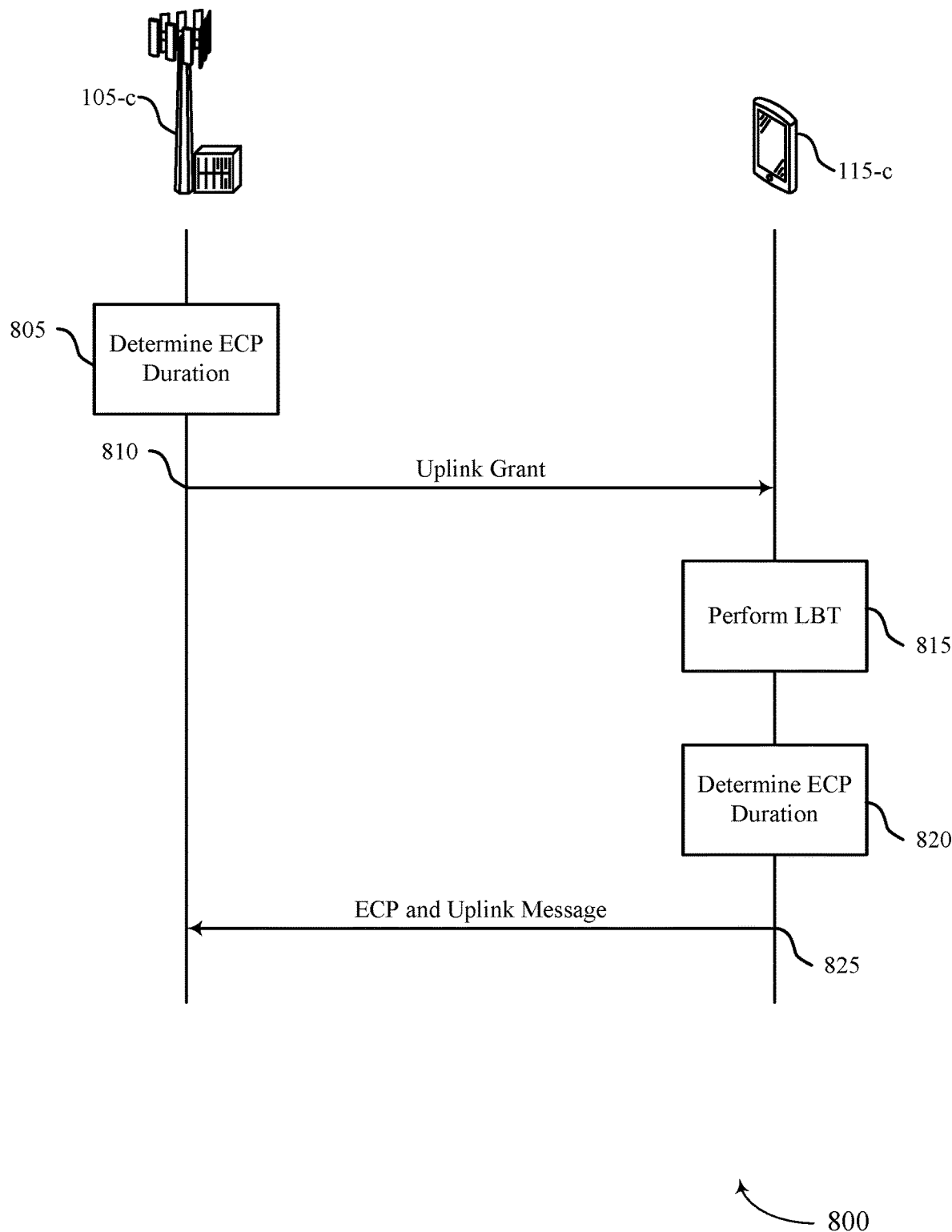

FIG. 8 illustrates an example of a process flow 800 that supports uplink channel timelines with extended cyclic prefixes in accordance with aspects of the present disclosure. In some examples, process flow 800 may implement aspects of wireless communications systems 100 and/or 200. Process flow 800 may include a base station 105-*c* and a UE 115-*c*, which may be examples of corresponding base stations 105 and UEs 115, respectively, as described above with reference to FIGS. 1-7.

In the following description of the process flow 800, the operations between UE 115-*c* and base station 105-*c* may be performed in different orders or at different times. Certain operations may also be left out of the process flow 800, or other operations may be added to the process flow 800. It is to be understood that while UE 115-*c* and base station 105-*c* are shown performing a number of the operations of process flow 800, any wireless device may perform the operations shown.

At 805, base station 105-*c* may determine a duration for an extended cyclic prefix based on a symbol duration, a duration for a listen-before-talk procedure, and a gap between downlink and uplink slots.

At 810, UE 115-*c* may receive an uplink grant indicating resources of an uplink channel and an indication of an extended cyclic prefix for the uplink channel.

At 815, UE 115-*c* may perform an LBT procedure based on receiving the uplink grant.

At 820, UE 115-*c* may determine a duration for the extended cyclic prefix from the received uplink grant. In some cases, the extended cyclic prefix may include a fractional number of symbols, a full number of symbols, or a combination thereof.

Additionally, UE 115-*c* may determine to transmit on the resources of the uplink channel based on a timeline that includes a minimum number of symbols required by the UE between the received uplink grant and a start of the uplink channel, the extended cyclic prefix, a timing advance, or a combination thereof. In some cases, UE 115-*c* may determine to transmit on the resources of the uplink channel based on the uplink grant occurring a number of symbols before the start of the uplink channel, the number of symbols based on the timeline. For example, the timeline may be based on a duration of the extended cyclic prefix, a sum of a duration of the extended cyclic prefix and the timing advance, a smallest integer number of symbols whose duration is greater than or equal to the duration of the extended cyclic prefix, a smallest integer number of symbols whose duration is greater than or equal to a sum of durations of the extended cyclic prefix and the timing advance, or a combination thereof.

In some cases, UE 115-*c* may receive an indication of an increase to the timeline caused by the extended cyclic prefix and the timing advance via RRC signaling. Additionally, the minimum number of symbols required by the UE between the received uplink grant and a start of the uplink channel may be a UE uplink control information capability. In some cases, UE 115-*c* may reduce the determined duration for the extended cyclic prefix based on when the uplink grant is received.

At 825, UE 115-*c* may transmit, on the resources of the uplink channel, the extended cyclic prefix according to the determined duration followed by a first symbol of one or more symbols of the uplink message, the extended cyclic prefix based the first symbol. In some cases, the extended cyclic prefix and the uplink channel may be in a same slot.

Figure 9:
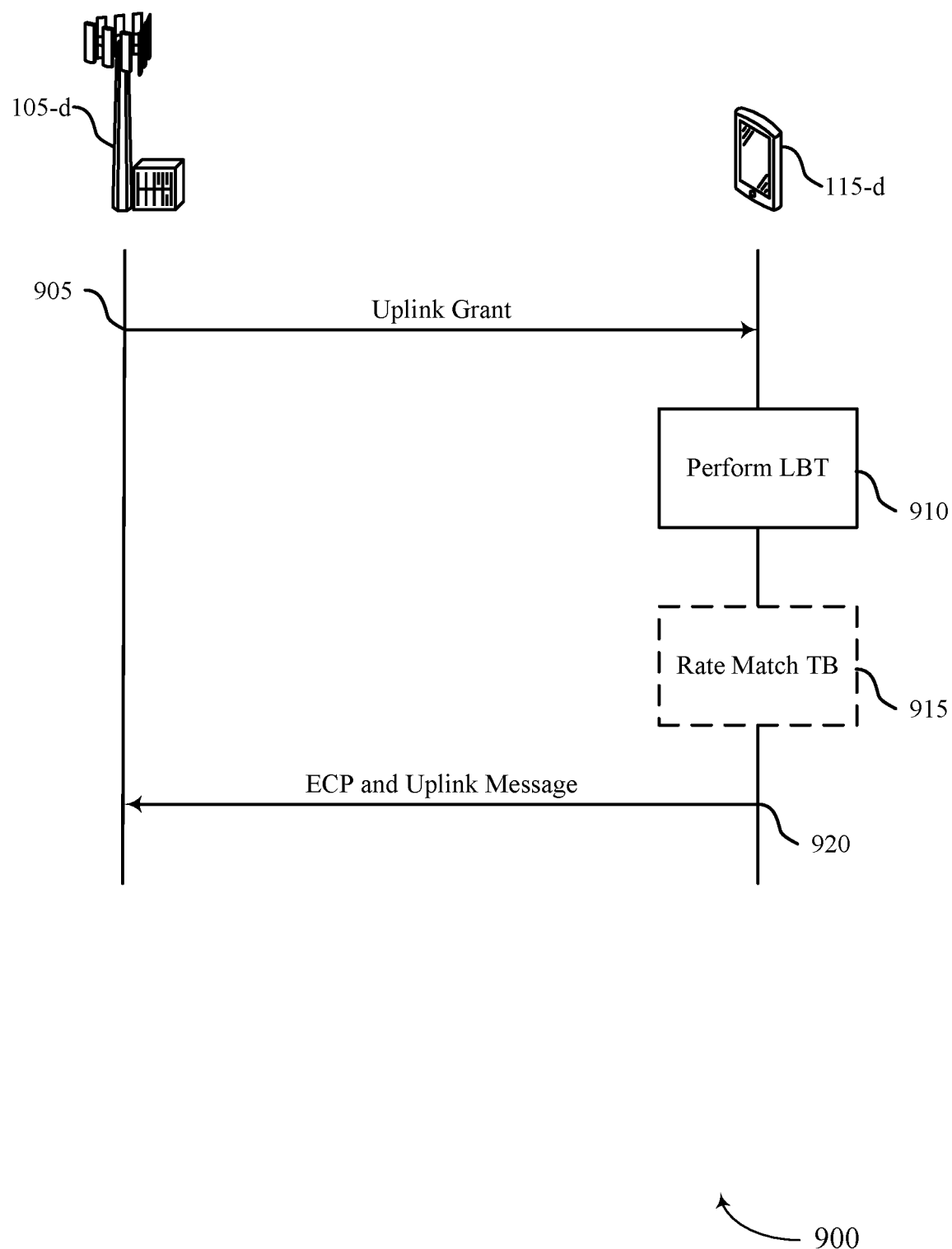

FIG. 9 illustrates an example of a process flow 900 that supports uplink channel timelines with extended cyclic prefixes in accordance with aspects of the present disclosure. In some examples, process flow 900 may implement aspects of wireless communications systems 100 and/or 200. Process flow 900 may include a base station 105-*d* and a UE 115-*d*, which may be examples of corresponding base stations 105 and UEs 115, respectively, as described above with reference to FIGS. 1-8.

In the following description of the process flow 900, the operations between UE 115-*d* and base station 105-*d* may be performed in different orders or at different times. Certain operations may also be left out of the process flow 900, or other operations may be added to the process flow 900. It is to be understood that while UE 115-*d* and base station 105-*d* are shown performing a number of the operations of process flow 900, any wireless device may perform the operations shown.

At 905, UE 115-*d* may receive an uplink grant of resources of an uplink channel for an uplink message by the UE, the uplink grant indicating to transmit an extended cyclic prefix at a start of the resources of the uplink grant.

At 910, UE 115-*d* may perform an LBT procedure based on the receiving the uplink grant. In some cases, UE 115-*d* may perform the LBT procedure in a window before transmitting the extended cyclic prefix.

At 915, UE 115-*d* may rate match a TB based on the one or more symbols of the uplink message.

At 920, UE 115-*d* may transmit, on the resources of the uplink channel, the extended cyclic prefix according to the start of the resources of the uplink grant followed by a first symbol of one or more symbols of the uplink message, the extended cyclic prefix based on the first symbol. In some cases, UE 115-*d* may transmit the extended cyclic prefix followed by the first symbol of the one or more symbols the uplink message based on a duration between when the uplink grant is received and the start of the resources of the uplink grant. Additionally, the extended cyclic prefix may end at a symbol boundary of the uplink channel, and the extended cyclic prefix and the uplink channel may be in a same slot.

Figure 10:
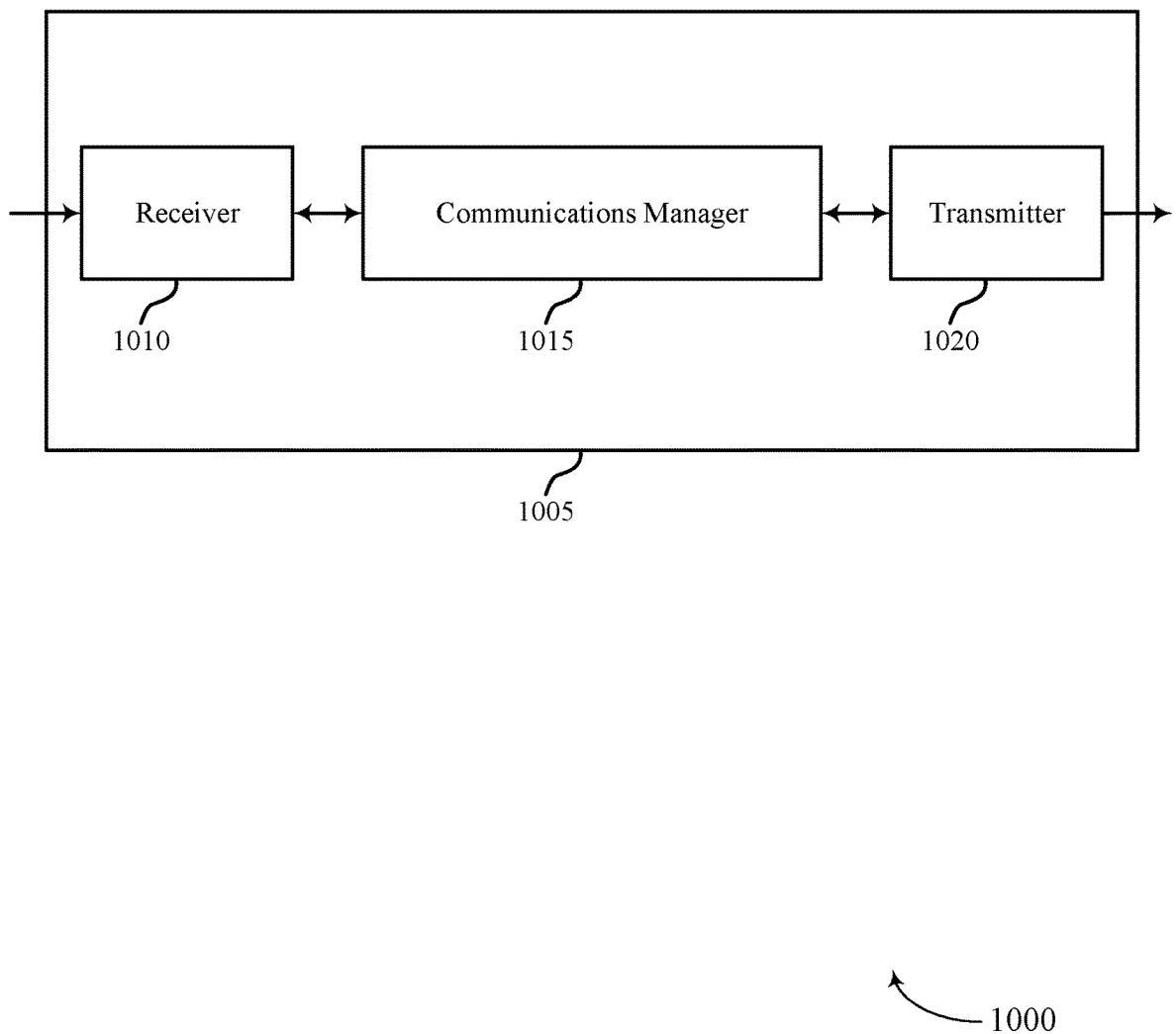
FIGS. 10 and 11 show block diagrams of devices that support uplink channel timelines with extended cyclic prefixes in accordance with aspects of the present disclosure.

FIG. 10 shows a block diagram 1000 of a device 1005 that supports uplink channel timelines with extended cyclic prefixes in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink channel timelines with extended cyclic prefixes, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit an indication of a UE capability to support an extended cyclic prefix, determine to transmit an uplink message on resources of an uplink channel, perform a listen-before-talk procedure based on the determining to transmit the uplink message, determine a duration of the extended cyclic prefix associated with the resources of the uplink channel, and transmit, on the resources of the uplink channel, the extended cyclic prefix according to the determined duration followed by a first symbol of one or more symbols of the uplink message, the extended cyclic prefix based on the first symbol.

The communications manager 1015 may also receive an uplink grant indicating resources of an uplink channel and an indication of an extended cyclic prefix for the uplink channel, perform a listen-before-talk procedure based on receiving the uplink grant, determine a duration for the extended cyclic prefix from the received uplink grant, and transmit, on the resources of the uplink channel, the extended cyclic prefix according to the determined duration followed by a first symbol of one or more symbols of the uplink message, the extended cyclic prefix based on the first symbol.

The communications manager 1015 may also receive an uplink grant of resources of an uplink channel for an uplink message by the UE, the uplink grant indicating to transmit an extended cyclic prefix at a start of the resources of the uplink grant, perform a listen-before-talk procedure based on the receiving the uplink grant, and transmit, on the resources of the uplink channel, the extended cyclic prefix according to the start of the resources of the uplink grant followed by a first symbol of one or more symbols of the uplink message, the extended cyclic prefix based on the first symbol. The communications manager 1015 may be an example of aspects of the communications manager 1310 described herein.

The communications manager 1015 may be implemented as an integrated circuit or chipset for the device 1005, and the receiver 1010 and the transmitter 1020 may be implemented as analog components (for example, amplifiers, filters, antennas) coupled with the device 1005 modem to enable wireless transmission and reception The actions performed by the communications manager 1015 as described herein may be implemented to realize one or more potential advantages. At least one implementation may enable the communications manager 1015 to determine a duration for an ECP and transmit the ECP on an uplink message. Based on implementing the determining, one or more processors of the device 1005 (for example, processor(s) controlling or incorporated with the communications manager 1015) may promote improvements to security for communications using ECPs, and, in some examples, may promote spectral efficiency, higher data rates, and enhanced efficiency for high reliability and low latency operations, among other benefits.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
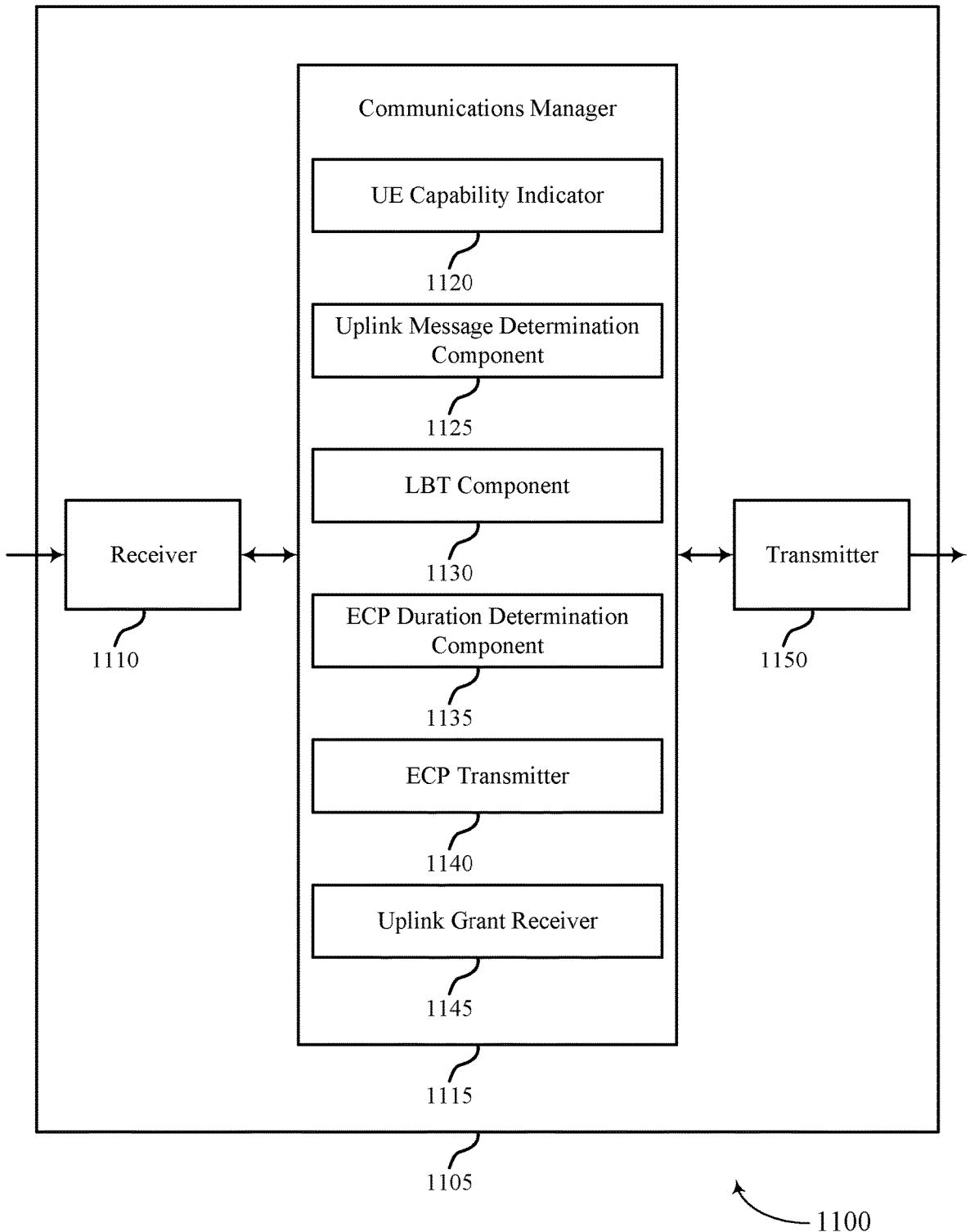

FIG. 11 shows a block diagram 1100 of a device 1105 that supports uplink channel timelines with extended cyclic prefixes in accordance with aspects of the present disclosure. The device 1105 may be an example of aspects of a device 1005, or a UE 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink channel timelines with extended cyclic prefixes, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a UE capability indicator 1120, an uplink message determination component 1125, an LBT component 1130, an ECP duration determination component 1135, an ECP transmitter 1140, and an uplink grant receiver 1145. The communications manager 1115 may be an example of aspects of the communications manager 1310 described herein.

The UE capability indicator 1120 may transmit an indication of a UE capability to support an extended cyclic prefix.

The uplink message determination component 1125 may determine to transmit an uplink message on resources of an uplink channel.

The uplink grant receiver 1145 may receive an uplink grant indicating resources of an uplink channel and an indication of an extended cyclic prefix for the uplink channel. The uplink grant receiver 1145 may receive an uplink grant of resources of an uplink channel for an uplink message by the UE, the uplink grant indicating to transmit an extended cyclic prefix at a start of the resources of the uplink grant.

The LBT component 1130 may perform a listen-before-talk procedure based on the determining to transmit the uplink message. The LBT component 1130 may perform a listen-before-talk procedure based on receiving the uplink grant.

The ECP duration determination component 1135 may determine a duration of the extended cyclic prefix associated with the resources of the uplink channel. The ECP duration determination component 1135 may determine a duration for the extended cyclic prefix from the received uplink grant.

The ECP transmitter 1140 may transmit, on the resources of the uplink channel, the extended cyclic prefix according to the determined duration followed by a first symbol of one or more symbols of the uplink message, the extended cyclic prefix based on the first symbol. The ECP transmitter 1140 may transmit, on the resources of the uplink channel, the extended cyclic prefix according to the start of the resources of the uplink grant followed by a first symbol of one or more symbols of the uplink message, the extended cyclic prefix based on the first symbol.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
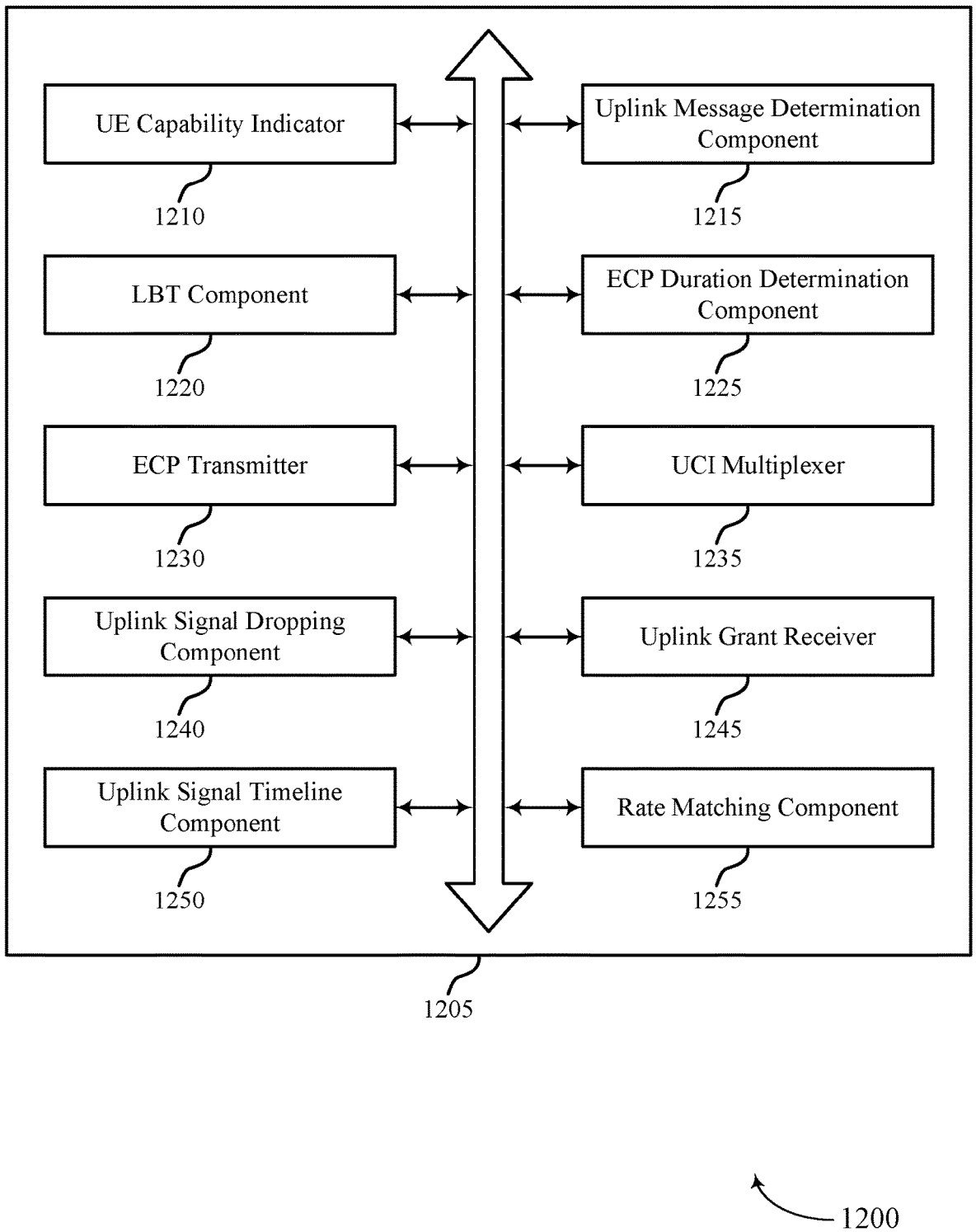
FIG. 12 shows a block diagram of a communications manager that supports uplink channel timelines with extended cyclic prefixes in accordance with aspects of the present disclosure.

FIG. 12 shows a block diagram 1200 of a communications manager 1205 that supports uplink channel timelines with extended cyclic prefixes in accordance with aspects of the present disclosure. The communications manager 1205 may be an example of aspects of a communications manager 1015, a communications manager 1115, or a communications manager 1310 described herein. The communications manager 1205 may include a UE capability indicator 1210, an uplink message determination component 1215, an LBT component 1220, an ECP duration determination component 1225, an ECP transmitter 1230, an UCI multiplexer 1235, an uplink signal dropping component 1240, an uplink grant receiver 1245, an uplink signal timeline component 1250, and a rate matching component 1255. Each of these modules may communicate, directly or indirectly, with one another (e.g., via one or more buses).

The UE capability indicator 1210 may transmit an indication of a UE capability to support an extended cyclic prefix. In some examples, the UE capability indicator 1210 may transmit an indication of an amount of extended cyclic prefix that is supported by the UE. In some cases, the amount of supported extended cyclic prefix includes a number of absolute time units, a number of symbols, or a combination thereof. In some cases, the amount of supported extended cyclic prefix is based on a subcarrier spacing of the uplink channel or is the same for any subcarrier spacing of the uplink channel.

The uplink message determination component 1215 may determine to transmit an uplink message on resources of an uplink channel. In some examples, the uplink message determination component 1215 may receive an uplink grant scheduling the uplink message on the resources of the uplink channel. In some examples, the uplink message determination component 1215 may receive a configured grant scheduling one or more uplink messages on the resources of the uplink channel.

The LBT component 1220 may perform a listen-before-talk procedure based on the determining to transmit the uplink message. In some examples, the LBT component 1220 may perform a listen-before-talk procedure based on receiving the uplink grant. In some examples, the LBT component 1220 may perform the listen-before-talk procedure in a window before transmitting the extended cyclic prefix.

The ECP duration determination component 1225 may determine a duration of the extended cyclic prefix associated with the resources of the uplink channel. In some examples, the ECP duration determination component 1225 may determine a duration for the extended cyclic prefix from the received uplink grant. In some cases, the extended cyclic prefix includes a fractional number of symbols, a full number of symbols, or a combination thereof.

In some examples, the ECP duration determination component 1225 may receive, from a base station, a configuration of a set of offsets for transmitting the extended cyclic prefix, the set of offsets based on the indication of the UE capability. In some examples, the ECP duration determination component 1225 may receive, from a base station, a configuration of a set of offsets for transmitting the extended cyclic prefix and may select an offset from a subset of the set of offsets for transmitting the extended cyclic prefix, the subset of the set of offsets based on the UE capability.

The ECP transmitter 1230 may transmit, on the resources of the uplink channel, the extended cyclic prefix according to the determined duration followed by a first symbol of one or more symbols of the uplink message, the extended cyclic prefix based on the first symbol. In some examples, the ECP transmitter 1230 may transmit, on the resources of the uplink channel, the extended cyclic prefix according to the start of the resources of the uplink grant followed by a first symbol of one or more symbols of the uplink message, the extended cyclic prefix based on the first symbol.

In some examples, the ECP transmitter 1230 may reduce the determined duration for the extended cyclic prefix based on when the uplink grant is received. In some examples, the ECP transmitter 1230 may transmit the extended cyclic prefix followed by the first symbol of the one or more symbols the uplink message based on a duration between when the uplink grant is received and the start of the resources of the uplink grant. In some cases, the extended cyclic prefix and the uplink channel are in a same slot. In some cases, the extended cyclic prefix ends at a symbol boundary of the uplink channel.

The uplink grant receiver 1245 may receive an uplink grant indicating resources of an uplink channel and an indication of an extended cyclic prefix for the uplink channel. In some examples, the uplink grant receiver 1245 may receive an uplink grant of resources of an uplink channel for an uplink message by the UE, the uplink grant indicating to transmit an extended cyclic prefix at a start of the resources of the uplink grant.

The UCI multiplexer 1235 may identify uplink control information to transmit on the uplink channel based on an event trigger and may multiplex the uplink control information and at least one symbol of the uplink message on the uplink channel based on a timeline that includes a minimum number of symbols required by the UE between when the event trigger occurs and a start of the uplink channel, the extended cyclic prefix, a timing advance, or a combination thereof.

In some examples, the UCI multiplexer 1235 may determine a symbol for multiplexing the uplink control information and the uplink message on the uplink channel based on the timeline. In some examples, the UCI multiplexer 1235 may determine to multiplex the uplink control information and the uplink message based on the event trigger occurring a number of symbols before the start of the uplink channel, the number of symbols based on the timeline. In some examples, the UCI multiplexer 1235 may receive an indication of an increase to the timeline caused by the extended cyclic prefix and the timing advance via RRC signaling.

In some cases, the timeline may be based on the duration of the extended cyclic prefix; or a sum of a duration of the extended cyclic prefix and the timing advance; or a smallest integer number of symbols whose duration is greater than or equal to the duration of the extended cyclic prefix; or a smallest integer number of symbols whose duration is greater than or equal to a sum of durations of the extended cyclic prefix and the timing advance. In some cases, the minimum number of symbols required by the UE between when the event trigger occurs and when a start of the uplink channel includes a UE uplink control information capability. In some cases, the uplink control information includes a feedback message, channel state information, or a combination thereof.

The uplink signal dropping component 1240 may identify uplink control information to transmit on the uplink channel based on an event trigger and may drop the uplink message or the uplink control information based on a priority of the uplink message, the uplink control information, data to be transmitted in the uplink control information, or a combination thereof, where the event trigger occurs within a duration before a start of the uplink channel. In some cases, the duration is based on a supported number of symbols between the event trigger and transmitting the uplink control information, the extended cyclic prefix, and a timing advance.

The uplink signal timeline component 1250 may determine to transmit on the resources of the uplink channel based on a timeline that includes a minimum number of symbols required by the UE between the received uplink grant and a start of the uplink channel, the extended cyclic prefix, a timing advance, or a combination thereof. In some examples, the uplink signal timeline component 1250 may determine to transmit on the resources of the uplink channel based on the uplink grant occurring a number of symbols before the start of the uplink channel, the number of symbols based on the timeline.

In some examples, the uplink signal timeline component 1250 may receive an indication of an increase to the timeline caused by the extended cyclic prefix and the timing advance via RRC signaling. In some cases, the timeline may be based on a duration of the extended cyclic prefix; or a sum of a duration of the extended cyclic prefix and the timing advance; or a smallest integer number of symbols whose duration is greater than or equal to the duration of the extended cyclic prefix; or a smallest integer number of symbols whose duration is greater than or equal to a sum of durations of the extended cyclic prefix and the timing advance. In some cases, the minimum number of symbols required by the UE between the received uplink grant and a start of the uplink channel includes a UE uplink control information capability.

The rate matching component 1255 may rate matching a transport block based on the one or more symbols of the uplink message.

Figure 13:
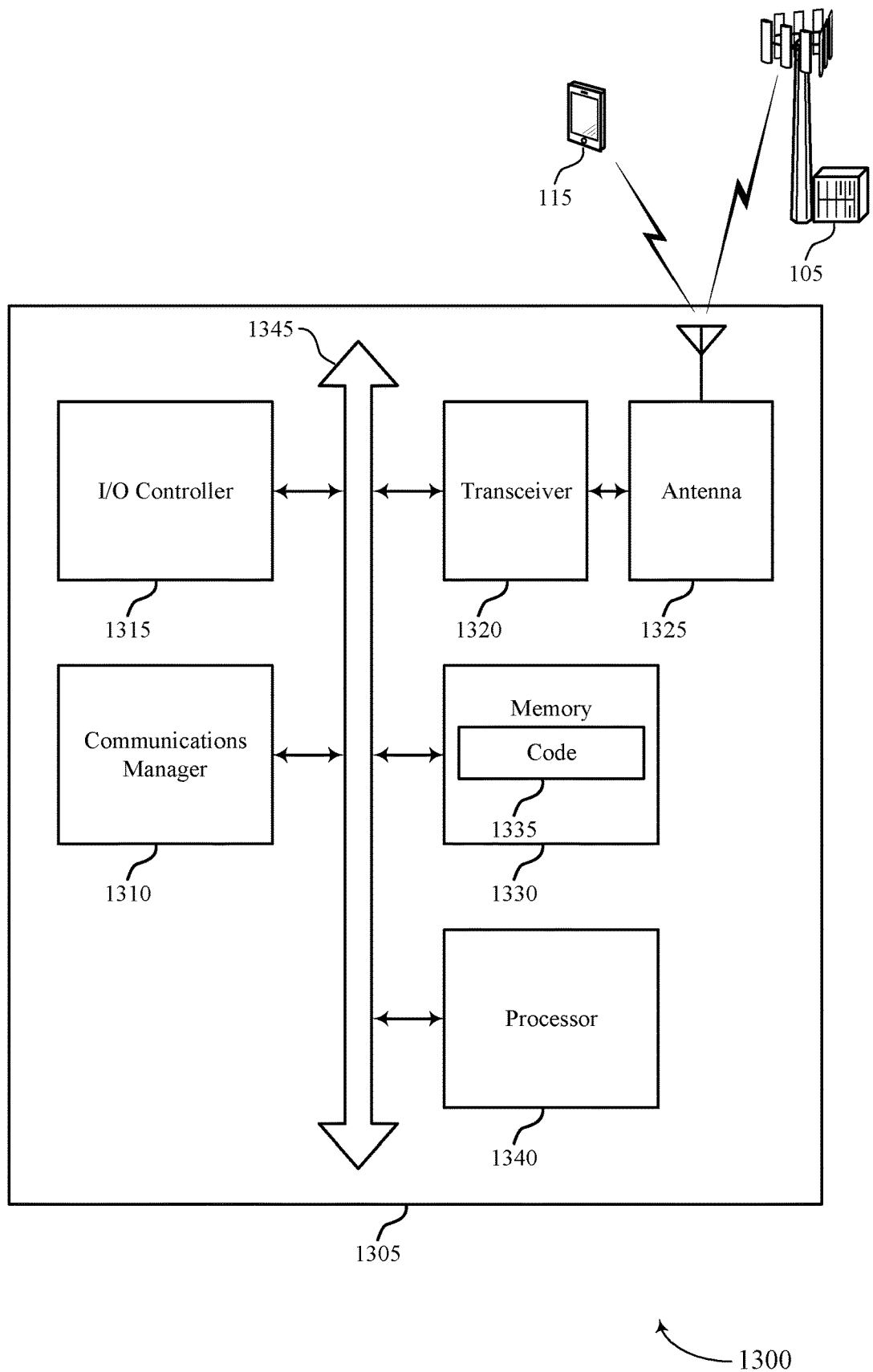
FIG. 13 shows a diagram of a system including a device that supports uplink channel timelines with extended cyclic prefixes in accordance with aspects of the present disclosure.

FIG. 13 shows a diagram of a system 1300 including a device 1305 that supports uplink channel timelines with extended cyclic prefixes in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may transmit an indication of a UE capability to support an extended cyclic prefix, determine to transmit an uplink message on resources of an uplink channel, perform a listen-before-talk procedure based on the determining to transmit the uplink message, determine a duration of the extended cyclic prefix associated with the resources of the uplink channel, and transmit, on the resources of the uplink channel, the extended cyclic prefix according to the determined duration followed by a first symbol of one or more symbols of the uplink message, the extended cyclic prefix based on the first symbol.

The communications manager 1310 may also receive an uplink grant indicating resources of an uplink channel and an indication of an extended cyclic prefix for the uplink channel, perform a listen-before-talk procedure based on receiving the uplink grant, determine a duration for the extended cyclic prefix from the received uplink grant, and transmit, on the resources of the uplink channel, the extended cyclic prefix according to the determined duration followed by a first symbol of one or more symbols of the uplink message, the extended cyclic prefix based on the first symbol.

The communications manager 1310 may also receive an uplink grant of resources of an uplink channel for an uplink message by the UE, the uplink grant indicating to transmit an extended cyclic prefix at a start of the resources of the uplink grant, perform a listen-before-talk procedure based on the receiving the uplink grant, and transmit, on the resources of the uplink channel, the extended cyclic prefix according to the start of the resources of the uplink grant followed by a first symbol of one or more symbols of the uplink message, the extended cyclic prefix based on the first symbol.

At least one implementation may enable to communications manager 1310 to determine a duration for an ECP and transmit the ECP on an uplink message. Based on implementing the determining, one or more processors of the device 1305 (for example, processor(s) controlling or incorporated with the communications manager 1310) may promote improvements to security for communications using ECPs, and, in some examples, may promote spectral efficiency, higher data rates, and enhanced efficiency for high reliability and low latency operations, among other benefits.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting uplink channel timelines with extended cyclic prefixes).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
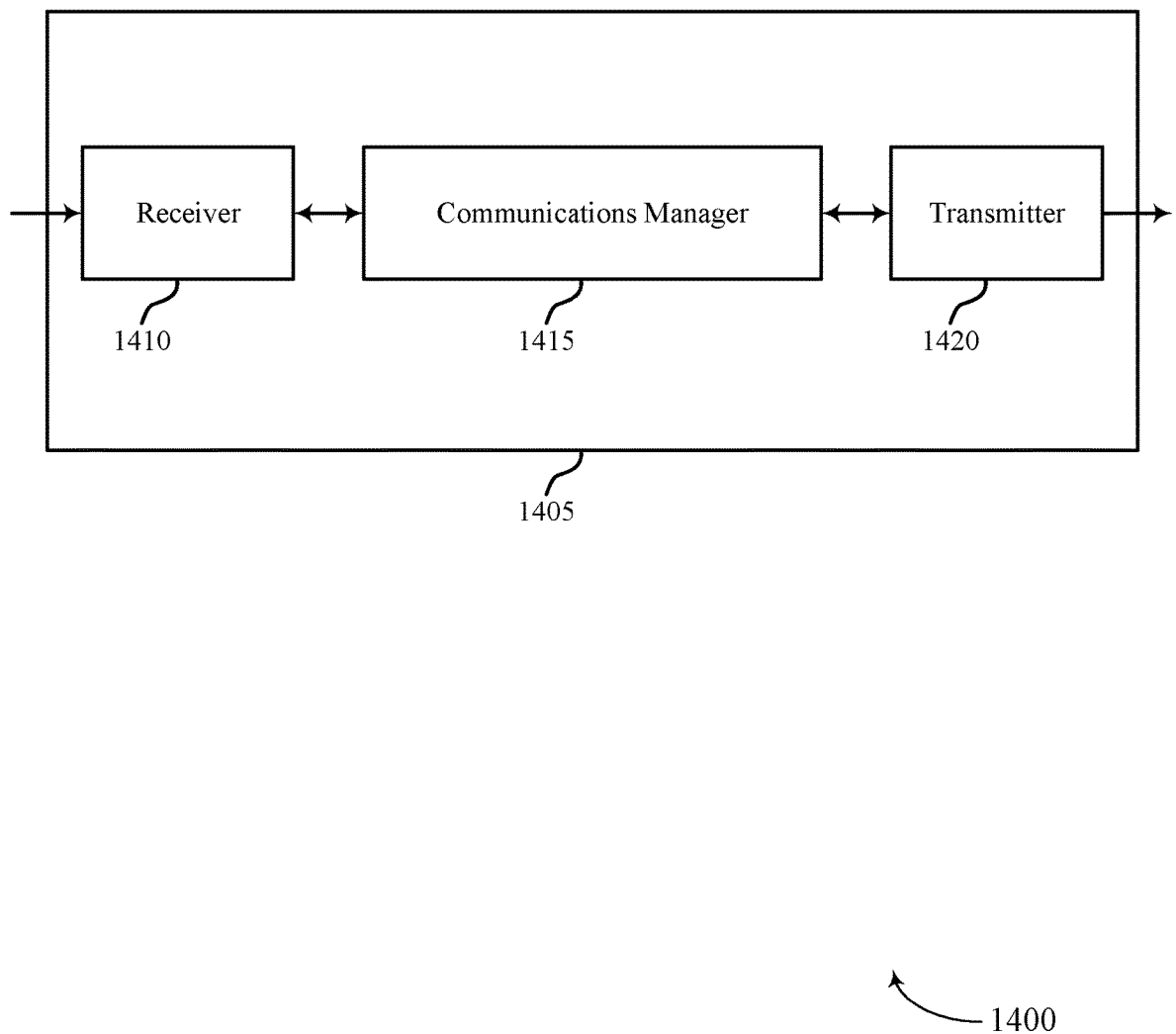
FIGS. 14 and 15 show block diagrams of devices that support uplink channel timelines with extended cyclic prefixes in accordance with aspects of the present disclosure.

FIG. 14 shows a block diagram 1400 of a device 1405 that supports uplink channel timelines with extended cyclic prefixes in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to uplink channel timelines with extended cyclic prefixes, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may receive, from a UE, an indication of a UE capability to support an extended cyclic prefix, transmit, to the UE, an indication for the UE to transmit an uplink message on resources of an uplink channel, determine a duration of the extended cyclic prefix associated with the resources of the uplink channel, receive, on the resources of the uplink channel, the extended cyclic prefix according to the determined duration followed by a first symbol of one or more symbols of the uplink message, the extended cyclic prefix based on the first symbol.

The communications manager 1415 may determine a duration for an extended cyclic prefix based on a symbol duration, a duration for a listen-before-talk procedure, and a gap between downlink and uplink slots, transmit, to a UE, an uplink grant indicating resources of an uplink channel and an indication of the extended cyclic prefix for the uplink channel, the indication of the extended cyclic prefix including the determined duration, receive, on the resources of the uplink channel, the extended cyclic prefix according to the determined duration followed by a first symbol of one or more symbols the uplink channel, the extended cyclic prefix based on the first symbol.

The communications manager 1415 may transmit, to a UE, an uplink grant of resources of an uplink channel for an uplink message by the UE, the uplink grant indicating to transmit an extended cyclic prefix at a start of the resources of the uplink grant, and receive, on the resources of the uplink channel, the extended cyclic prefix according to the start of the resources of the uplink grant followed by a first symbol of one or more symbols the uplink channel, the extended cyclic prefix based on the first symbol. The communications manager 1415 may be an example of aspects of the communications manager 1610 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1620 described with reference to FIG. 16. The transmitter 1420 may utilize a single antenna or a set of antennas.

Figure 15:
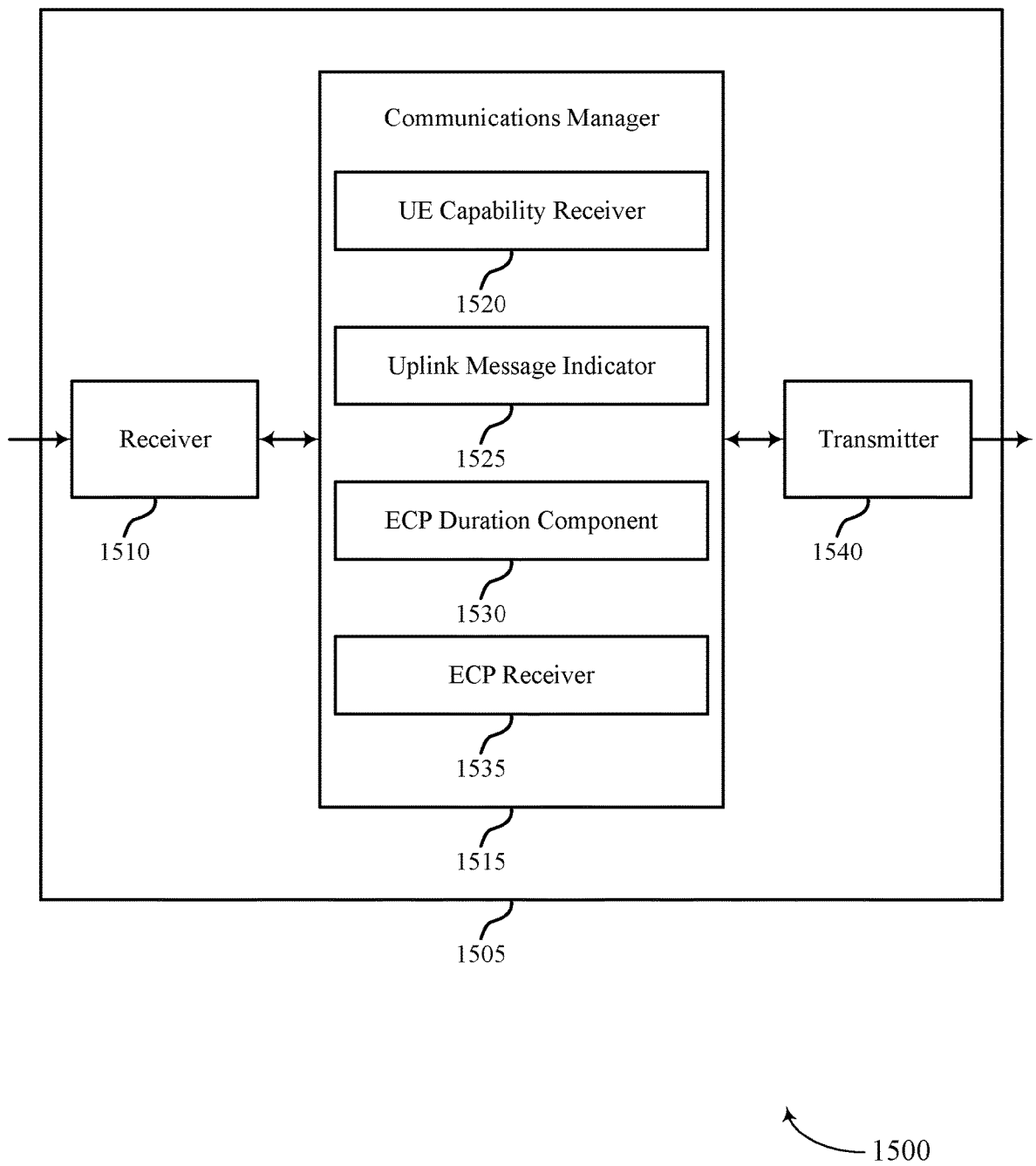

FIG. 15 shows a block diagram 1500 of a device 1505 that supports uplink channel timelines with extended cyclic prefixes in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to uplink channel timelines with extended cyclic prefixes, etc.). Information may be passed on to other components of the device 1505. The receiver 1510 may be an example of aspects of the transceiver 1620 described with reference to FIG. 16. The receiver 1510 may utilize a single antenna or a set of antennas.

The communications manager 1515 may be an example of aspects of the communications manager 1415 as described herein. The communications manager 1515 may include a UE capability receiver 1520, an uplink message indicator 1525, an ECP duration component 1530, and an ECP receiver 1535. The communications manager 1515 may be an example of aspects of the communications manager 1610 described herein.

The UE capability receiver 1520 may receive, from a UE, an indication of a UE capability to support an extended cyclic prefix.

The uplink message indicator 1525 may transmit, to the UE, an indication for the UE to transmit an uplink message on resources of an uplink channel. The uplink message indicator 1525 may transmit, to a UE, an uplink grant indicating resources of an uplink channel and an indication of the extended cyclic prefix for the uplink channel, the indication of the extended cyclic prefix including the determined duration. The uplink message indicator 1525 may transmit, to a UE, an uplink grant of resources of an uplink channel for an uplink message by the UE, the uplink grant indicating to transmit an extended cyclic prefix at a start of the resources of the uplink grant.

The ECP duration component 1530 may determine a duration of the extended cyclic prefix associated with the resources of the uplink channel. The ECP duration component 1530 may determine a duration for an extended cyclic prefix based on a symbol duration, a duration for a listen-before-talk procedure, and a gap between downlink and uplink slots.

The ECP receiver 1535 may receive, on the resources of the uplink channel, the extended cyclic prefix according to the determined duration followed by a first symbol of one or more symbols of the uplink message, the extended cyclic prefix based on the first symbol. The ECP receiver 1535 may receive, on the resources of the uplink channel, the extended cyclic prefix according to the start of the resources of the uplink grant followed by a first symbol of one or more symbols the uplink channel, the extended cyclic prefix based on the first symbol.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1620 described with reference to FIG. 16. The transmitter 1540 may utilize a single antenna or a set of antennas.

Figure 16:
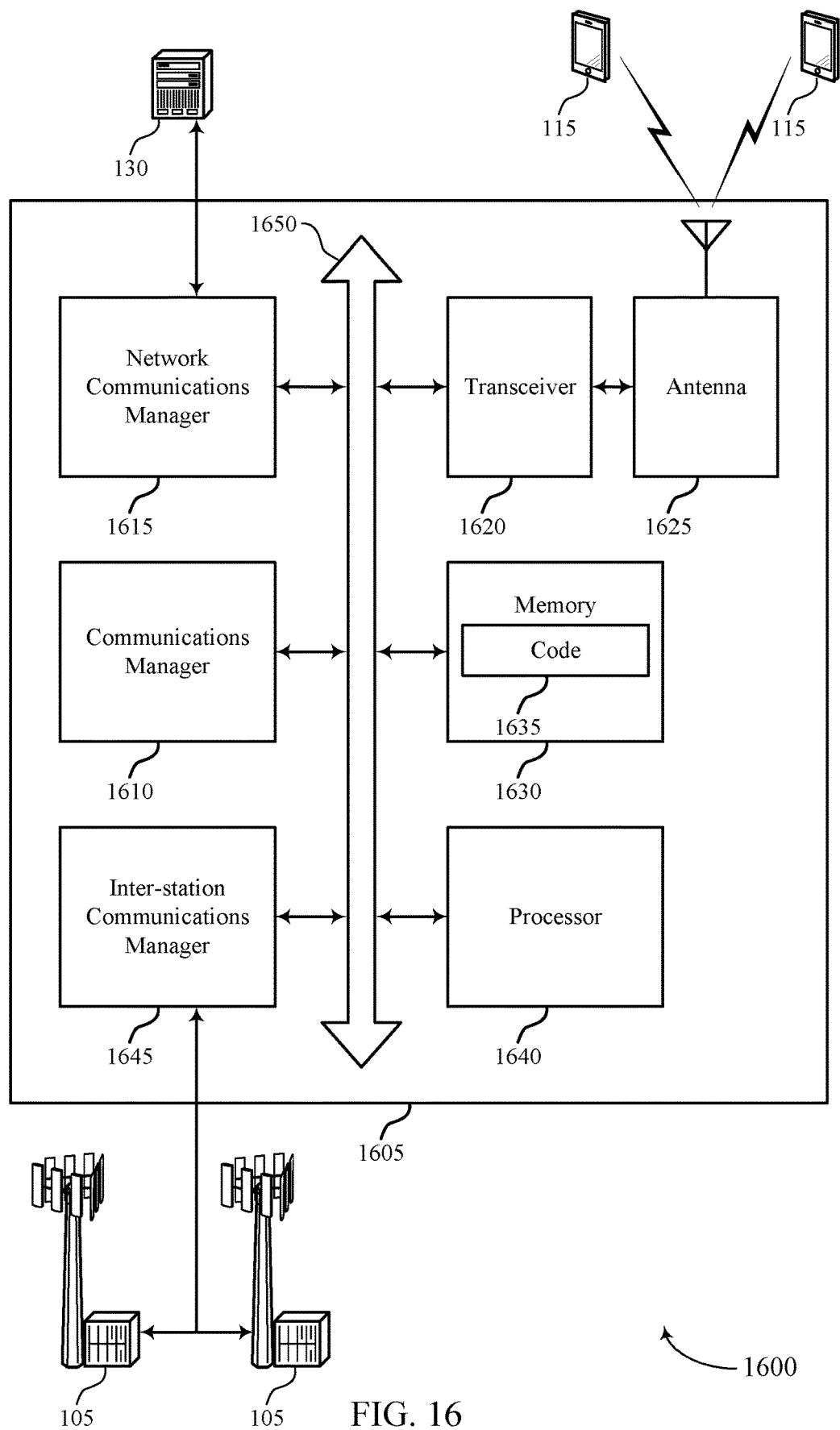
FIG. 16 shows a diagram of a system including a device that supports uplink channel timelines with extended cyclic prefixes in accordance with aspects of the present disclosure.

FIG. 16 shows a diagram of a system 1600 including a device 1605 that supports uplink channel timelines with extended cyclic prefixes in accordance with aspects of the present disclosure. The device 1605 may be an example of or include the components of device 1405, device 1505, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive, from a UE, an indication of a UE capability to support an extended cyclic prefix, transmit, to the UE, an indication for the UE to transmit an uplink message on resources of an uplink channel, determine a duration of the extended cyclic prefix associated with the resources of the uplink channel, receive, on the resources of the uplink channel, the extended cyclic prefix according to the determined duration followed by a first symbol of one or more symbols of the uplink message, the extended cyclic prefix based on the first symbol.

The communications manager 1610 may determine a duration for an extended cyclic prefix based on a symbol duration, a duration for a listen-before-talk procedure, and a gap between downlink and uplink slots, transmit, to a UE, an uplink grant indicating resources of an uplink channel and an indication of the extended cyclic prefix for the uplink channel, the indication of the extended cyclic prefix including the determined duration, receive, on the resources of the uplink channel, the extended cyclic prefix according to the determined duration followed by a first symbol of one or more symbols the uplink channel, the extended cyclic prefix based on the first symbol.

The communications manager 1610 may transmit, to a UE, an uplink grant of resources of an uplink channel for an uplink message by the UE, the uplink grant indicating to transmit an extended cyclic prefix at a start of the resources of the uplink grant, and receive, on the resources of the uplink channel, the extended cyclic prefix according to the start of the resources of the uplink grant followed by a first symbol of one or more symbols the uplink channel, the extended cyclic prefix based on the first symbol.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting uplink channel timelines with extended cyclic prefixes).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
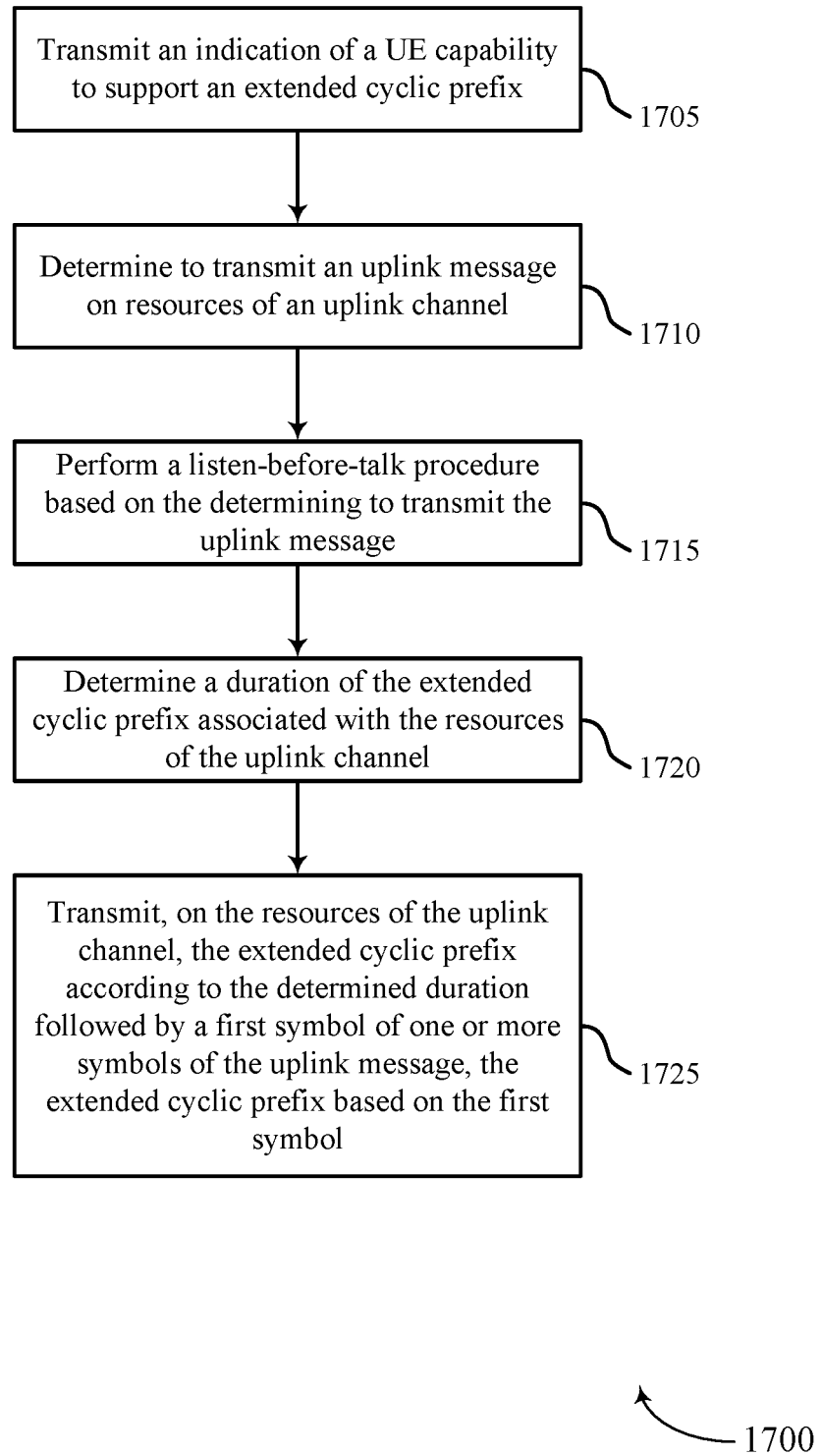
FIGS. 17 through 24 show flowcharts illustrating methods that support uplink channel timelines with extended cyclic prefixes in accordance with aspects of the present disclosure.

FIG. 17 shows a flowchart illustrating a method 1700 that supports uplink channel timelines with extended cyclic prefixes in accordance with aspects of the present disclosure. The operations of method 1700 may be implemented by a UE 115 or its components as described herein. For example, the operations of method 1700 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the UE may transmit an indication of a UE capability to support an extended cyclic prefix. The operations of 1705 may be performed according to the methods described herein. In some examples, aspects of the operations of 1705 may be performed by a UE capability indicator as described with reference to FIGS. 10 through 13.

At 1710, the UE may determine to transmit an uplink message on resources of an uplink channel. The operations of 1710 may be performed according to the methods described herein. In some examples, aspects of the operations of 1710 may be performed by an uplink message determination component as described with reference to FIGS. 10 through 13.

At 1715, the UE may perform a listen-before-talk procedure based on the determining to transmit the uplink message. The operations of 1715 may be performed according to the methods described herein. In some examples, aspects of the operations of 1715 may be performed by an LBT component as described with reference to FIGS. 10 through 13.

At 1720, the UE may determine a duration of the extended cyclic prefix associated with the resources of the uplink channel. The operations of 1720 may be performed according to the methods described herein. In some examples, aspects of the operations of 1720 may be performed by an ECP duration determination component as described with reference to FIGS. 10 through 13.

At 1725, the UE may transmit, on the resources of the uplink channel, the extended cyclic prefix according to the determined duration followed by a first symbol of one or more symbols of the uplink message, the extended cyclic prefix based on the first symbol. The operations of 1725 may be performed according to the methods described herein. In some examples, aspects of the operations of 1725 may be performed by an ECP transmitter as described with reference to FIGS. 10 through 13.

Figure 18:
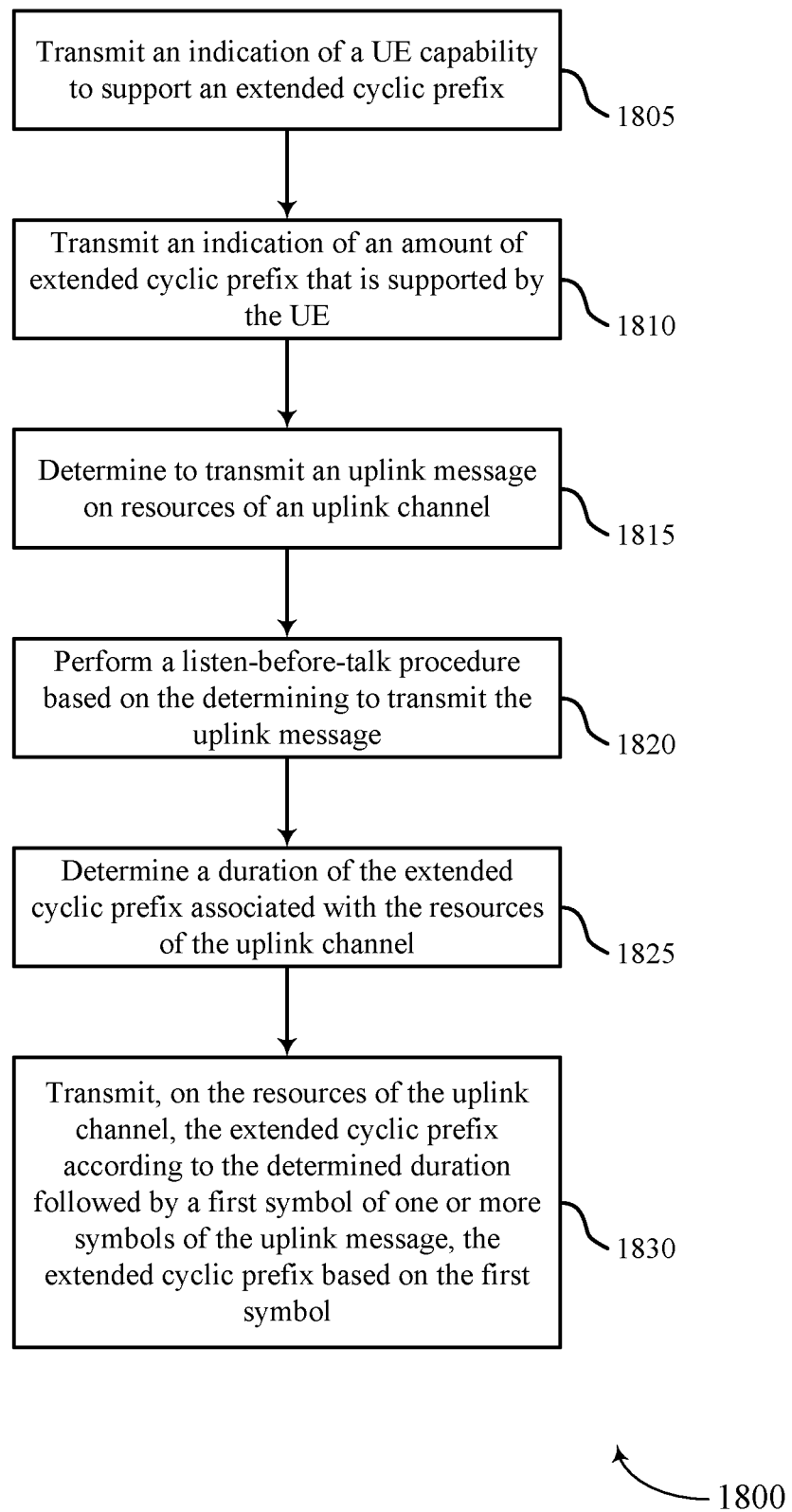

FIG. 18 shows a flowchart illustrating a method 1800 that supports uplink channel timelines with extended cyclic prefixes in accordance with aspects of the present disclosure.

The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may transmit an indication of a UE capability to support an extended cyclic prefix. The operations of 1805 may be performed according to the methods described herein. In some examples, aspects of the operations of 1805 may be performed by a UE capability indicator as described with reference to FIGS. 10 through 13.

At 1810, the UE may transmit an indication of an amount of extended cyclic prefix that is supported by the UE. The operations of 1810 may be performed according to the methods described herein. In some examples, aspects of the operations of 1810 may be performed by a UE capability indicator as described with reference to FIGS. 10 through 13.

At 1815, the UE may determine to transmit an uplink message on resources of an uplink channel. The operations of 1815 may be performed according to the methods described herein. In some examples, aspects of the operations of 1815 may be performed by an uplink message determination component as described with reference to FIGS. 10 through 13.

At 1820, the UE may perform a listen-before-talk procedure based on the determining to transmit the uplink message. The operations of 1820 may be performed according to the methods described herein. In some examples, aspects of the operations of 1820 may be performed by an LBT component as described with reference to FIGS. 10 through 13.

At 1825, the UE may determine a duration of the extended cyclic prefix associated with the resources of the uplink channel. The operations of 1825 may be performed according to the methods described herein. In some examples, aspects of the operations of 1825 may be performed by an ECP duration determination component as described with reference to FIGS. 10 through 13.

At 1830, the UE may transmit, on the resources of the uplink channel, the extended cyclic prefix according to the determined duration followed by a first symbol of one or more symbols of the uplink message, the extended cyclic prefix based on the first symbol. The operations of 1830 may be performed according to the methods described herein. In some examples, aspects of the operations of 1830 may be performed by an ECP transmitter as described with reference to FIGS. 10 through 13.

Figure 19:
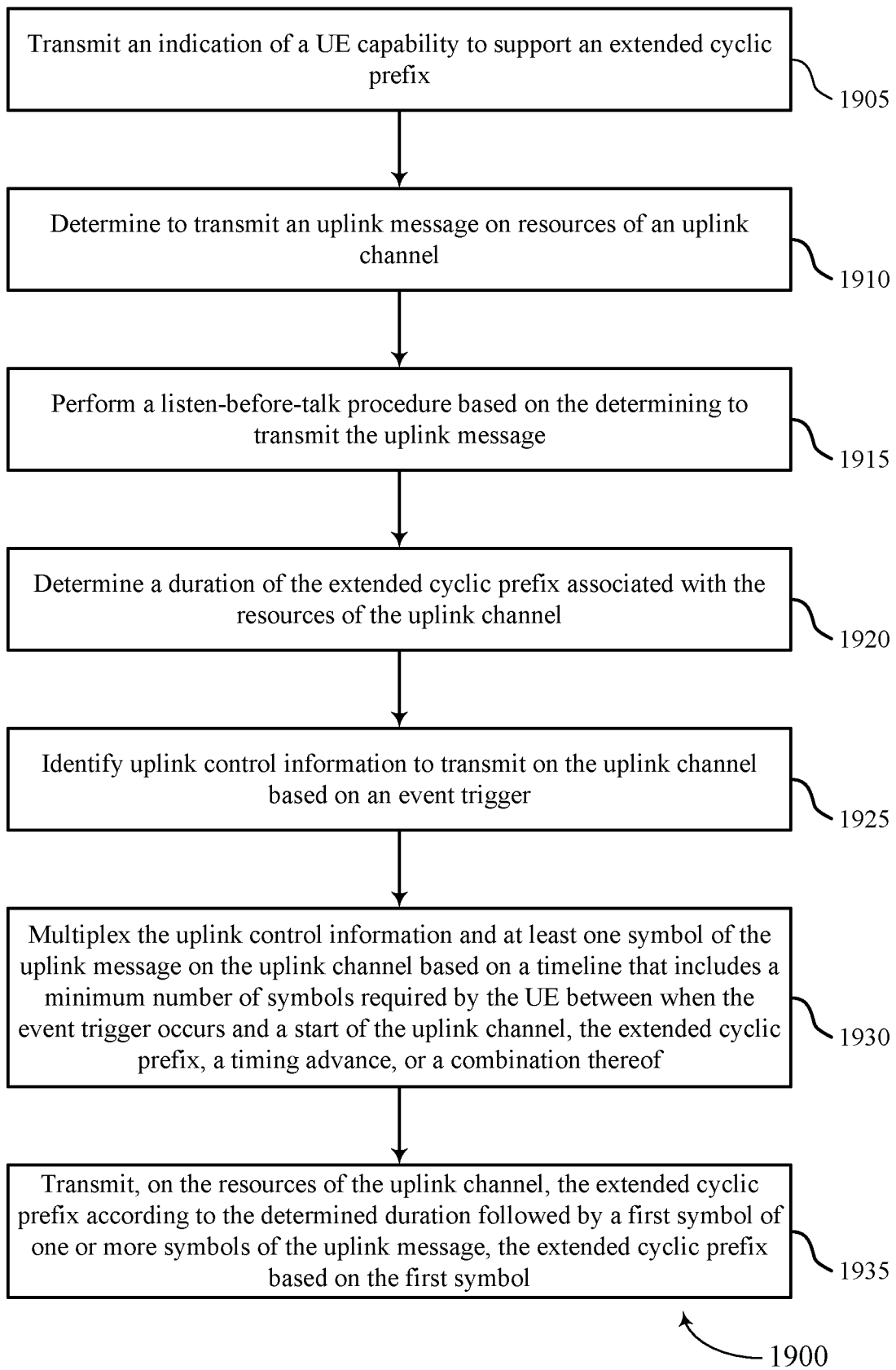

FIG. 19 shows a flowchart illustrating a method 1900 that supports uplink channel timelines with extended cyclic prefixes in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may transmit an indication of a UE capability to support an extended cyclic prefix. The operations of 1905 may be performed according to the methods described herein. In some examples, aspects of the operations of 1905 may be performed by a UE capability indicator as described with reference to FIGS. 10 through 13.

At 1910, the UE may determine to transmit an uplink message on resources of an uplink channel. The operations of 1910 may be performed according to the methods described herein. In some examples, aspects of the operations of 1910 may be performed by an uplink message determination component as described with reference to FIGS. 10 through 13.

At 1915, the UE may perform a listen-before-talk procedure based on the determining to transmit the uplink message. The operations of 1915 may be performed according to the methods described herein. In some examples, aspects of the operations of 1915 may be performed by an LBT component as described with reference to FIGS. 10 through 13.

At 1920, the UE may determine a duration of the extended cyclic prefix associated with the resources of the uplink channel. The operations of 1920 may be performed according to the methods described herein. In some examples, aspects of the operations of 1920 may be performed by an ECP duration determination component as described with reference to FIGS. 10 through 13.

At 1925, the UE may identify uplink control information to transmit on the uplink channel based on an event trigger. The operations of 1925 may be performed according to the methods described herein. In some examples, aspects of the operations of 1925 may be performed by an UCI multiplexer as described with reference to FIGS. 10 through 13.

At 1930, the UE may multiplex the uplink control information and at least one symbol of the uplink message on the uplink channel based on a timeline that includes a minimum number of symbols required by the UE between when the event trigger occurs and a start of the uplink channel, the extended cyclic prefix, a timing advance, or a combination thereof. The operations of 1930 may be performed according to the methods described herein. In some examples, aspects of the operations of 1930 may be performed by an UCI multiplexer as described with reference to FIGS. 10 through 13.

At 1935, the UE may transmit, on the resources of the uplink channel, the extended cyclic prefix according to the determined duration followed by a first symbol of one or more symbols of the uplink message, the extended cyclic prefix based on the first symbol. The operations of 1935 may be performed according to the methods described herein. In some examples, aspects of the operations of 1935 may be performed by an ECP transmitter as described with reference to FIGS. 10 through 13.

Figure 20:
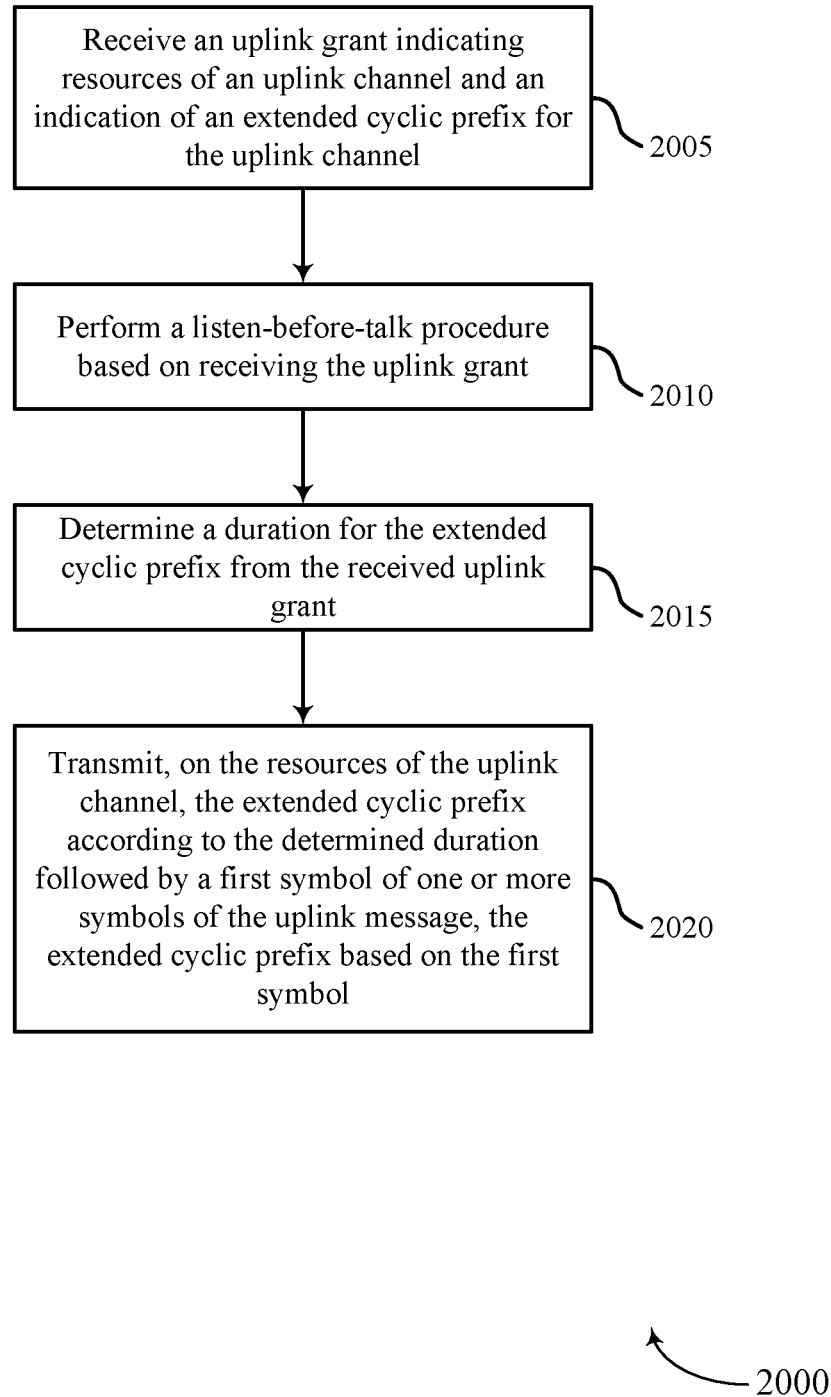

FIG. 20 shows a flowchart illustrating a method 2000 that supports uplink channel timelines with extended cyclic prefixes in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive an uplink grant indicating resources of an uplink channel and an indication of an extended cyclic prefix for the uplink channel. The operations of 2005 may be performed according to the methods described herein. In some examples, aspects of the operations of 2005 may be performed by an uplink grant receiver as described with reference to FIGS. 10 through 13.

At 2010, the UE may perform a listen-before-talk procedure based on receiving the uplink grant. The operations of 2010 may be performed according to the methods described herein. In some examples, aspects of the operations of 2010 may be performed by an LBT component as described with reference to FIGS. 10 through 13.

At 2015, the UE may determine a duration for the extended cyclic prefix from the received uplink grant. The operations of 2015 may be performed according to the methods described herein. In some examples, aspects of the operations of 2015 may be performed by an ECP duration determination component as described with reference to FIGS. 10 through 13.

At 2020, the UE may transmit, on the resources of the uplink channel, the extended cyclic prefix according to the determined duration followed by a first symbol of one or more symbols of the uplink message, the extended cyclic prefix based on the first symbol. The operations of 2020 may be performed according to the methods described herein. In some examples, aspects of the operations of 2020 may be performed by an ECP transmitter as described with reference to FIGS. 10 through 13.

Figure 21:
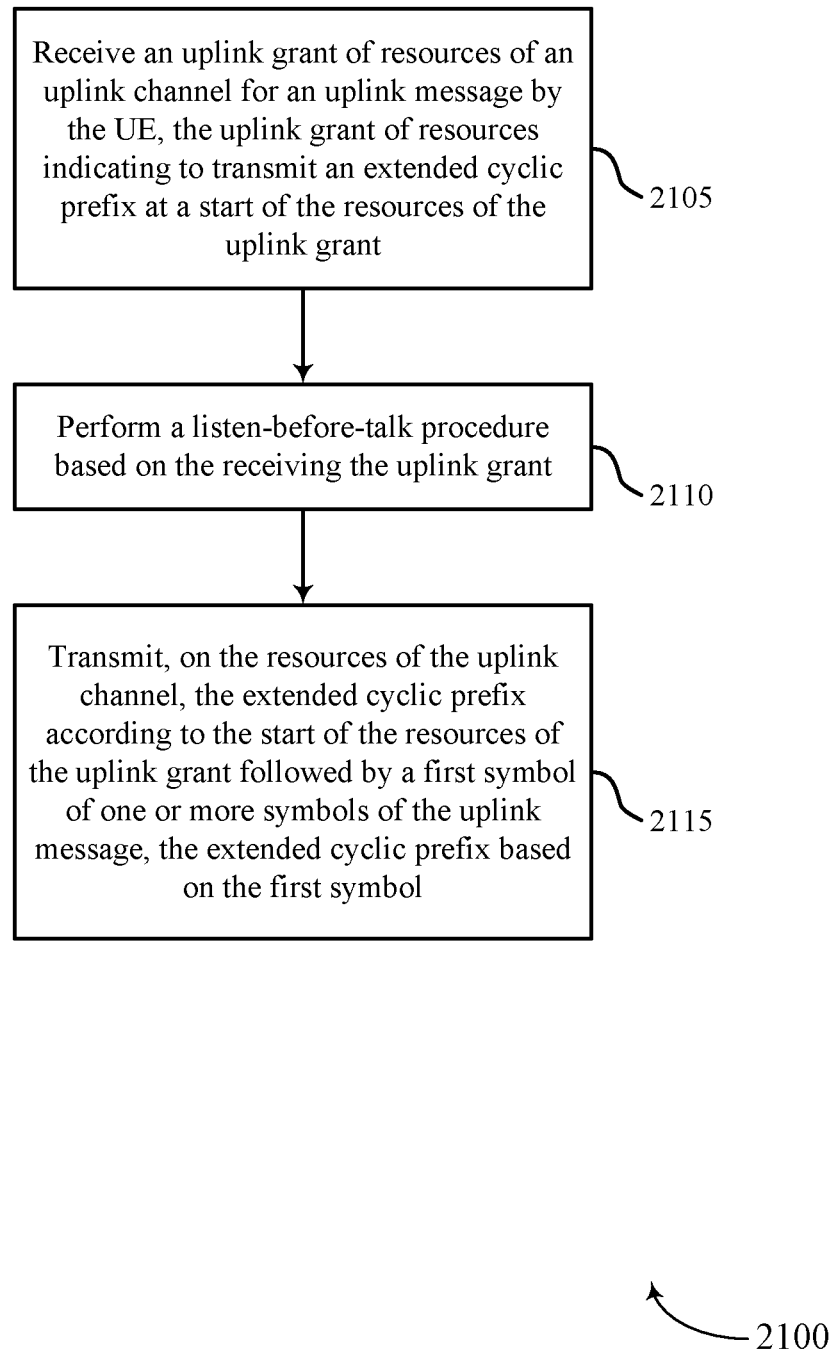

FIG. 21 shows a flowchart illustrating a method 2100 that supports uplink channel timelines with extended cyclic prefixes in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may receive an uplink grant of resources of an uplink channel for an uplink message by the UE, the uplink grant indicating to transmit an extended cyclic prefix at a start of the resources of the uplink grant. The operations of 2105 may be performed according to the methods described herein. In some examples, aspects of the operations of 2105 may be performed by an uplink grant receiver as described with reference to FIGS. 10 through 13.

At 2110, the UE may perform a listen-before-talk procedure based on the receiving the uplink grant. The operations of 2110 may be performed according to the methods described herein. In some examples, aspects of the operations of 2110 may be performed by an LBT component as described with reference to FIGS. 10 through 13.

At 2115, the UE may transmit, on the resources of the uplink channel, the extended cyclic prefix according to the start of the resources of the uplink grant followed by a first symbol of one or more symbols of the uplink message, the extended cyclic prefix based on the first symbol. The operations of 2115 may be performed according to the methods described herein. In some examples, aspects of the operations of 2115 may be performed by an ECP transmitter as described with reference to FIGS. 10 through 13.

Figure 22:
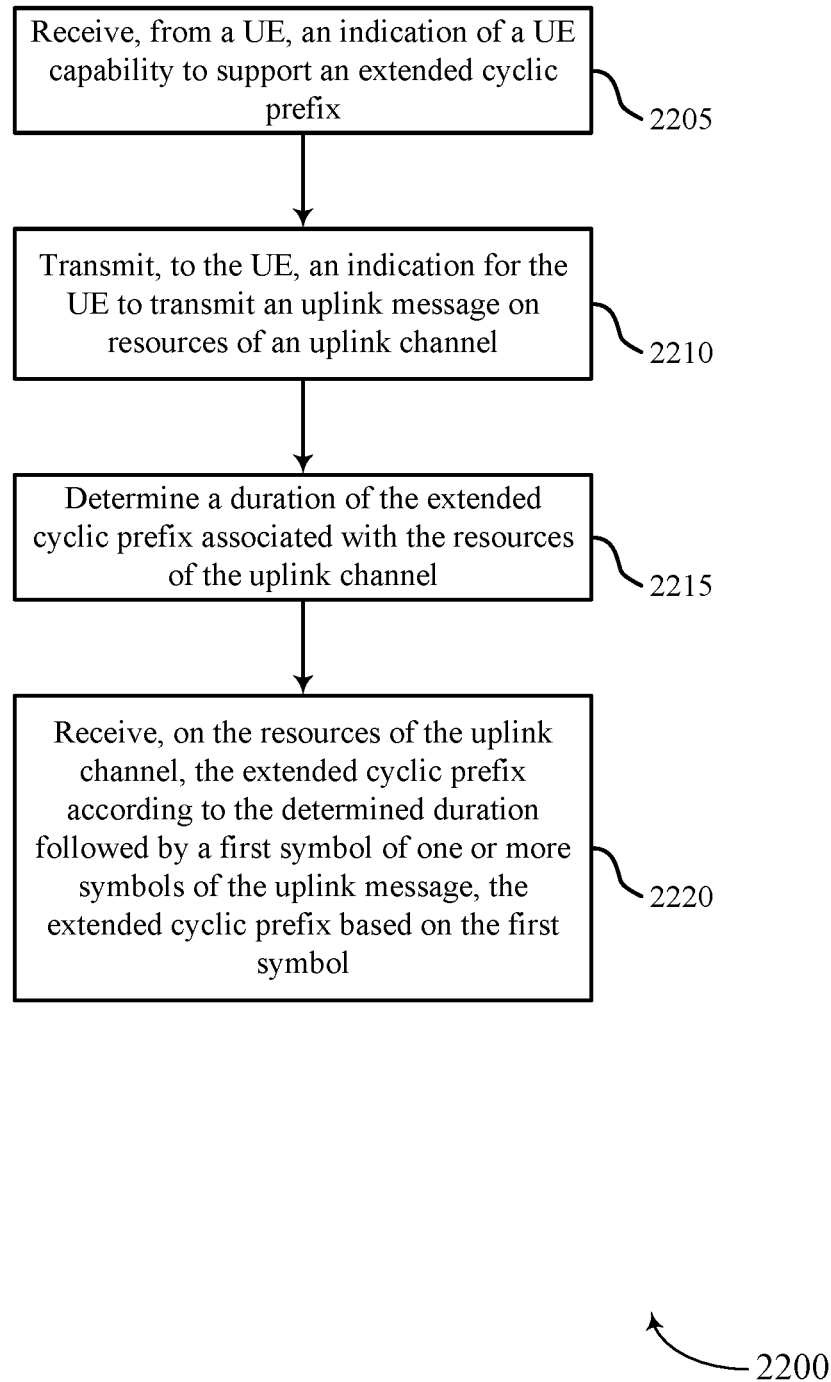

FIG. 22 shows a flowchart illustrating a method 2200 that supports uplink channel timelines with extended cyclic prefixes in accordance with aspects of the present disclosure. The operations of method 2200 may be implemented by a base station 105 or its components as described herein. For example, the operations of method 2200 may be performed by a communications manager as described with reference to FIGS. 14 through 16. In some examples, a base station may execute a set of instructions to control the functional elements of the base station to perform the functions described below. Additionally or alternatively, a base station may perform aspects of the functions described below using special-purpose hardware.

At 2205, the base station may receive, from a UE, an indication of a UE capability to support an extended cyclic prefix. The operations of 2205 may be performed according to the methods described herein. In some examples, aspects of the operations of 2205 may be performed by a UE capability receiver as described with reference to FIGS. 14 through 16.

At 2210, the base station may transmit, to the UE, an indication for the UE to transmit an uplink message on resources of an uplink channel. The operations of 2210 may be performed according to the methods described herein. In some examples, aspects of the operations of 2210 may be performed by an uplink message indicator as described with reference to FIGS. 14 through 16.

At 2215, the base station may determine a duration of the extended cyclic prefix associated with the resources of the uplink channel. The operations of 2215 may be performed according to the methods described herein. In some examples, aspects of the operations of 2215 may be performed by an ECP duration component as described with reference to FIGS. 14 through 16.

At 2220, the base station may receive, on the resources of the uplink channel, the extended cyclic prefix according to the determined duration followed by a first symbol of one or more symbols of the uplink message, the extended cyclic prefix based on the first symbol. The operations of 2220 may be performed according to the methods described herein. In some examples, aspects of the operations of 2220 may be performed by an ECP receiver as described with reference to FIGS. 14 through 16.

Figure 23:
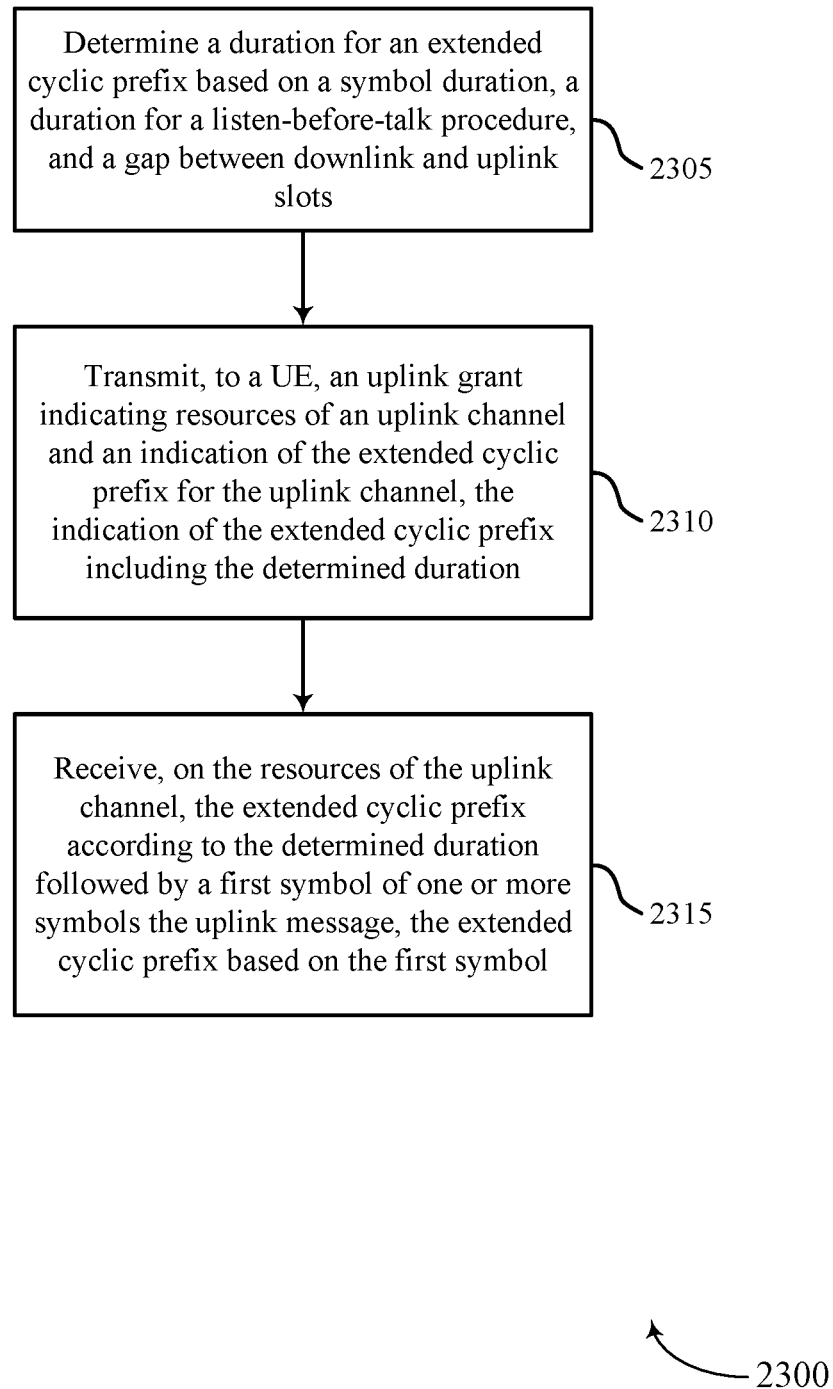

FIG. 23 shows a flowchart illustrating a method 2300 that supports uplink channel timelines with extended cyclic prefixes in accordance with aspects of the present disclosure. The operations of method 2300 may be implemented by a base station 105 or its components as described herein. For example, the operations of method 2300 may be performed by a communications manager as described with reference to FIGS. 14 through 16. In some examples, a base station may execute a set of instructions to control the functional elements of the base station to perform the functions described below. Additionally or alternatively, a base station may perform aspects of the functions described below using special-purpose hardware.

At 2305, the base station may determine a duration for an extended cyclic prefix based on a symbol duration, a duration for a listen-before-talk procedure, and a gap between downlink and uplink slots. The operations of 2305 may be performed according to the methods described herein. In some examples, aspects of the operations of 2305 may be performed by an ECP duration component as described with reference to FIGS. 14 through 16.

At 2310, the base station may transmit, to a UE, an uplink grant indicating resources of an uplink channel and an indication of the extended cyclic prefix for the uplink channel, the indication of the extended cyclic prefix including the determined duration. The operations of 2310 may be performed according to the methods described herein. In some examples, aspects of the operations of 2310 may be performed by an uplink message indicator as described with reference to FIGS. 14 through 16.

At 2315, the base station may receive, on the resources of the uplink channel, the extended cyclic prefix according to the determined duration followed by a first symbol of one or more symbols the uplink channel, the extended cyclic prefix based on the first symbol. The operations of 2315 may be performed according to the methods described herein. In some examples, aspects of the operations of 2315 may be performed by an ECP receiver as described with reference to FIGS. 14 through 16.

Figure 24:
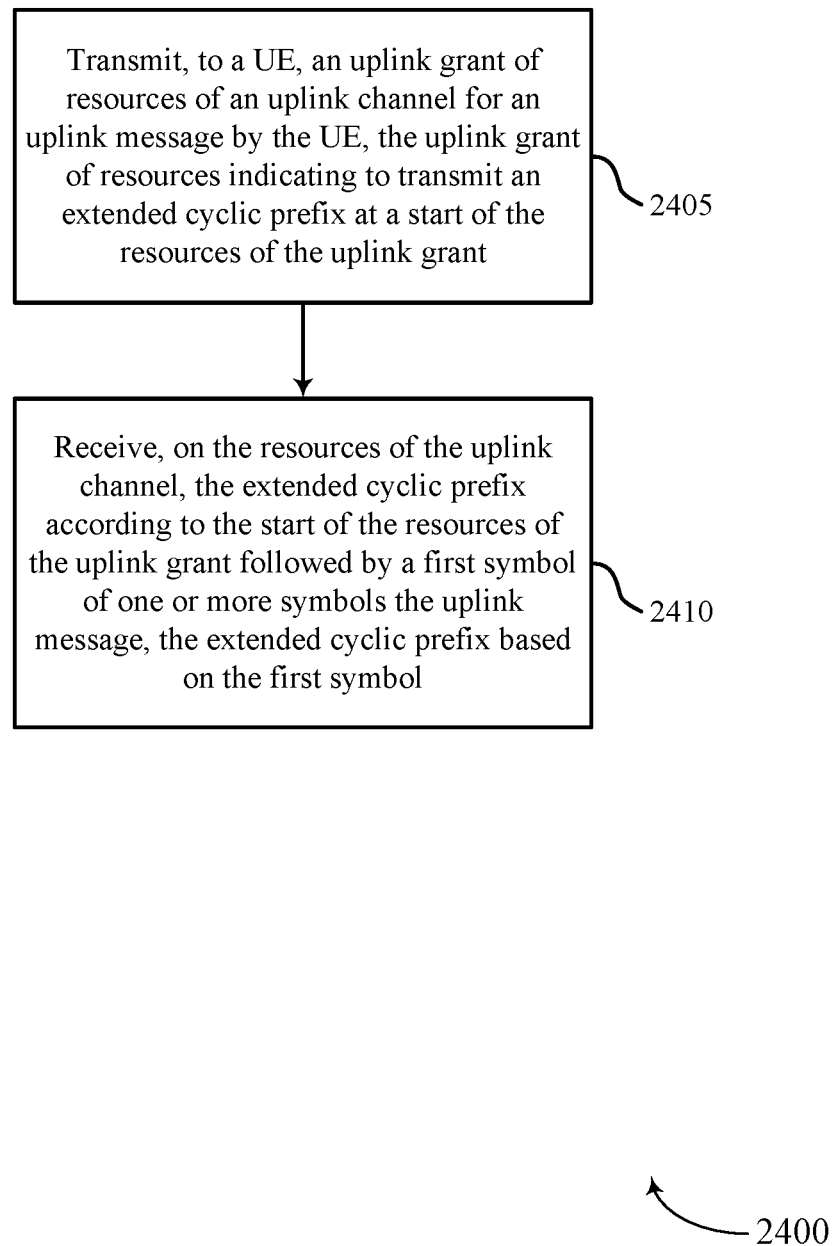

FIG. 24 shows a flowchart illustrating a method 2400 that supports uplink channel timelines with extended cyclic prefixes in accordance with aspects of the present disclosure. The operations of method 2400 may be implemented by a base station 105 or its components as described herein. For example, the operations of method 2400 may be performed by a communications manager as described with reference to FIGS. 14 through 16. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, an uplink grant of resources of an uplink channel for an uplink message by the UE, the uplink grant indicating to transmit an extended cyclic prefix at a start of the resources of the uplink grant. The operations of 2405 may be performed according to the methods described herein. In some examples, aspects of the operations of 2405 may be performed by an uplink message indicator as described with reference to FIGS. 14 through 16.

At 2410, the base station may receive, on the resources of the uplink channel, the extended cyclic prefix according to the start of the resources of the uplink grant followed by a first symbol of one or more symbols the uplink channel, the extended cyclic prefix based on the first symbol. The operations of 2410 may be performed according to the methods described herein. In some examples, aspects of the operations of 2410 may be performed by an ECP receiver as described with reference to FIGS. 14 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting an indication of a UE capability to support an extended cyclic prefix; determining to transmit an uplink message on resources of an uplink channel; performing a listen-before-talk procedure based at least in part on the determining to transmit the uplink message; determining a duration of the extended cyclic prefix associated with the resources of the uplink channel; and transmitting, on the resources of the uplink channel, the extended cyclic prefix according to the determined duration followed by a first symbol of one or more symbols of the uplink message, the extended cyclic prefix based at least in part on the first symbol.

Aspect 2: The method of aspect 1, wherein transmitting the indication of the UE capability comprises: transmitting an indication of an amount of extended cyclic prefix that is supported by the UE.

Aspect 3: The method of aspect 2, wherein the amount of supported extended cyclic prefix comprises a number of absolute time units, a number of symbols, or a combination thereof.

Aspect 4: The method of any of aspects 2 through 3, wherein the amount of supported extended cyclic prefix is based at least in part on a subcarrier spacing of the uplink channel or is the same for any subcarrier spacing of the uplink channel.

Aspect 5: The method of any of aspects 1 through 4, further comprising: receiving, from a base station, a configuration of a plurality of offsets for transmitting the extended cyclic prefix, the plurality of offsets based at least in part on the indication of the UE capability.

Aspect 6: The method of any of aspects 1 through 5, further comprising: receiving, from a base station, a configuration of a plurality of offsets for transmitting the extended cyclic prefix; and selecting an offset from a subset of the plurality of offsets for transmitting the extended cyclic prefix, the subset of the plurality of offsets based at least in part on the UE capability.

Aspect 7: The method of any of aspects 1 through 6, further comprising: identifying uplink control information to transmit on the uplink channel based at least in part on an event trigger; and multiplexing the uplink control information and at least one symbol of the uplink message on the uplink channel based at least in part on a timeline that comprises a minimum number of symbols required by the UE between when the event trigger occurs and a start of the uplink channel, the extended cyclic prefix, a timing advance, or a combination thereof.

Aspect 8: The method of aspect 7, further comprising: determining a symbol for multiplexing the uplink control information and the uplink message on the uplink channel based at least in part on the timeline.

Aspect 9: The method of any of aspects 7 through 8, further comprising: determining to multiplex the uplink control information and the uplink message based at least in part on the event trigger occurring a number of symbols before the start of the uplink channel, the number of symbols based at least in part on the timeline.

Aspect 10: The method of any of aspects 7 through 9, wherein the timeline is based at least in part on the duration of the extended cyclic prefix; or a sum of a duration of the extended cyclic prefix and the timing advance; or a smallest integer number of symbols whose duration is greater than or equal to the duration of the extended cyclic prefix; or a smallest integer number of symbols whose duration is greater than or equal to a sum of durations of the extended cyclic prefix and the timing advance.

Aspect 11: The method of any of aspects 7 through 10, further comprising: receiving an indication of an increase to the timeline caused by the extended cyclic prefix and the timing advance via radio resource control signaling.

Aspect 12: The method of any of aspects 7 through 11, wherein the minimum number of symbols required by the UE between when the event trigger occurs and when a start of the uplink channel comprises a UE uplink control information capability.

Aspect 13: The method of any of aspects 7 through 12, wherein the uplink control information comprises a feedback message, channel state information, or a combination thereof.

Aspect 14: The method of any of aspects 1 through 13, further comprising: identifying uplink control information to transmit on the uplink channel based at least in part on an event trigger; and dropping the uplink message or the uplink control information based at least in part on a priority of the uplink message, the uplink control information, data to be transmitted in the uplink control information, or a combination thereof, wherein the event trigger occurs within a duration before a start of the uplink channel.

Aspect 15: The method of aspect 14, wherein the duration is based at least in part on a supported number of symbols between the event trigger and transmitting the uplink control information, the extended cyclic prefix, and a timing advance.

Aspect 16: The method of any of aspects 1 through 15, wherein the extended cyclic prefix and the uplink message are in a same slot.

Aspect 17: The method of any of aspects 1 through 16, wherein determining to transmit the uplink message further comprises: receiving an uplink grant scheduling the uplink message on the resources of the uplink channel.

Aspect 18: The method of any of aspects 1 through 17, wherein determining to transmit the uplink message further comprises: receiving a configured grant scheduling one or more uplink messages on the resources of the uplink channel.

Aspect 19: A method for wireless communications at a UE, comprising: receiving an uplink grant indicating resources of an uplink channel and an indication of an extended cyclic prefix for the uplink channel; performing a listen-before-talk procedure based at least in part on receiving the uplink grant; determining a duration for the extended cyclic prefix from the received uplink grant; transmitting, on the resources of the uplink channel, the extended cyclic prefix according to the determined duration followed by a first symbol of one or more symbols of the uplink channel, the extended cyclic prefix based at least in part on the first symbol.

Aspect 20: The method of aspect 19, further comprising: determining to transmit on the resources of the uplink channel based at least in part on a timeline that comprises a minimum number of symbols required by the UE between the received uplink grant and a start of the uplink channel, the extended cyclic prefix, a timing advance, or a combination thereof.

Aspect 21: The method of aspect 20, further comprising: determining to transmit on the resources of the uplink channel based at least in part on the uplink grant occurring a number of symbols before the start of the uplink channel, the number of symbols based at least in part on the timeline.

Aspect 22: The method of any of aspects 20 through 21, wherein the timeline is based at least in part on a duration of the extended cyclic prefix; or a sum of a duration of the extended cyclic prefix and the timing advance; or a smallest integer number of symbols whose duration is greater than or equal to the duration of the extended cyclic prefix; or a smallest integer number of symbols whose duration is greater than or equal to a sum of durations of the extended cyclic prefix and the timing advance.

Aspect 23: The method of any of aspects 20 through 22, further comprising: receiving an indication of an increase to the timeline caused by the extended cyclic prefix and the timing advance via radio resource control signaling.

Aspect 24: The method of any of aspects 20 through 23, wherein the minimum number of symbols required by the UE between the received uplink grant and a start of the uplink channel comprises a UE uplink control information capability.

Aspect 25: The method of any of aspects 19 through 24, further comprising: reducing the determined duration for the extended cyclic prefix based at least in part on when the uplink grant is received.

Aspect 26: The method of any of aspects 19 through 25, wherein the extended cyclic prefix comprises a fractional number of symbols, a full number of symbols, or a combination thereof.

Aspect 27: The method of any of aspects 19 through 26, wherein the extended cyclic prefix and the uplink channel are in a same slot.

Aspect 28: A method for wireless communications at a UE, comprising: receiving an uplink grant of resources of an uplink channel for an uplink message by the UE, the uplink grant indicating to transmit an extended cyclic prefix at a start of the resources of the uplink grant; performing a listen-before-talk procedure based at least in part on the receiving the uplink grant; and transmitting, on the resources of the uplink channel, the extended cyclic prefix according to the start of the resources of the uplink grant followed by a first symbol of one or more symbols of the uplink message, the extended cyclic prefix based at least in part on the first symbol.

Aspect 29: The method of aspect 28, further comprising: performing the listen-before-talk procedure in a window before transmitting the extended cyclic prefix.

Aspect 30: The method of any of aspects 28 through 29, further comprising: transmitting the extended cyclic prefix followed by the first symbol of the one or more symbols the uplink message based at least in part on a duration between when the uplink grant is received and the start of the resources of the uplink grant.

Aspect 31: The method of any of aspects 28 through 30, further comprising: rate matching a transport block based at least in part on the one or more symbols of the uplink message.

Aspect 32: The method of any of aspects 28 through 31, wherein the extended cyclic prefix ends at a symbol boundary of the uplink channel.

Aspect 33: The method of any of aspects 28 through 32, wherein the extended cyclic prefix and the uplink channel are in a same slot.

Aspect 34: A method for wireless communications at a base station, comprising: receiving, from a UE, an indication of a UE capability to support an extended cyclic prefix; transmitting, to the UE, an indication for the UE to transmit an uplink message on resources of an uplink channel; determining a duration of the extended cyclic prefix associated with the resources of the uplink channel; and receiving, on the resources of the uplink channel, the extended cyclic prefix according to the determined duration followed by a first symbol of one or more symbols of the uplink message, the extended cyclic prefix based at least in part on the first symbol.

Aspect 35: A method for wireless communications at a base station, comprising: determining a duration for an extended cyclic prefix based at least in part on a symbol duration, a duration for a listen-before-talk procedure, and a gap between downlink and uplink slots; transmitting, to a UE, an uplink grant indicating resources of an uplink channel and an indication of the extended cyclic prefix for the uplink channel, the indication of the extended cyclic prefix comprising the determined duration; and receiving, on the resources of the uplink channel, the extended cyclic prefix according to the determined duration followed by a first symbol of one or more symbols the uplink channel, the extended cyclic prefix based at least in part on the first symbol.

Aspect 36: A method for wireless communications at a base station, comprising: transmitting, to a UE, an uplink grant of resources of an uplink channel for an uplink message by the UE, the uplink grant indicating to transmit an extended cyclic prefix at a start of the resources of the uplink grant; and receiving, on the resources of the uplink channel, the extended cyclic prefix according to the start of the resources of the uplink grant followed by a first symbol of one or more symbols the uplink message, the extended cyclic prefix based at least in part on the first symbol.

Aspect 37: An apparatus for wireless communications at a UE, comprising a processor; memory coupled with the processor; and instructions stored in the memory and executable by the processor to cause the apparatus to perform a method of any of aspects 1 through 18.

Aspect 38: An apparatus for wireless communications at a UE, comprising at least one means for performing a method of any of aspects 1 through 18.

Aspect 39: A non-transitory computer-readable medium storing code for wireless communications at a UE, the code comprising instructions executable by a processor to perform a method of any of aspects 1 through 18.

Aspect 40: An apparatus for wireless communications at a UE, comprising a processor; memory coupled with the processor; and instructions stored in the memory and executable by the processor to cause the apparatus to perform a method of any of aspects 19 through 27.

Aspect 41: An apparatus for wireless communications at a UE, comprising at least one means for performing a method of any of aspects 19 through 27.

Aspect 42: A non-transitory computer-readable medium storing code for wireless communications at a UE, the code comprising instructions executable by a processor to perform a method of any of aspects 19 through 27.

Aspect 43: An apparatus for wireless communications at a UE, comprising a processor; memory coupled with the processor; and instructions stored in the memory and executable by the processor to cause the apparatus to perform a method of any of aspects 28 through 33.

Aspect 44: An apparatus for wireless communications at a UE, comprising at least one means for performing a method of any of aspects 28 through 33.

Aspect 45: A non-transitory computer-readable medium storing code for wireless communications at a UE, the code comprising instructions executable by a processor to perform a method of any of aspects 28 through 33.

Aspect 46: An apparatus for wireless communications at a base station, comprising a processor; memory coupled with the processor; and instructions stored in the memory and executable by the processor to cause the apparatus to perform a method of aspect 34.

Aspect 47: An apparatus for wireless communications at a base station, comprising at least one means for performing a method of aspect 34.

Aspect 48: A non-transitory computer-readable medium storing code for wireless communications at a base station, the code comprising instructions executable by a processor to perform a method of aspect 34.

Aspect 49: An apparatus for wireless communications at a base station, comprising a processor; memory coupled with the processor; and instructions stored in the memory and executable by the processor to cause the apparatus to perform a method of aspect 35.

Aspect 50: An apparatus for wireless communications at a base station, comprising at least one means for performing a method of aspect 35.

Aspect 51: A non-transitory computer-readable medium storing code for wireless communications at a base station, the code comprising instructions executable by a processor to perform a method of aspect 35.

Aspect 52: An apparatus for wireless communications at a base station, comprising a processor; memory coupled with the processor; and instructions stored in the memory and executable by the processor to cause the apparatus to perform a method aspect 36.

Aspect 53: An apparatus for wireless communications at a base station, comprising at least one means for performing a method of aspect 36.

Aspect 54: A non-transitory computer-readable medium storing code for wireless communications at a base station, the code comprising instructions executable by a processor to perform a method aspect 36.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
transmitting an indication of a UE capability to support an extended cyclic prefix;
determining to transmit an uplink message on resources of an uplink channel;
performing a listen-before-talk procedure based at least in part on the determining to transmit the uplink message;
determining a duration of the extended cyclic prefix associated with the resources of the uplink channel;
identifying uplink control information to transmit on the uplink channel based at least in part on an event trigger;

multiplexing the uplink control information and at least one symbol of the uplink message on the uplink channel based at least in part on a timeline that comprises a minimum number of symbols required by the UE between when the event trigger occurs and a start of the uplink channel, the extended cyclic prefix, a timing advance, or a combination thereof; and transmitting, on the resources of the uplink channel, the extended cyclic prefix according to the determined duration followed by a first symbol of one or more symbols of the uplink message, the extended cyclic prefix based at least in part on the first symbol.

2. The method of claim 1, wherein transmitting the indication of the UE capability comprises:
transmitting an indication of an amount of extended cyclic prefix that is supported by the UE.

3. The method of claim 2, wherein the amount of supported extended cyclic prefix comprises a number of absolute time units, a number of symbols, or a combination thereof.

4. The method of claim 2, wherein the amount of supported extended cyclic prefix is based at least in part on a subcarrier spacing of the uplink channel or is the same for any subcarrier spacing of the uplink channel.

5. The method of claim 1, further comprising:
receiving, from a base station, a configuration of a plurality of offsets for transmitting the extended cyclic prefix, the plurality of offsets based at least in part on the indication of the UE capability, wherein transmitting the extended cyclic prefix is based at least in part on at least one offset of the plurality of offsets.

6. The method of claim 1, further comprising:
receiving, from a base station, a configuration of a plurality of offsets for transmitting the extended cyclic prefix; and
selecting an offset from a subset of the plurality of offsets for transmitting the extended cyclic prefix, the subset of the plurality of offsets based at least in part on the UE capability, wherein transmitting the extended cyclic prefix is based at least in part on the selected offset.

7. The method of claim 1, further comprising:
determining a symbol for multiplexing the uplink control information and the uplink message on the uplink channel based at least in part on the timeline.

8. The method of claim 1, further comprising:
determining to multiplex the uplink control information and the uplink message based at least in part on the event trigger occurring a number of symbols before the start of the uplink channel, the number of symbols based at least in part on the timeline.

9. The method of claim 1, wherein the timeline is based at least in part on:
the duration of the extended cyclic prefix; or
a sum of a duration of the extended cyclic prefix and the timing advance; or
a smallest integer number of symbols whose duration is greater than or equal to the duration of the extended cyclic prefix; or
a smallest integer number of symbols whose duration is greater than or equal to a sum of durations of the extended cyclic prefix and the timing advance.

10. The method of claim 1, further comprising:
receiving an indication of an increase to the timeline caused by the extended cyclic prefix and the timing advance via radio resource control signaling.

11. The method of claim 1, wherein the minimum number of symbols required by the UE between when the event trigger occurs and when the start of the uplink channel comprises a UE uplink control information capability.

12. The method of claim 1, wherein the uplink control information comprises a feedback message, channel state information, or a combination thereof.

13. The method of claim 1, further comprising:
identifying second uplink control information to transmit on a second uplink channel based at least in part on a second event trigger; and
dropping a second uplink message or a second uplink control information based at least in part on a priority of the second uplink message, the second uplink control information, data to be transmitted in the second uplink control information, or a combination thereof, wherein the second event trigger occurs within a duration before a start of the second uplink channel.

14. The method of claim 13, wherein the duration is based at least in part on a supported number of symbols between the second event trigger and transmitting the second uplink control information, a second extended cyclic prefix, and a timing advance.

15. The method of claim 1, wherein the extended cyclic prefix and the uplink message are in a same slot.

16. The method of claim 1, wherein determining to transmit the uplink message further comprises:
receiving an uplink grant scheduling the uplink message on the resources of the uplink channel.

17. The method of claim 1, wherein determining to transmit the uplink message further comprises:
receiving a configured grant scheduling one or more uplink messages on the resources of the uplink channel.

18. A method for wireless communications at a base station, comprising:
receiving, from a user equipment (UE), an indication of a UE capability to support an extended cyclic prefix;
transmitting, to the UE, an indication for the UE to transmit an uplink message on resources of an uplink channel;
determining a duration of the extended cyclic prefix associated with the resources of the uplink channel; and
receiving, on the resources of the uplink channel, the extended cyclic prefix according to the determined duration followed by a first symbol of one or more symbols of the uplink message, the extended cyclic prefix based at least in part on the first symbol, wherein uplink control information and at least one symbol of the uplink message are multiplexed on the uplink channel based at least in part on a timeline that comprises a minimum number of symbols between when an uplink control information triggering event occurs and a start of the uplink channel, the extended cyclic prefix, a timing advance, or a combination thereof.

19. The method of claim 18, wherein receiving the indication of the UE capability comprises:
receiving an indication of an amount of extended cyclic prefix that is supported by the UE.

20. The method of claim 19, wherein the amount of supported extended cyclic prefix comprises a number of absolute time units, a number of symbols, or a combination thereof.

21. The method of claim 19, wherein the amount of supported extended cyclic prefix is based at least in part on a subcarrier spacing of the uplink channel or is the same for any subcarrier spacing of the uplink channel.

22. The method of claim 18, further comprising:
transmitting, to the UE, a configuration of a plurality of offsets for transmitting the extended cyclic prefix, the plurality of offsets based at least in part on the indication of the UE capability, wherein receiving the extended cyclic prefix is based at least in part on at least one offset of the plurality of offsets.

23. An apparatus for wireless communications at a user equipment (UE), comprising:
a processor, memory coupled with the processor; and instructions stored in the memory and executable by the processor to cause the apparatus to:
transmit an indication of a UE capability to support an extended cyclic prefix;
determine to transmit an uplink message on resources of an uplink channel;
perform a listen-before-talk procedure based at least in part on the determination to transmit the uplink message;
determine a duration of the extended cyclic prefix associated with the resources of the uplink channel;
identify uplink control information to transmit on the uplink channel based at least in part on an event trigger;
multiplex the uplink control information and at least one symbol of the uplink message on the uplink channel based at least in part on a timeline that comprises a minimum number of symbols required by the UE between when the event trigger occurs and a start of the uplink channel, the extended cyclic prefix, a timing advance, or a combination thereof; and
transmit, on the resources of the uplink channel, the extended cyclic prefix according to the determined duration followed by a first symbol of one or more symbols of the uplink message, the extended cyclic prefix based at least in part on the first symbol.

24. The apparatus of claim 23, wherein the instructions to transmit the indication of the UE capability are executable by the processor to cause the apparatus to:
transmit an indication of an amount of extended cyclic prefix that is supported by the UE.

25. The apparatus of claim 24, wherein the amount of supported extended cyclic prefix comprises a number of absolute time units, a number of symbols, or a combination thereof.

26. The apparatus of claim 24, wherein the amount of supported extended cyclic prefix is based at least in part on a subcarrier spacing of the uplink channel or is the same for any subcarrier spacing of the uplink channel.

27. The apparatus of claim 23, wherein the instructions are further executable by the processor to cause the apparatus to:

receive, from a base station, a configuration of a plurality of offsets for transmission of the extended cyclic prefix, the plurality of offsets based at least in part on the indication of the UE capability, wherein transmission of the extended cyclic prefix is based at least in part on at least one offset of the plurality of offsets.

28. The apparatus of claim 23, wherein the instructions are further executable by the processor to cause the apparatus to:
receive, from a base station, a configuration of a plurality of offsets for transmission of the extended cyclic prefix; and
select an offset from a subset of the plurality of offsets for transmitting the extended cyclic prefix, the subset of the plurality of offsets based at least in part on the UE capability, wherein transmission of the extended cyclic prefix is based at least in part on the selected offset.

29. An apparatus for wireless communications at a base station, comprising:
a processor, memory coupled with the processor; and
instructions stored in the memory and executable by the processor to cause the apparatus to:
receive, from a user equipment (UE), an indication of a UE capability to support an extended cyclic prefix;
transmit, to the UE, an indication for the UE to transmit an uplink message on resources of an uplink channel;
determine a duration of the extended cyclic prefix associated with the resources of the uplink channel; and
receive, on the resources of the uplink channel, the extended cyclic prefix according to the determined duration followed by a first symbol of one or more symbols of the uplink channel, the extended cyclic prefix based at least in part on the first symbol, wherein uplink control information and at least one symbol of the uplink message are multiplexed on the uplink channel based at least in part on a timeline that comprises a minimum number of symbols between when an uplink control information triggering event occurs and a start of the uplink channel, the extended cyclic prefix, a timing advance, or a combination thereof.

30. The apparatus of claim 29, wherein the instructions to receive the indication of the UE capability are executable by the processor to cause the apparatus to:
receive an indication of an amount of extended cyclic prefix that is supported by the UE.

* * * * *